(12) United States Patent
Oashi et al.

(10) Patent No.: US 6,643,655 B2
(45) Date of Patent: *Nov. 4, 2003

(54) SYSTEM AND METHOD FOR DIGITAL DATA COMMUNICATION

(75) Inventors: Masahiro Oashi, Kyotanabe (JP); Tatsuya Shimoji, Neyagawa (JP); Yasuyuki Sonoda, Kyoto (JP); Keisei Yamamuro, Moriguchi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/166,065

(22) Filed: Jun. 11, 2002

(65) Prior Publication Data

US 2003/0115222 A1 Jun. 19, 2003

Related U.S. Application Data

(62) Division of application No. 09/477,735, filed on Jan. 5, 2000, now Pat. No. 6,427,150, which is a continuation of application No. PCT/JP99/02365, filed on May 6, 1999.

(30) Foreign Application Priority Data

| May 6, 1998 | (JP) | ............................................. | 10-123193 |
| Dec. 25, 1998 | (JP) | ............................................. | 10-370637 |
| Apr. 14, 1999 | (JP) | ............................................. | 11-107209 |

(51) Int. Cl.[7] .............................................. G06F 17/30
(52) U.S. Cl. ..................... 707/10; 707/102; 707/103 R; 707/104.1; 707/202; 709/230

(58) Field of Search .......................... 707/1–5, 10, 100, 707/102, 103 R, 104.1, 202; 345/733, 719, 716, 428; 348/143; 709/220, 226, 230

(56) References Cited

U.S. PATENT DOCUMENTS

| 5,541,662 | A | * | 7/1996 | Adams et al. | ............... 348/460 |
| 5,602,933 | A | * | 2/1997 | Blackwell et al. | .......... 382/116 |
| 5,666,293 | A | * | 9/1997 | Metz et al. | .................. 709/220 |
| 5,872,845 | A | * | 2/1999 | Feder | ......................... 358/442 |

(List continued on next page.)

Primary Examiner—Shahid Al Alam
(74) Attorney, Agent, or Firm—Michael D. Bednarek; ShawPittman, LLP

(57) ABSTRACT

A plurality of HTML files having their file names which may directly be recognized by a filtering part 415 in a data receiver are stored in a data storage part 411. File names of the HTML files are assigned to their headers by a data converter 412, and the files converted and multiplexed are repeatedly transmitted by a data multiplexing and transmitting part 413. A filtering part 415 selects the data having exact match with the filtering condition. A data processing part 419 performs data processing required for generating images, and the images thus generated are displayed on a screen of the display part 421. The data processing part 419 provides a switching command to a filtering conditions varying part 417 when an operator enters a file to be linked through an input part 420. The file to be linked is received as a result of changing the filtering conditions. In this way, the files required can be received and be displayed dynamically without storing all the HTML files linked one another even in temporary basis.

3 Claims, 48 Drawing Sheets

U.S. PATENT DOCUMENTS

| | | | |
|---|---|---|---|
| 5,892,535 A | * 4/1999 | Allen et al. | 725/36 |
| 5,926,824 A | * 7/1999 | Hashimoto | 715/520 |
| 5,937,413 A | * 8/1999 | Hyun et al. | 707/201 |
| 5,973,681 A | * 10/1999 | Tanigawa et al. | 345/716 |
| 5,999,946 A | * 12/1999 | Bailis et al. | 707/201 |
| 6,003,032 A | * 12/1999 | Bunney et al. | 707/10 |
| 6,029,068 A | * 2/2000 | Takahashi et al. | 455/426.1 |
| 6,050,940 A | * 4/2000 | Braun et al. | 600/300 |
| 6,055,526 A | * 4/2000 | Ambroziak | 707/2 |
| 6,078,921 A | * 6/2000 | Kelley | 707/10 |
| 6,115,706 A | * 9/2000 | Evans | 707/5 |
| 6,134,243 A | * 10/2000 | Jones et al. | 345/716 |
| 6,219,666 B1 | * 4/2001 | Krishnaswamy et al. | 707/8 |
| 6,223,182 B1 | * 4/2001 | Agarwal et al. | 707/102 |
| 6,253,212 B1 | * 6/2001 | Loaiza et al. | 707/202 |
| 6,256,635 B1 | * 7/2001 | Arrouye et al. | 707/102 |
| 6,301,584 B1 | * 10/2001 | Ranger | 707/103 R |
| 6,321,218 B1 | * 11/2001 | Guay et al. | 707/2 |
| 6,321,231 B1 | * 11/2001 | Jebens et al. | 707/104.1 |
| 6,332,144 B1 | * 12/2001 | deVries et al. | 707/102 |
| 6,341,279 B1 | * 1/2002 | Nye | 707/104.1 |

* cited by examiner

FIG.5

DATA STRUCTURE OF PACKETIZED DATA

| PID | DATA CONTENT |
|---|---|

FIG.6

PMT111   (PID=0X0011)

| PID OF VIDEO DATA | PID OF AUDIO DATA |
|---|---|
| 0X0022 | 0X0024 |

FIG.7

PMT114   (PID=0X0014)

| MODULE id OF THE FRONT PAGE | PID OF THE DATA |
|---|---|
| 0001/0001 | 0X0025 |

FIG.8

PAT  (PID=0x0000)

| SERVICES | PIDS OF PMT |
|---|---|
| 1011 | 0x0011 |
| 1012 | 0x0012 |
| 1013 | 0x0013 |
| 1014 | 0x0014 |

| PID OF NIT |
|---|
| 0x0018 |

FIG.9

NIT  (PID=0X18)

| TS | TRANSMISSION SPECIFICATIONS | SERVICE LIST |
|---|---|---|
| 1010 | f₁ | 1011,1012,1013,1014 |
| 1020 | f₂ | 1021,1022,1023,1024 |
| ⋮ | ⋮ | ⋮ |

FIG.13A

<¥weather¥forecast.html>

```
<html>
<head>
  :
<A href="¥weather¥today.html">1. TODAY'S WEATHER </A>
<BR>
<A href="¥weather¥week.html">2. WEEKLY FORECAST </A>
<BR>
  :
<html>
```

FIG.13B

<¥weather¥today.html>

```
<html>
  :
<A href="¥weather¥hokkaido.html">1. HOKKAIDO </A><BR>
<A href="¥weather¥kinki.html">6. KINKI REGION </A>
<A href="¥weather¥osaka.html"> [OSAKA] </A>
<A href="¥weather¥kyoto.html"> [KYOTO] </A>
  :
<html>
```

FIG.13C

<¥weather¥osaka.html>

```
<html>
  :
<img src "¥weather¥sun.gif" >
  :
<html>
```

FIG.15

| | MODULE ID | FILE NAME |
|---|---|---|
| 1 | 0001/0001 | ¥weather¥forecast.html |
| 2 | 0001/0002 | ¥weather¥today.html |
| 3 | 0001/0003 | ¥weather¥week.html |
| ⋮ | ⋮ | ⋮ |
| 61 | 0001/0061 | ¥weather¥osaka.html |
| ⋮ | ⋮ | ⋮ |
| 1000 | 0001/1000 | ¥weather¥sun.gif |
| 1001 | 0001/1001 | ¥weather¥snow.gif |
| ⋮ | ⋮ | ⋮ |
| 1100 | 0001/1100 | ¥weather¥rain.gif |
| ⋮ | ⋮ | ⋮ |

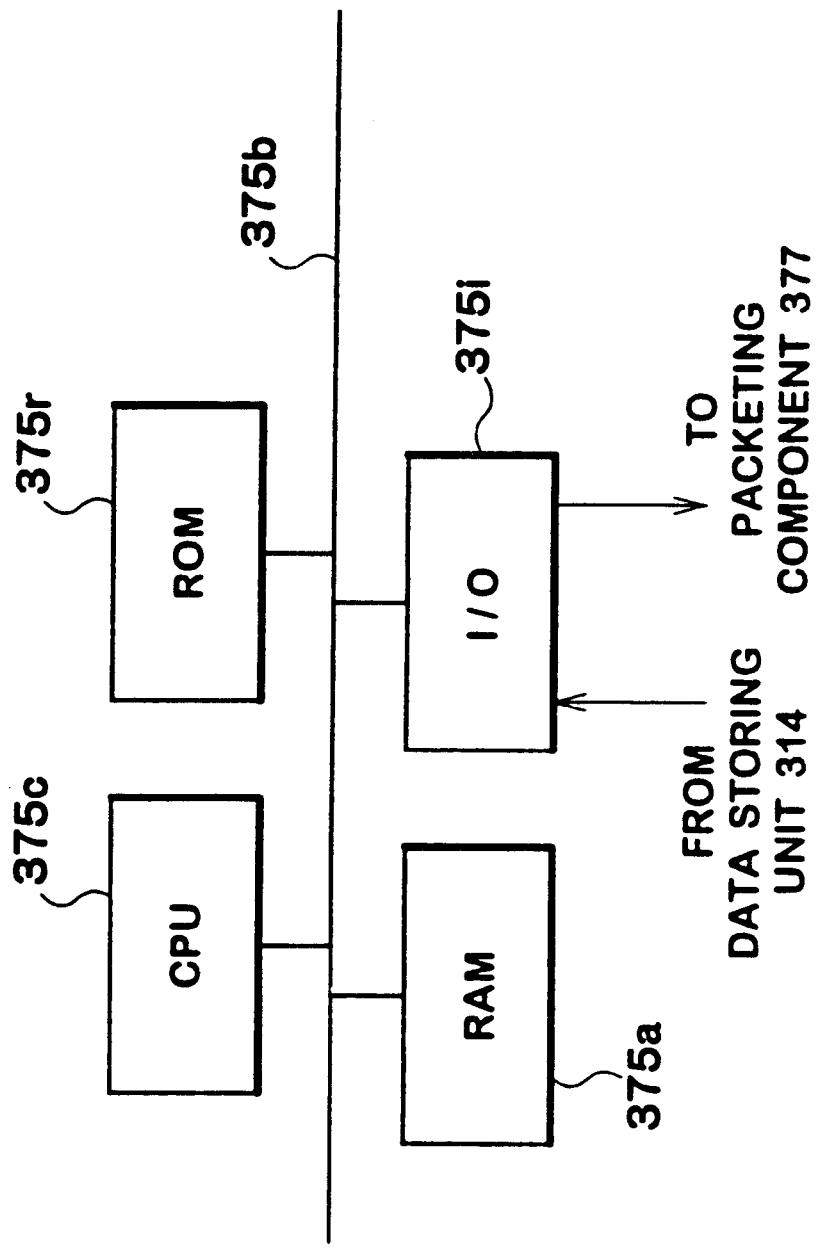

FIG.17A

| No | MODULE ID | FILE NAME |
|---|---|---|
| 1 | 0001/0001 | |
| 2 | 0001/0002 | |
| 3 | 0001/0003 | |
| ⋮ | ⋮ | |

FIG.17B

| | MODULE ID | FILE NAME |
|---|---|---|
| 1 | 0001/0001 | ¥weather¥forecast.html |
| 2 | 0001/0002 | |
| 3 | 0001/0003 | |
| ⋮ | ⋮ | |

FIG.23A

| | |
|---|---|
| PID | 0x0001 |
| TABLE_id | 0x3C |
| TABLE_id_extention | 0x0001 |

FIG.23B

| | |
|---|---|
| PID | 0x0001 |
| TABLE_id | 0x3C |
| TABLE_id_extention | 0x0002 |

FIG.23C

| | |
|---|---|
| PID | 0x0001 |
| TABLE_id | 0x3C |
| TABLE_id_extention | 0x0061 |

FIG.25A

<0001/0001.html>

```
<html>
    <head>
        :
<A href="0001/0002.html">1.TODAY'S WEATHER</A>
<BR>
<A href="0001/0003.html">2.WEEKLY FORECAST</A>
<BR>
        :
    <html>
```

FIG.25B

<0001/0002.html>

```
<html>
        :
<A href="0001/0011.html">1.HOKKAIDO </A><BR>
<A href="0001/0016.html">6.KINKI REGION </A>
<A href="0001/0061.html">[OSAKA] </A>
<A href="0001/0062.html">[KYOTO] </A>
        :
    <html>
```

FIG.25C

<0001/0061.html>

```
<html>
        :
<img src "0001/1000.gif">
        :
    <html>
```

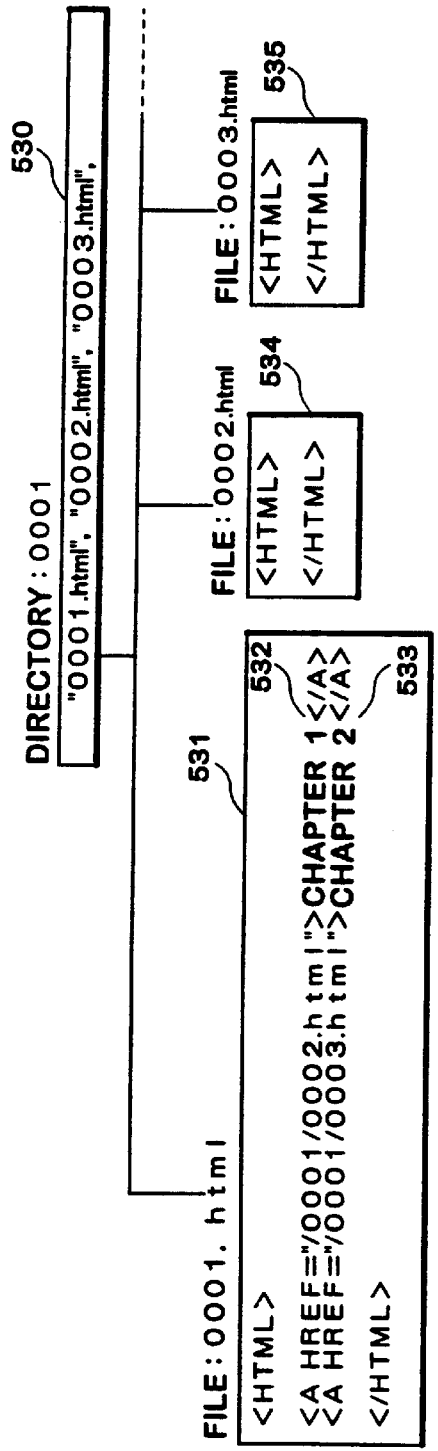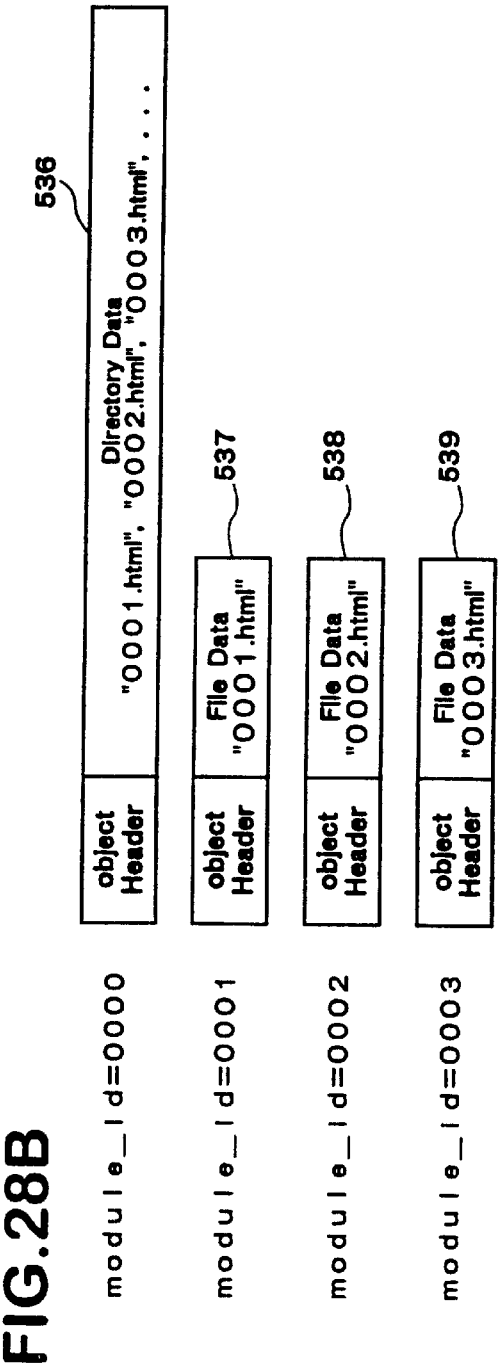

FIG.33

```
<sample.html>

<html>
<head>
<style type="text/css">
  #img1{position:absolute;left:50px;
     top:300px;width:300px;height:500px;}
  #img2{position:absolute;left:400px;
     top:300px;width:300px;height:500px;}        } 603
  #img3{position:absolute;left:700px;
     top:300px;width:300px;height:500px;}
</style>
</head>
<body>
     <object id="img1"type="image/png"
           src= "http://www/dirA/0001/s1.png"
           alt= "THIS IMAGE IS A PNG FILE  " >
     </object>
     <object id="img2"type="image/gif"
           src= "http://www/dirA/0001/s2.gif"
           alt= "THIS IMAGE IS A GIF FILE  " >
     </object>
     <object id="img3"type="image/jpeg"
           src= "http://www/dirA/0001/s3.jpeg"
           alt= "THIS IMAGE IS A JPEG FILE  " >
     </object>
</body>
</html>
```

FIG.37

Content-Type:multipart/mixed —————————— 611
Content-Base:http://www/dirA/0001/ ————— 613
boundary=" boundary-sample" ; ——————— 615

--boundary-sample ————————————— 617
Content-Type:text/html ——————————— 619
Content-location:sample.html ——————— 621
Content-Length:928 ———————————— 623

```
<html>
<head>
<style type="text/css">
    #img1{position:absolute;left:50px;
              ⋮
```
} 627

FIG.39

```
<html>
<head>
<style type="text/css">
    #img1{position:absolute;left:50px;
        top:300px;width:300px;height:500px;}
    #img2{position:absolute;left:400px;
        top:300px;width:300px;height:500px;}
    #img3{position:absolute;left:700px;
        top:300px;width:300px;height:500px;}
</style>
</head>
<body>
    <object id="img1"type="image/png"
        src= "http://www/dirA/0001/t1.png"
        a href="http://www/dirA/0001/t1.html">          651
    </object>
    <object id="img2"type="image/gif"
        src= "http://www/dirA/0001/t2.gif"
        a href="http://www/dirA/0001/t2.html">          653
    </object>
    <object id="img3"type="image/jpeg"
        src= "http://www/dirA/0001/t3.jpeg" >
    </object>
</body>
</html>
```

FIG.41A

```
<html>
<head>
<title>HTML SAMPLE 1</title>
</head> <body>
THIS IS SAMPLE IMAGE 1

</body>
</html>
```

FIG.41B

```
<html>
<head>
<title>HTML SAMPLE 2</title>
</head> <body>
THIS IS SAMPLE IMAGE 2

</body>
</html>
```

FIG.44

<index.html>

```
<html>
<head>
<style type="text/css">
  #img1{position:absolute;left:50px;
    top:300px;width:300px;height:500px;}
  #img2{position:absolute;left:400px;
    top:300px;width:300px;height:500px;}
  #img3{position:absolute;left:750px;
    top:300px;width:300px;height:500px;}
</style>
</head>
<body>
    <object id="img1"type="image/png"
        src= "http://www/dirA/0001/u1.png" >
    </object>
    <object id="img2"type="img/png"
        src= "http://www/dirA/0001/u2.png" >
    </object>
    <object id="img3"type="image/png"
        src= "http://www/dirA/0003/u3.png"          711
        a href="http://www/dirA/0002/jump.html">    713
    </object>
</body>
</html>
```

FIG.48A

| |
|---|
| http://www/dirA/0001/u2.png |
| http://www/dirA/0001/u1.png |
| http://www/dirA/0001/index.html |

FIG.48B

| |
|---|
| http://www/dirA/0003/u5.png |
| http://www/dirA/0003/u3.png |
| http://www/dirA/0001/u2.png |
| http://www/dirA/0001/u1.png |
| http://www/dirA/0001/index.html |

FIG.48C

| |
|---|
| http://www/dirA/0002/u4.png |
| http://www/dirA/0002/jump.png |
| http://www/dirA/0003/u5.png |
| http://www/dirA/0003/u3.png |
| http://www/dirA/0001/u2.png |
| http://www/dirA/0001/u1.png |

FIG.49

<jump.html>

```html
<html>
<head>
<style type="text/css">
    #img1{position:absolute;left:50px;
        top:300px;width:300px;height:500px;}
    #img2{position:absolute;left:400px;
        top:300px;width:300px;height:500px;}
    #img3{position:absolute;left:750px;
        top:300px;width:300px;height:500px;}
</style>
</head>
<body>
        <object id="img1"type="image/png"
            src= "http://www/dirA/0001/u1.png" >
</object>
        <object id="img2"type="img/png"
            src= "http://www/dirA/0001/u2.png" >
</object>
        <object id="img3"type="image/png"
            src= "http://www/dirA/0002/u4.png" >
</object>
</body>
</html>
```

SYSTEM AND METHOD FOR DIGITAL DATA COMMUNICATION

This application is a division of application Ser. No. 09/477,735, filed Jan. 5, 2000, now U.S. Pat. No. 6,427,150, which is a continuation of International application Serial No. PCT/JP99/02365 filed May 6, 1999, and published as WO 99/57654 on Nov. 11, 1999.

CROSS-REFERENCE TO RELATED APPLICATION

The entire disclosure of Japanese Patent Application No. Hei 10-123193 filed on May 6, 1998, another Japanese Patent Application No. Hei 10-370637 filed on Dec. 25, 1998, and another Japanese Patent Application No. Hei 11-107209 filed on Apr. 14, 1999, including specification, claims, drawings and abstract is incorporated herein by reference in its entirety.

BACKGROUND OF INVENTION

1. Field of the Invention

This invention relates to digital data communication systems, more specifically to communications of self-descriptive data.

2. Description of the Related Art

Nowadays, a communication method using the internet is known as two-way data communications among computers. The principle of the method will be briefly described hereunder. A plurality of hyper text markup language (hereinafter referred to as HTML) files linked with one another are stored into a world wide web (hereinafter referred to as WWW) server which is connected to the internet. A demand for transmitting the HTML files stored in the WWW server is sent thereto from a gathering information computer which is connected to the internet. The WWW server transmits whole or a part of the HTML files to the gathering computer in response to the demand. As a result, data linked with one another and stored in the WWW server can be transferred.

Data communication services using satellite broadcasting, on the other hand, are known as one-way data communications. In satellite broadcasting, data are transmitted through a moving picture experts group 2 (hereinafter referred to as MPEG 2) system standard used for data transmission which has a relatively higher flexibility than the other two standards in the MPEG 2, such as MPEG 2 video standard used for video data and MPEG 2 audio standard used for audio data, out of these three MPEG 2 standards.

In order to transmit HTML files to the receivers by using satellite broadcasting, a demand for transmitting desired HTML file(s) need to be sent to the transmitter.

To avoid sending the demand, methods described hereunder are employed in actual data communications protocols such as BITCAST and ADAMS (TV-Asahi data and multimedia service). A plurality of files linked with one another are transmitted as one unitized file by the transmitter. In the receiver, all the files are stored in a storage device like a hard disk by sequentially storing each of the files therein. Further, the specified file(s) is displayed in response to operation of the user by browser software installed in the receiver. The browser software performs reference operations by specifying the name of a file(s) stored in a hard disk when there is HTML tag(s) requiring reference of other file(s) in the specified file(s) (details of the technology is disclosed in an article entitled "Special Report from state-of-the-art technology; The Whole Aspect of the Next Generation Digital Television", published by Nikkei Business Publications, Inc.)

In this method, however, all the files must be stored in the hard disk as well as storing information needed to manage the directory. In this way, a certain capability for storing this information is required in the receiver, and the receiver can not display a desired file(s) until its retrieval is completed. Further, a number of processing steps need to be performed by the receiving computer's central processing unit (CPU) for retrieving the desired file(s) from the stored files.

SUMMARY OF THE INVENTION

It is an object of the present invention to overcome the above mentioned drawbacks on the data communication method, and to provide a data communication system and a method thereof capable of selectively receiving selected data out of data consisting of a plurality of files related one another at a high speed with less data storing capacities.

It is another object of the present invention to provide a data communication system and a method thereof capable of selectively extracting desired data out of data related with one another even when the receiver has a small data storing capability.

In accordance with characteristics of the present invention, there is provided a digital data communication system comprising a transmitter and a receiver, A) the transmitter including:
 a1) file storing means for storing a plurality of files, and
 a2) transmission means for repeatedly transmitting the files packetized thereby in accordance with a transmission protocol, the packetized files uniquely assigned identifiers;

B) the receiver including:
 b1) selective receiving means for selectively receiving the packetized files having predetermined identifiers in accordance with a selecting condition set therein and outputting data contained in the packetized files,
 b2) display data generating means for generating display data according to the outputted data, and
 b3) selecting condition varying means for varying the selecting condition; and C) wherein c1) the file storing means stores files formed of self-descriptive data which includes a reference command for referring another file, and wherein the identifier of each file includes characters directly selected by the selecting condition varying means,
 c2) the display data generating means generates display data according to the self-descriptive data outputted by the selective receiving means, and
 c3) the selecting condition varying means provides an identifier assigned to a file so as to obtain the file specified by the reference command in the self-descriptive data to the selective receiving means.

Also, in accordance with characteristics of the present invention, there is provided a method of communicating digital data, comprising the steps of:

repeatedly transmitting a plurality of files after packetizing the files according to a transmission protocol with identifiers uniquely assigned thereto in a transmitting station, each of the files comprising self-descriptive data which include a reference command for referring another file, the identifier of the each file consisting of characters directly selected by a receiving station, and performing the following steps in a receiving station,
 selectively receiving the packetized files having predetermined identifiers in accordance with a selecting condition set therein, generating display data in accordance with the self-descriptive data contained in the packetized files, outputting the generated data, and varying an identifier of a file as the selecting condition so as to obtain the file specified by the reference command in the self-descriptive data.

Further, in accordance with characteristics of the present invention, there is provided a digital data communication system comprising a transmitter and a receiver, A) the transmitter including:
   a1) file storing means for storing a plurality of files, and
   a2) transmission means for repeatedly transmitting the files packetized thereby in accordance with a transmission protocol, the packetized files uniquely assigned identifiers;
B) the receiver including:
   b1) selective receiving means for selectively receiving the packetized files having predetermined identifiers in accordance with a selecting condition set therein and outputting data contained in the packetized files,
   b2) received data storing means for storing data contained in the packetized files each having same identifier in one independent file basis,
   b3) display data generating means for generating display data according to the outputted data, and
   b4) selecting condition varying means for varying the selecting condition; and
C) wherein: c1) the file storing means stores files formed of self-descriptive data which includes a reference command for referring another file,
   c2) the transmission means assigns one module identifier including characters capable of being read directly with the selective receiving means to both a reference file which refers other files and a referred file which is referred by the reference file, and transmits the reference file and the referred file, and
   c3) the display data generating means generates display data according to the self-descriptive data contained in the reference file, and generates another display data according to a desired referred file which is read out thereby from the received data storing means.

In accordance with characteristics of the present invention, there is provided a method of communicating digital data, comprising the steps of:

repeatedly transmitting a plurality of files stored in a transmitting station after packetizing the files according to a transmission protocol with identifiers uniquely assigned thereto in the transmitting station, and performing the following steps in a receiving station, selectively receiving the packetized files having predetermined module identifiers in accordance with a selecting condition set therein, storing data contained in the packetized files each having same identifier in one independent file basis, and generating display data according to the outputted data, wherein one module identifier including characters capable of being read directly with the receiving station is assigned to both a reference file which refers other files and a referred file which is referred by the reference file in the transmitting station, wherein the following steps are performed by the receiving station, the selecting condition is varied so as to selectively receive packetized files each assigned same identifier with that of a specific reference file in order to selectively receive the specific reference file, display data is generated according to self-descriptive data contained in the reference file, and generating another display data according to a desired referred file which is read out thereby.

Also, in accordance with characteristics of the present invention, there is provided a digital data communication system comprising a transmitter and a receiver, A) the transmitter including:
   a1) file storing means for storing a plurality of files, and
   a2) transmission means for repeatedly transmitting the files packetized thereby in accordance with a transmission protocol, the packetized files uniquely assigned identifiers;
B) the receiver including:
   b1) selective receiving means for selectively receiving the packetized files having predetermined identifiers in accordance with a selecting condition set therein and outputting data contained in the packetized files,
   b2) received data storing means for storing data contained in the packetized files each having same identifier in one independent file basis,
   b3) display data generating means for generating display data according to the outputted data, and
   b4) selecting condition varying means for varying the selecting condition; and
C) wherein c1) the file storing means stores a plurality of reference files formed of self-descriptive data which includes a reference command for referring a plurality of other files,
   c2) the transmission means assigns one module identifier including characters capable of being read directly with the selective receiving means to the reference files and transmits the reference files,
   c3) the display data generating means generates display data according to self-descriptive data contained in the reference files, and generates another display data according to desired referred files which are read out thereby from the received data storing means, and
   c4) the selecting condition varying means uses the module identifier as the selecting condition.

Further, in accordance with characteristics of the present invention, there is provided a digital data receiver comprising:

selective receiving means for selectively receiving packetized files having predetermined identifiers in accordance with a selecting condition set therein and outputting data contained in the packetized files, received data storing means for storing data contained in the packetized files each having same identifier in one independent file basis;

display data generating means for generating display data according to the outputted data; and selecting condition varying means for varying the selecting condition;

wherein the packetized files thus received are one of a reference file formed of self-descriptive data which includes a reference command for referring another file and a referred file by the reference file, and one identifier including characters capable of being read directly with the selective receiving means is assigned to these files, and wherein the display data generating means generates display data according to self-descriptive data contained in the reference file, and generates another display data according to a desired referred file which is read out thereby from the received data storing means, and wherein the selecting condition varying means extracts characters directly be selected by the selective receiving means out of absolute path assigned to the referred files and provides the characters to the selective receiving means as the selecting condition so as to selectively receive packetized files each assigned same identifier with that of the reference file in order to selectively receive the reference file. While the novel features of the invention are set forth in a general fashion, both as to organization and content, the invention will be better understood and appreciated, along with other objects and features thereof from the following detailed description taken in conjunction with the drawings.

BRIEF DESCRIPTION OF THE DRAWINGS

FIG. 5 shows a data structure of packetized data.

FIG. 6 shows contents of control data of control data program map table (PMT) 111 for multiplexing the packetized data.

FIG. 7 shows contents of control data PMT 114 for multiplexing the packetized data.

FIG. 8 shows contents of control data PAT.

FIG. 9 shows contents of control data network information table (hereinafter referred to as NIT).

FIG. 13A, FIG. 13B, and FIG. 13C show contents of HTML files.

FIG. 15 is a correspondence table.

FIG. 16 is a block diagram showing a typical example of the hardware structure of a data converter 375.

FIG. 17A and FIG. 17B show other correspondence tables.

FIG. 23A, FIG. 23B, and FIG. 23C are tables showing filtering conditions.

FIG. 25A, FIG. 25B, and FIG. 25C show converted contents of HTML files.

FIG. 28A and FIG. 28B are views showing the structure of the data in both an HTML file and an U—U object.

FIG. 33 shows data contents of a reference file.

FIG. 37 shows data contents of an HTML file in which a plurality of files are incorporated with one another.

FIG. 39 shows data contents of another HTML file in which referred files are included therein other than automatic reference tag(s).

FIG. 41A and FIG. 41B show data contents of an HTML file which is referred as the referred file in FIG. 39.

FIG. 44 shows data contents of a reference file.

FIG. 48A through FIG. 48C show data structure of the data stored in the cache memory.

FIG. 49 shows data contents of an HTML file which is referred as the referred file.

DETAILED DESCRIPTION OF THE PREFERRED EMBODIMENT

The preferred embodiment of the present invention will be described herein along with the index shown in below:

1. FUNCTION BLOCK DIAGRAMS
  1 - 1. Outline of satellite broadcasting
    1 - 1 - 1. State of sending radio waves in satellite broadcasting
    1 - 1 - 2. Outline of transmitter
    1 - 1 - 3. Structure of transport stream
      1 - 1 - 4. Outline of receiver -continued 1 - 2. First embodiment
        1 - 2 - 1. Transmitter
        1 - 2 - 2. Receiver
            1 - 2 - 2 - 1. Hardware structure
            1 - 2 - 2 - 2. Receiving operation control program
            1 - 2 - 2 - 3. Display program
    1 - 3. Second embodiment
        1 - 3 - 1. Data converting operations in transmitter
        1 - 3 - 2. Data receiving operations in receiver
    1 - 4. Third embodiment
        1 - 4 - 1. Data transmitter
        1 - 4 - 2. Data receiver
        1 - 4 - 3. Hardware structure of data receiver
    1 - 5. Fourth embodiment
    1 - 6. Other embodiments.

1. Function Blocks

Figure 1:
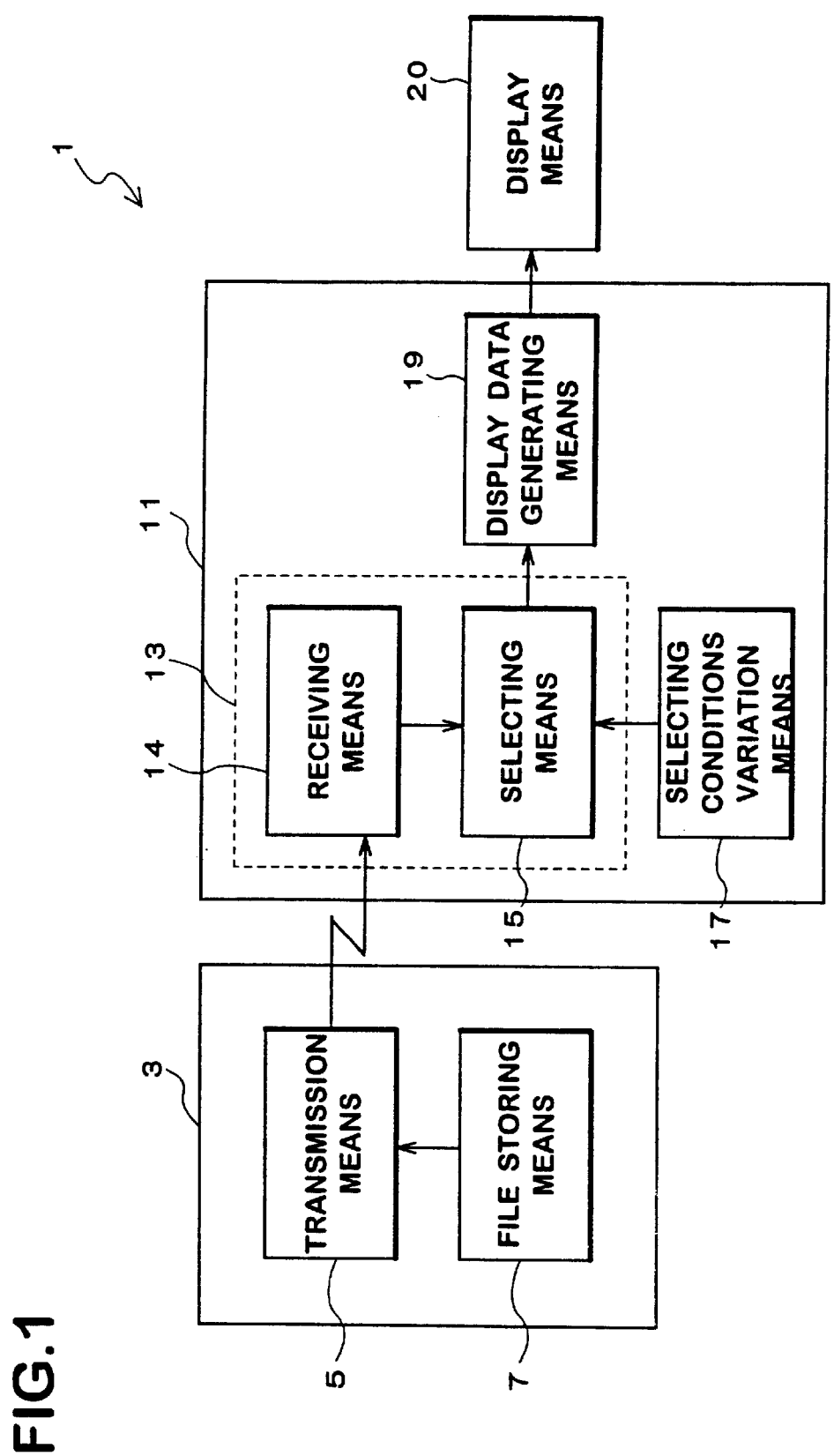
FIG. 1 is a schematic block diagram showing an overall structure of a data communication system in accordance with the present invention.

The system 1 shown in FIG. 1 comprises a transmitter 3 and a receiver 11.

The transmitter 3 includes file storing means 7 and transmission means 5. The file storing means 3 stores a plurality of files comprising self-descriptive data. A part of the files include reference commands for referring another files. Identifiers of the files stored in the file storing means 7 consist of a series of characters which may directly be recognized with selecting means 15 in the receiver 11. The transmission means 5 repeatedly transmits the files with the identifiers according to a protocol after packetizing them.

The receiver 11 comprises receiving means 14, selecting means 15, display data generating means 19, and selecting conditions variation means 17. The receiving means 14 receives the packets thus transmitted. The selecting means 15 selects only packets having selective identifiers out of the received packets in accordance with a selecting condition. The display data generating means 19 generates display data in accordance with self-descriptive data included in the selected packets. Further, the selecting conditions variation means 17 varies the selecting condition so as to obtain selected file(s) specified by the reference(s) included in the self-descriptive data. The selecting conditions variation means 17 also varies the selecting condition in the selecting means 15 so as to obtain selected file(s) specified by the reference command(s) when an operator of the system selects a display region specified by the reference command(s) out of all the region displayed on display means 20.

1-1. Outline of Satellite Broadcasting

One example of applying the present invention to satellite broadcasting will be described herein. The present invention, however, may also be applied to other broadcasting methods such as terrestrial broadcasting, wire broadcasting such as cable television and the like as long as packetized data are transmitted.

1-1-1. State of Sending Radio Waves in Satellite Broadcasting

Figure 2:
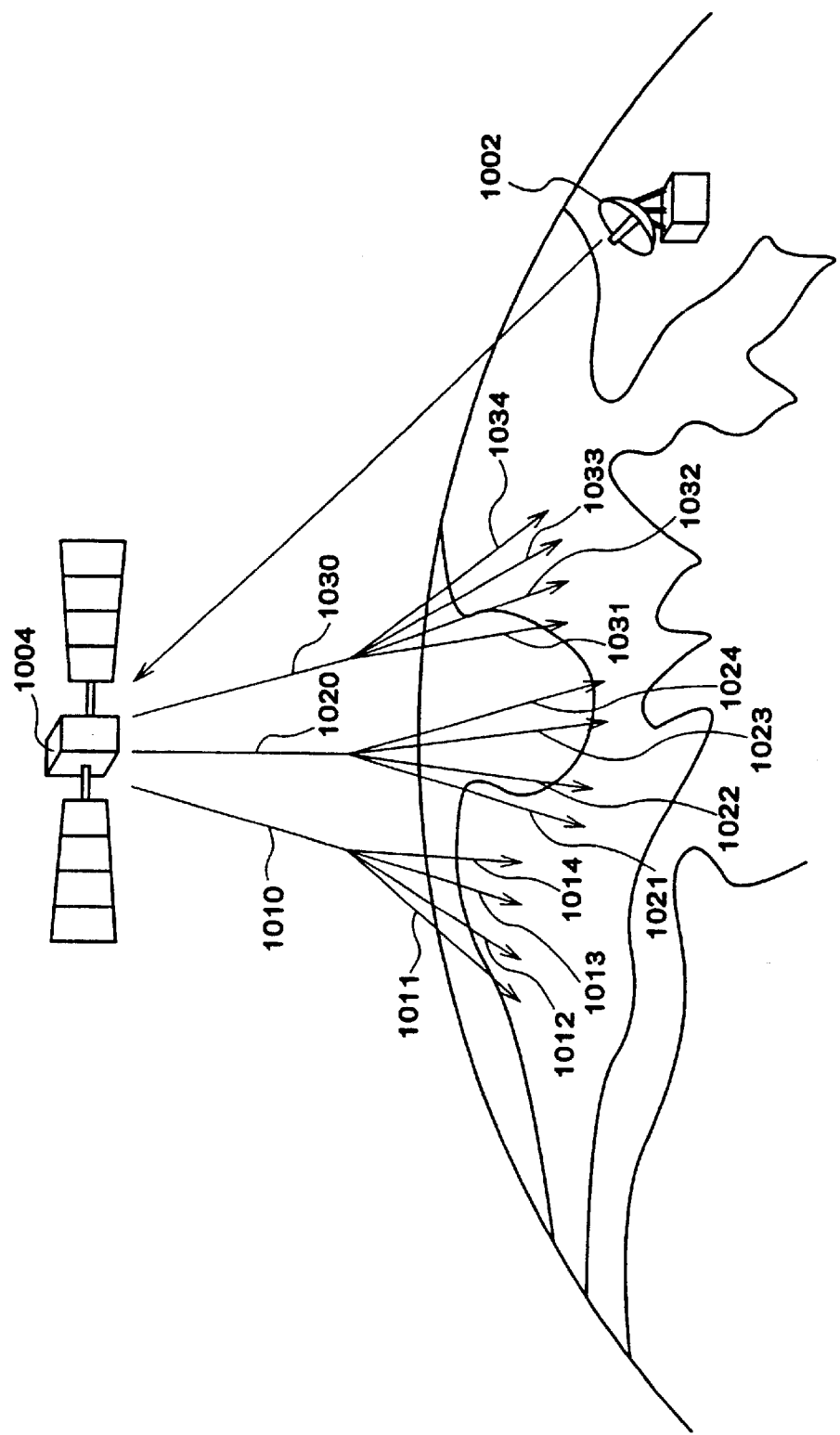
FIG. 2 is a simplified conceptual view showing a state of sending radio waves in satellite broadcasting.

FIG. 2 shows a simplified conceptual view showing a state of sending radio waves in satellite broadcasting. Radio waves from a ground station 1002 are sent to a plurality of ground receivers (not shown) through a broadcasting satellite 1004. The broadcasting satellite 1004 sends out a plural number of transport streams 1010, 1020, 1030. Each transport stream is distinguished from the others by its frequency, plane of polarization and other factors (well known in the art).

A plurality of services (analogous to channels in terrestrial broadcasting) 1011, 1012, 1013, and 1014 being packetized are multiplexed in the transport stream 1010 under a time-sharing manner. Similarly, services 1021, 1022, 1023 and 1024, and services 1031, 1032, 1033 and 1034 are multiplexed respectively in the transport streams 1020 and 1030. Various control data representing service information, the present time, and the like, together are sent out to each of the transport streams in addition to the packetized data (including video data and audio data). While, FIG. 2 shows only three transport streams, many more transport streams may be sent out. Furthermore, while FIG. 2 shows a total of four services multiplexed in each transport stream, in actuality many more services may be multiplexed therein.

1-1-2. Outline of Transmitter

Figure 3:
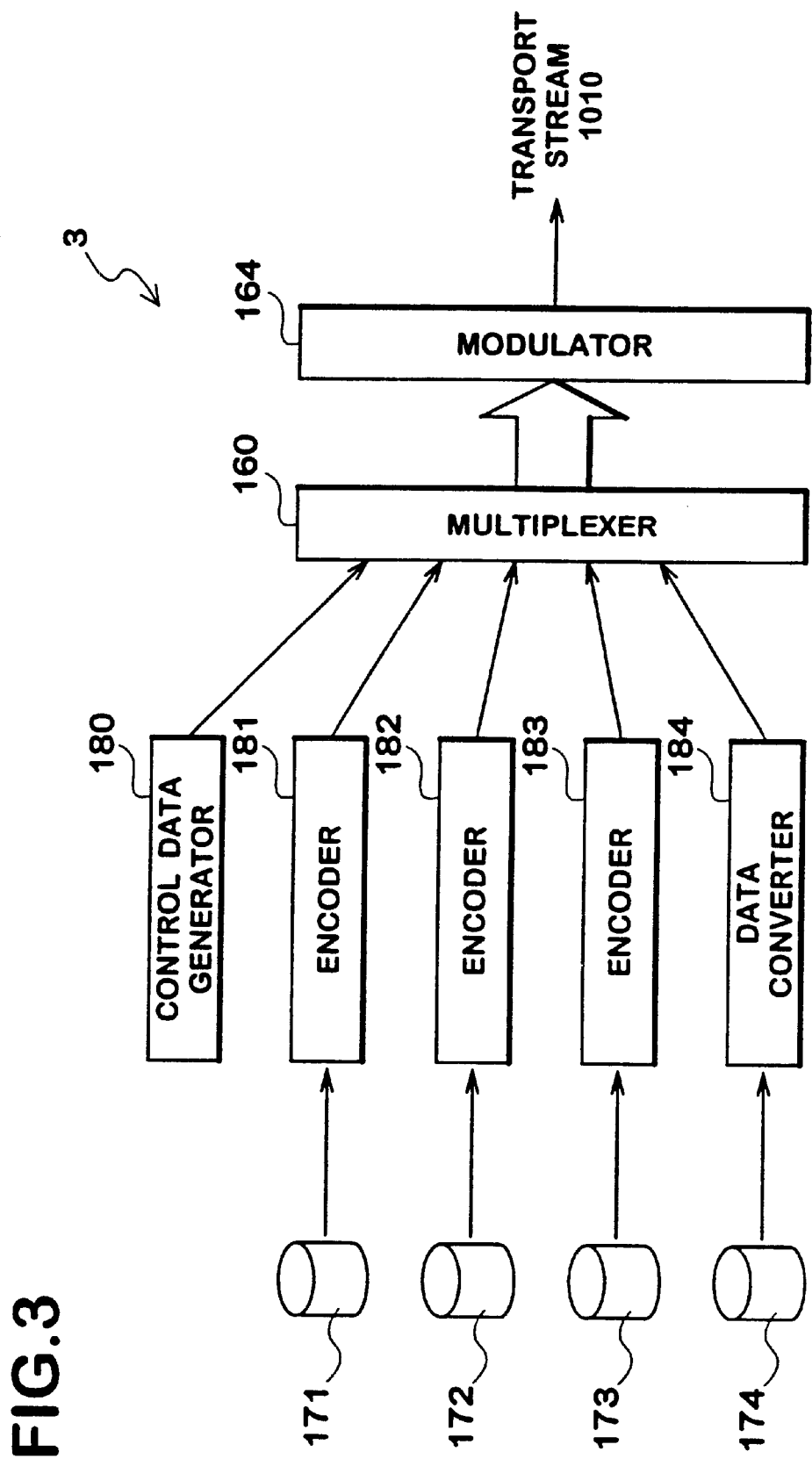
FIG. 3 is a schematic illustration of a transmitter.

FIG. 3 is a schematic illustration of a transmitter for generating and transmitting the transport streams described above. While FIG. 3 shows only the transport stream 1010 for simplicity, other transport in streams 1020, 1030 are generated thereby in the same manner.

Video/audio data of the service 1011 are stored in a data storing unit 171. These data are compressed by an encoder 181, and are provided to a multiplexer 160. Similarly, video/audio data of the services 1012 and 1013 are stored respectively in data storage unit 172 and 173. Video data for the services are compressed under the MPEG 2 video standard, and audio data are compressed under the MPEG 2 audio standard. The data so compressed are provided to the multiplexer 160.

In another data storage unit 174, HTML data used for the service 1014 is stored therein. The data are converted into modules having object headers by a data converter 184 in accordance with the MPEG 2 system standard. Module identification (module_id) are assigned to each of the modules. Details of the assignment will be described later.

A control data generator 180 generates control data for multiplexing the packetized data, the control data for displaying program information, the control data representing the present time and other such data. The control data for multiplexing is assigned for properly recognizing video/audio data in plural services which are packetized and multiplexed under a time sharing manner.

The multiplexer 160 outputs a plurality of packets under a time sharing manner, each consisting of packetized data having a fixed length as a result of carrying out packetization of the data provided from the control data generator 180, the encoder 181 through the encoder 183, and that from the data converter 184, as the transport stream 1010.

Further, the multiplexer 160 assigns individual module_ids to section headers of all the packets when the data from the data converter 184 is packetized. In this embodiment, the last four digits of a packet are assigned a table_id_extension region (field) by using the first four digits thereof as a PID because the module identifiers consist of directory_id and file_id for identifying module (a total of eight digits) as described later.

Thus, the packets comprising each file can definitely be specified without further consideration in the receiver by distinguishing them using the PID and the table_id_extension.

A modulator 164 outputs the packets being provided and modulated thereby as a transport stream. The transport stream thus outputted is broadcasted to the audience.

1-1-3. Structure of Transport Stream

Figure 4:
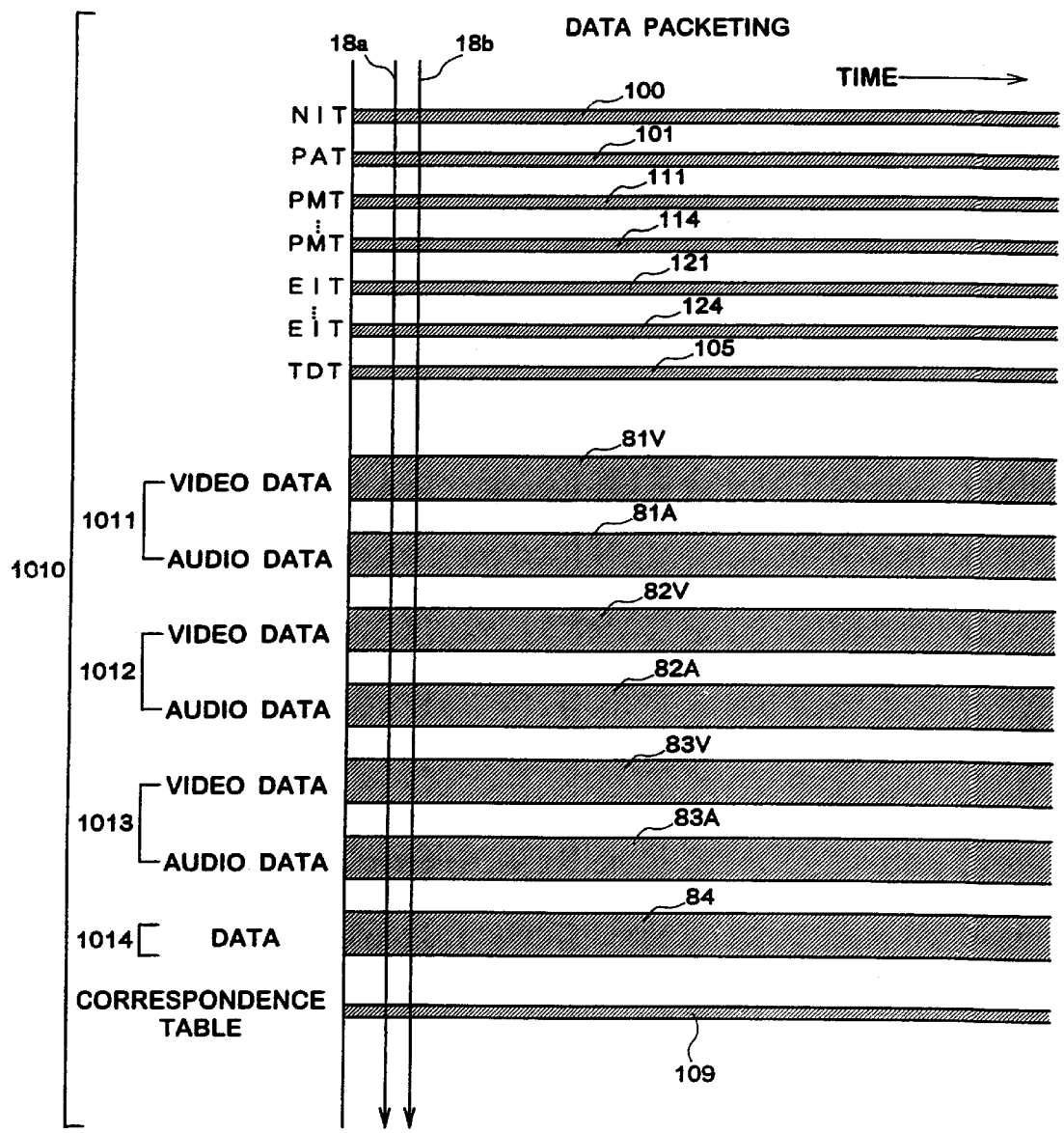
FIG. 4 is a view showing a data arrangement of a transport stream transmitted in satellite broadcasting.

As shown in FIG. 4, services 1011, 1012 and 1013, each including video data 81V, 82V and 83V, and audio data 81A, 82A and 83A respectively, service 1014, including HTML or imaging data 84 and a correspondence table 109 are multiplexed in the transport stream 1010 generated by the transmitter shown in FIG. 3. Details of the correspondence table 109 will be described later.

In addition, control data NIT 100, program allocation table (PAT) 101, and program map table (PMT) 111 through PMT 114 for multiplexing the packetized data are multiplexed therein. The data corresponding to the services 1011, 1012, 1013 and 1014 thus multiplexed can be separated by using these control data as described later. Control data EIT 121 through EIT 124, each representing program information, and control data representing the present time TDT 105, are also multiplexed therein. Other control data such as scrambling information and others are multiplexed therein even though these are not illustrated in the figures.

The control data PMT 111, PMT 112, PMT 113 and PMT 114, and control data EIT 121, EIT 122, EIT 123 and EIT 124 are the control data for the services 1011, 1012, 1013 and 1014 respectively.

Packetization of the control data, the video data, the audio data, HTML data and the correspondence table is carried out in the sequence of a line 18a shown in FIG. 4. In other words, packetization of these data is carried out by the following sequence: the control data NIT, PAT, PMTs, EITs, TDT, then the video data 81V, the audio data 81A, the video data 82V, the audio data 82A, the video data 83V, the audio data 83, and the HTML data 84 and the correspondence table 109. Upon completing the packetization in the first round, further rounds of packetization are carried out repeatedly under the same sequence starting from the control data NIT (see line 18b). The packetization process is carried out under a certain rule being predetermined (not shown).

A basic structure of the packetized data is shown in FIG. 5. Both the control data and the video/audio data being packetized have the structure as shown in FIG. 5. PIDs are assigned to the forefront of each packetized data. PIDs are the references which are uniquely assigned to each of the packetized data to distinguish each packetized data from other packetized data. The data content field packetized object data (e.g. the control data, video/audio data, HTML data and others).

Contents of the control data PMT 111 for multiplexing the packetized data of service 1011 are shown in FIG. 6. PIDs of both the video data 81V and the audio data 81A of the service 1011 are stored in the PMT 111. Similar PIDs as to these data in the services 1012, 1013 are stored respectively to in control data PMT 112, PMT 113.

As shown in FIG. 7, a PID and a module_id (described later) of data 84 in the service 1014 are stored in the PMT 114.

PIDs of PMT 111, PMT 112, PMT 113 and PMT 114, each corresponding to the services 1011, 1012, 1013 and 1014, are stored in the control data PAT as shown in FIG. 8.

Transmission specifications defined by their frequencies, planes of polarization and the like as to all the transport streams 1010 through 1040, and a list of the services multiplexed in each of the transport streams are described in the control data NIT as shown in FIG. 9. This allows the receiver to learn what kinds of services are included in each of the transport streams.

1-1-4. Outline of Receiver

Figure 10:
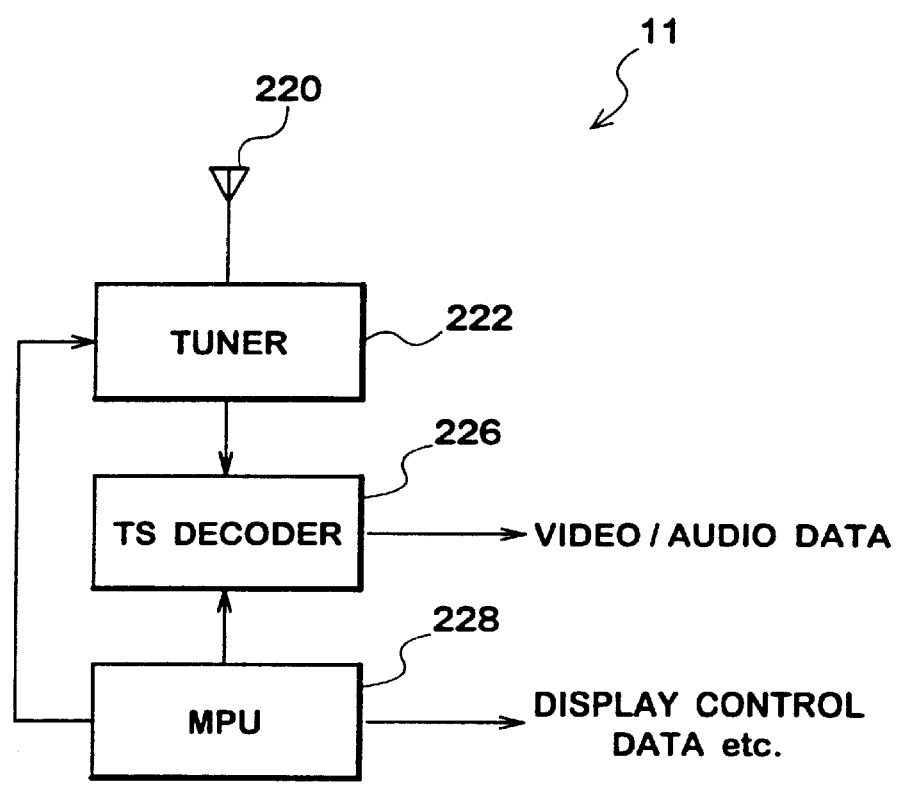
FIG. 10 is a schematic block diagram of a receiver.

Functions of the receiver 11 shown in FIG. 1 are outlined with reference to FIG. 10. In the receiver 11, a desired transport stream is selected by a tuner 222, and data concerned with a desired service contained in the selected transport stream is separated therefrom with a transport decoder 226.

Further, a micro processing unit (hereinafter referred to as MPU) 228 sets PIDs of video/audio data of the desired service into the transport decoder 226. In response to the setting, the transport decoder 226 outputs the video/audio data of the desired service. The control data thus separated are provided to the MPU 228 when PIDs of the control data are set into the transport decoder 226.

Operations of the receiver 1 which currently receives the service 1033 contained in the transport stream 1030, and receives a command to switch it to another service 1012 included in the transport stream 1010, will be described herein.

The MPU 228 controls the transport decoder 226 to obtain the control data NIT (i.e., by setting a PID of the control data NIT into the transport decoder 226). The description of the control data NIT tells that the service 1012 is multiplexed in the transport stream 1010 (see FIG. 9). In response to the description, the MPU 228 controls the tuner 222 to receive the transport stream 1010. PIDs of video and audio data in the desired service 1012 are obtained as a result of separating the control data PAT and PMT 112 by controlling the transport decoder 226 with the MPU 228. The MPU 228 controls the transport decoder 226 to output the video and the audio data of the desired service 1012 by setting filtering conditions (the conditions for performing filtering) to select these PIDs into the transport decoder 226.

Switching of the received service is carried out as described above.

The MPU 228, further controls the transport decoder 226 to obtain the control data EIT when a command for displaying a program schedule and program information is provided to the MPU 228. In addition, the MPU 228 controls peripherals to display the program information and related information in accordance with the control data EIT thus obtained.

1-2. First Embodiment 1-2-1. Transmitter

Figure 11:
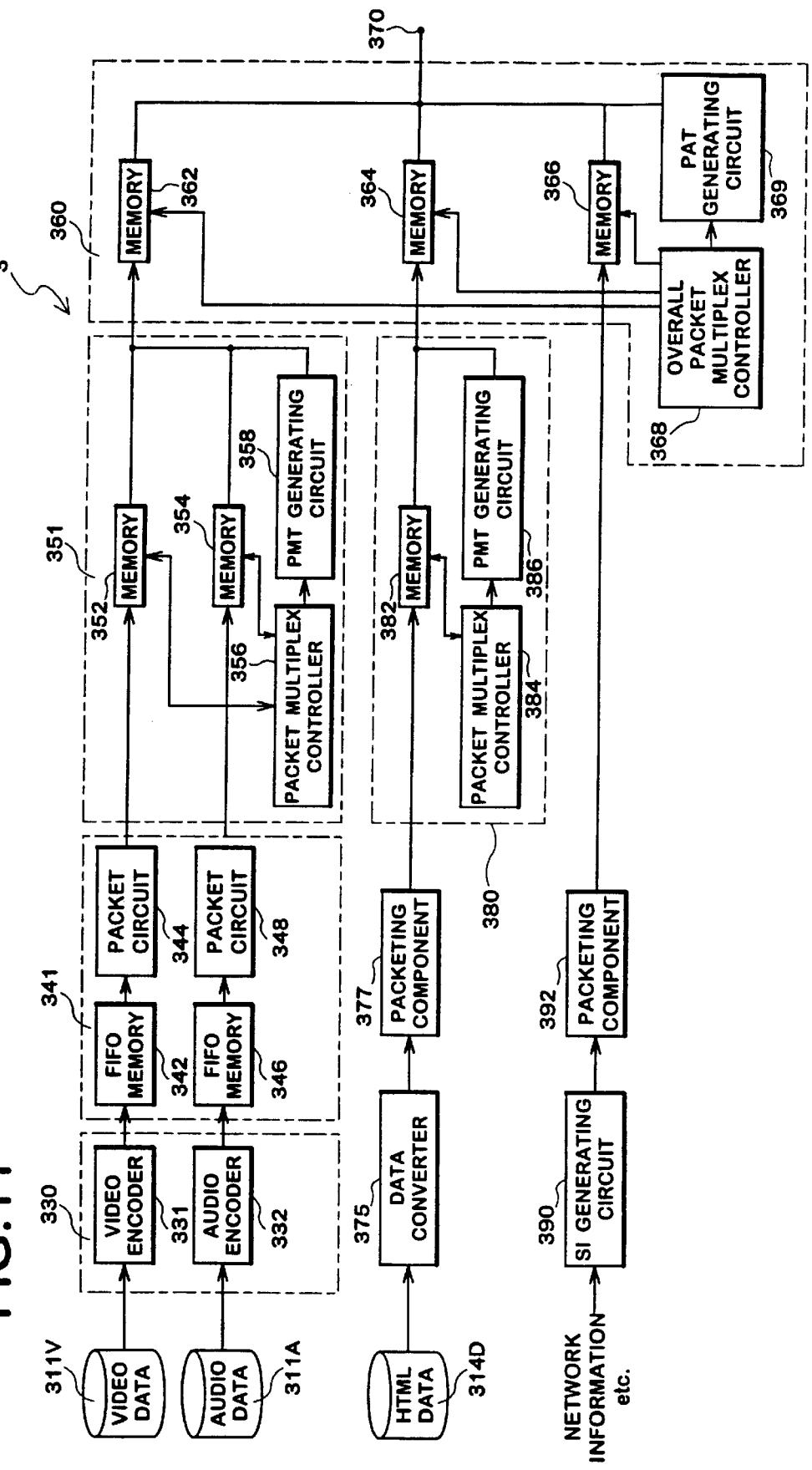
FIG. 11 is a detailed block diagram illustrating a hardware structure of the transmitter.

FIG. 11 is a detailed block diagram illustrating a hardware structure of the transmitter 3 shown in FIG. 3. The transmitter 3 in this embodiment is used for a digital broadcasting system compliant with MPEG 2 standard, Digital Storage Media Command and Control (hereinafter referred to as DSM-CC) specification, and Digital Video Broadcasting (hereinafter referred to as DVB) specification for Services Information (hereinafter referred to as DVB-SI). Definition of MPEG 2 standard is found in the international standards organization documents ISO/IEC 13818-1 and ISO/IEC 13818-2. The document ISO/IEC 13818-6 specifies the DSM-CC specification. Further, the document ETSI ETS 300 468 (which is similar to document of Association of Radio Industries and Businesses STD-B2 version 1.0 in Japan) defines the DVB-SI specification.

The transmitter 3 is a satellite digital transmitter capable of transmitting HTML data together with video data and audio data under a multiplexed format. FIG. 11 shows the structures within the transmitter 3 supporting the services 1011 and 1014. The structures of services 1012 and 1013 (not shown) are similar to that of service 1011.

The video data of the service 1011 is stored in a video data storage unit 311V. The video data are compressed with a video encoder 331. The video data thus compressed is provided to a first-in first-out (hereinafter referred to as FIFO) memory 342 as an elementary stream at a varied rate. The FIFO memory 342 outputs the elementary stream of video data to a packeting circuit 344 at a fixed rate.

The packet circuit 344 segments the elementary stream of the video data into a plurality of packets each having a fixed length (e.g. 188 bytes), and writes the packets into a memory 352 as packetized elementary streams (hereinafter referred to as PES). PIDs are assigned to each of the PESs as they are written into memory 352.

Similarly, audio data of the service 1011 is stored in an audio data storage unit 311A. The audio data are compressed with an audio encoder 332, and is provided to another FIFO memory 346. The compressed audio data are segmented into packets by packet circuit 348. Each packet has a fixed length, and is written into another memory 354 with its own PID as described above for the video data.

A packet multiplex controller 356 reads out PESs of both the video data and the audio data stored in the memories 352 and 354 in response to its encoding speed. Also, the controller 356 provides the PIDs assigned to the PESs of both the video data and the audio data to a PMT generating circuit 358. The PMT generating circuit 358 generates the control data PMT 111 as a result of receiving the PIDs. The assigned PIDs of both the video data and the audio data contained in the service are listed in the control data PMT. Both the PESs of the video and the audio data being read out from memory 352 and 354 and the corresponding control data PMT are stored in a memory 362 in a multiplex format under a time-sharing manner.

Thus, the video and the audio data of the service 1011 are multiplexed under a time-sharing manner and stored in the memory 362.

Figure 12:
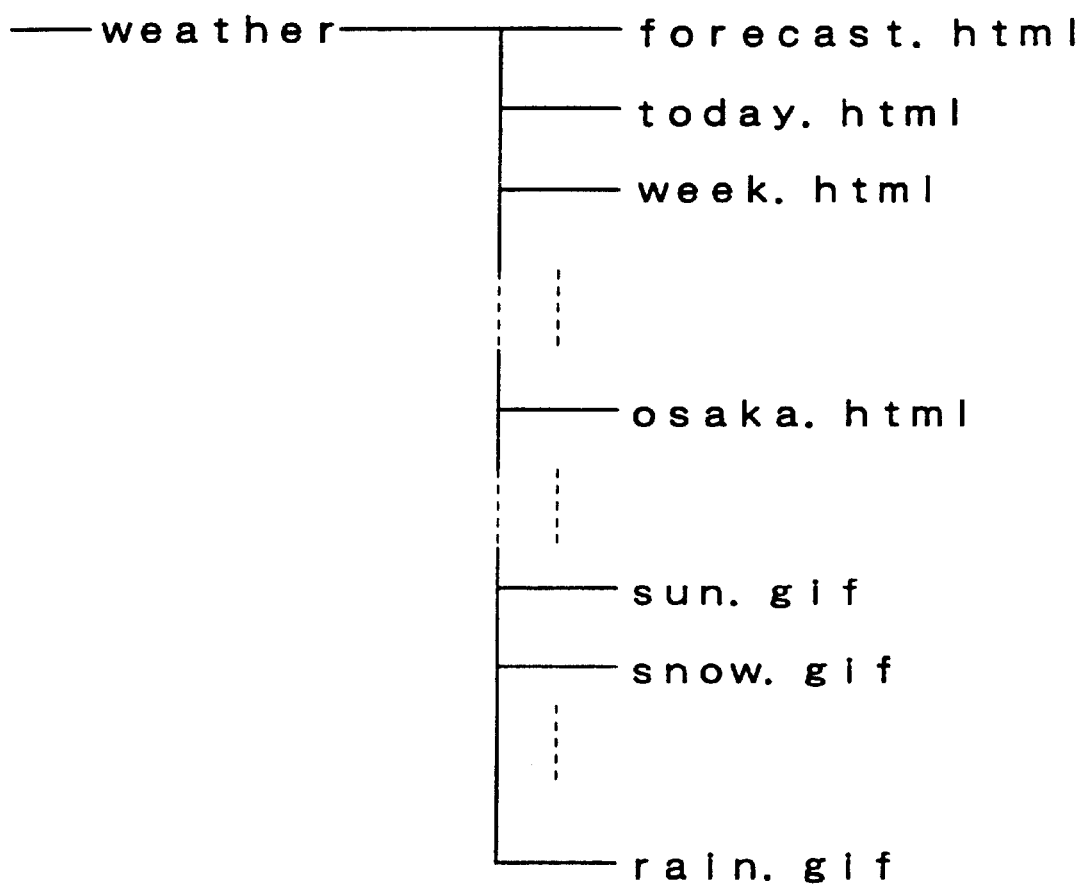
FIG. 12 shows a file structure stored in an HTML data storage unit.

As shown in FIG. 12, the plurality of HTML files include, e.g., such as "forecast.html","today.html" through "osaka.html" and the image files include, e.g., "sun.gif" through "rain.gif", both stored in a directory "¥weather". A plurality of HTML and image files are stored in a data storage unit 314D. In this way, images such as those shown in FIGS. 14A through 14C, can be displayed in accordance with the HTML files "forecast.html" "today.html" and "osaka.html" depicted respectively in FIG. 13A through FIG. 13C.

A data converter 375 sequentially assigns individual module identifiers to each of the files. The module identifiers are stored as an object header for each file. Data converter 375 also creates a correspondence table between the module_ids thus assigned and name of the files. In this embodiment, file_ids consisting of a total of four digits such as id="0001" (expressed in hexadecimal) are sequentially assigned to the files in the directory "weather" as shown in FIG. 15. The sequential assignment is made from the top (¥forecast.html) through the bottom file (not shown) of the directory "weather" as described later. Similarly, directory identifiers consisting of four digits such as id="0001" are assigned to the directory "¥weather" which includes each of the files. Together, the directory_id and the file_id make up the module_id. This is to definitely specify each of the files with an absolute path including name of the directory, as shown in FIG. 15. For example, a file "¥forecast.html" can definitely be specified as "¥weather¥forecast.html" "0001/0001". In this way, a correspondence table shown in FIG. 15 is created by assigning both the directory_id and the file_id to each module as its module_id.

The data converter 375 consist of a combination of hardware and software structures in this embodiment. FIG. 16 shows a typical example of the hardware structure of the data converter 375. A corresponding chart shown in FIG. 17A is stored in a ROM 375r. Steps performed in a software structure for data conversion used by the CPU 375c will be described with reference to FIG. 18.

Figure 18:
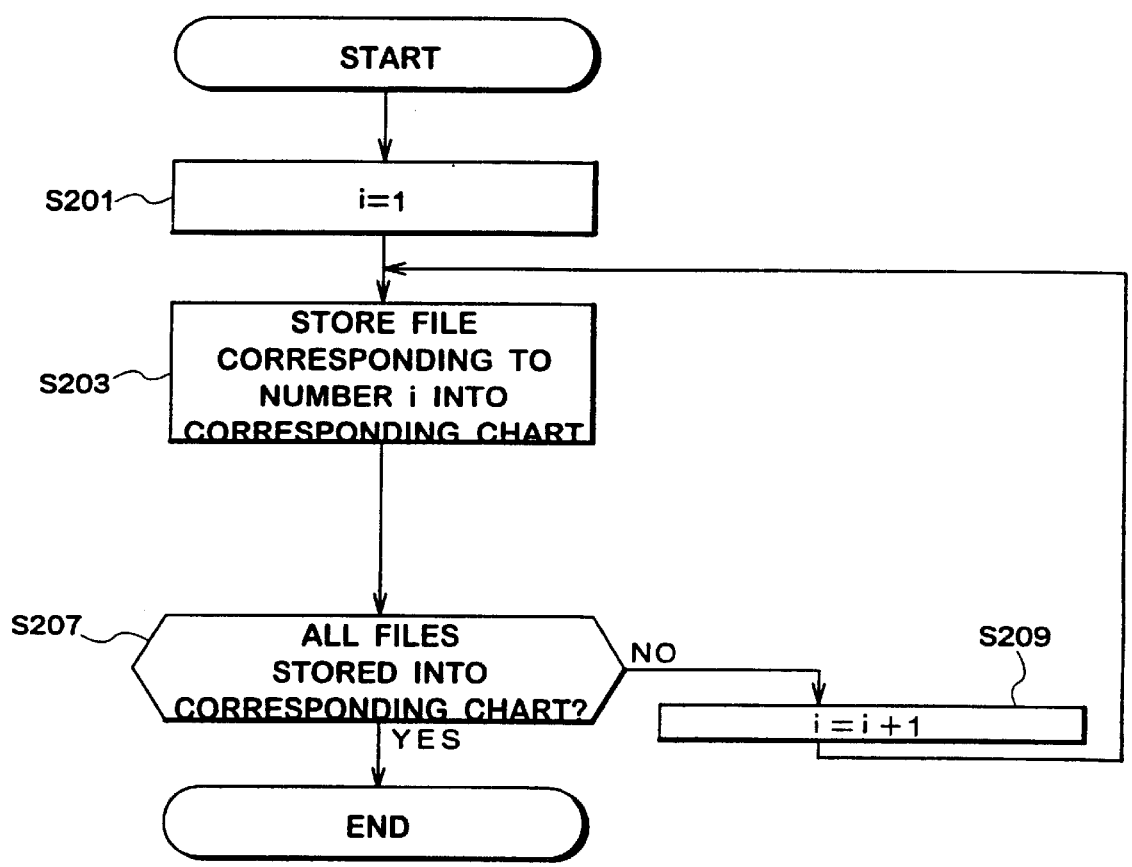
FIG. 18 is a flow chart for describing steps for creating the correspondence table with the data converter 375.

The CPU 375c initialize the counter i (step S201, in FIG. 18). Then, the file corresponding to the counter i is stored into the corresponding chart (step S203). For example, the top file "¥forecast.html" of the directory "¥weather" is stored into a region representing module number 1. Thus, the file "¥weather¥forecast.html" is assigned the module_id "0001/0001" as shown in FIG. 17B. In this embodiment, the module identifiers consist of the four digit file_id="0001" and the four digit directory_id="0001" as described above.

Next, the CPU 375c determines whether or not all the files are stored in the corresponding chart (step S207). If files have not been so stored, the CPU 375c increments the counter i by one, and stores the next file in the corresponding chart (step S209). Creation of the corresponding chart is completed when the step S203 is carried out to all the files.

The corresponding chart thus created is provided to a packeting component 377, shown in FIG. 11, together with each of the modules, and is stored in a memory 382 after packetization.

The data from the data converter 375 is packetized into packets having a fixed length by the packeting component 377. The packeting component 377 assigns individual PIDs to the section headers of all the packets generated. In this embodiment, the first four digits and the last four digits are respectively assigned as the PID and the table_id_extension region (field) because the module identifiers consist of the directory_id and the file_id (a total of eight digits).

In this way, the packets making up each file can definitely be specified without further consideration in the receiver by distinguishing them using the PID of each packet and the table_id_extension as a result of distinguishing the modules by the PID and the table_id_extension of each packet.

Further, the packeting component 377 also packetizes the corresponding chart created by the data converter 375 into packets having a fixed length. In other words, the corresponding chart is multiplexed as the correspondence table 109 depicted in FIG. 4.

There are table_id regions (fields) for setting own table_id, each having a predetermined data length, and table_id_extension regions (fields) for setting own table_id_extensions in the sections heads of each packet. Their own module_ids are stored in the table_id_extension fields as the table_id_extensions. The details of this relationship will be described later.

A packet multiplex controller 384 reads out the data stored in the memory 382 in response to its encoding speed. Also, the controller 384 provides PIDs assigned to the data to a PMT generating circuit 386.

The PMT generating circuit 386 generates a control data PMT 114 (see FIG. 4) as a result of receiving the PIDs. The PIDs for each packet related to contained in the service 1014 are listed in the control data PMT 114. Both the data thus read out from the memory 382 and the corresponding control data PMT are stored in a memory 364 in a multiplex format under a time-sharing manner. Additionally, the PMT 114 contains the module_id into an additional information field by the circuit 386, the module_id corresponding to an HTML file comprising a front page displayed initially in the service 1014 as shown in FIG 7. In this way, a table_id_extension "0x0001" is written to an additional information field in the PMT of the service 1014 as a file_id of the front page when the front page is represented by file "¥weather¥forecast.html", because the file "¥weather¥forecast.html" is replaced with a file_id "0001" during the packetization. Also, the file "¥weather¥forecast.html" is replaced respectively with a PID "0x0001" and a table_id_extension "0x0001" during the packetization.

1-2-2. Receiver
1-2-2-1. Hardware Structure

Figure 19:
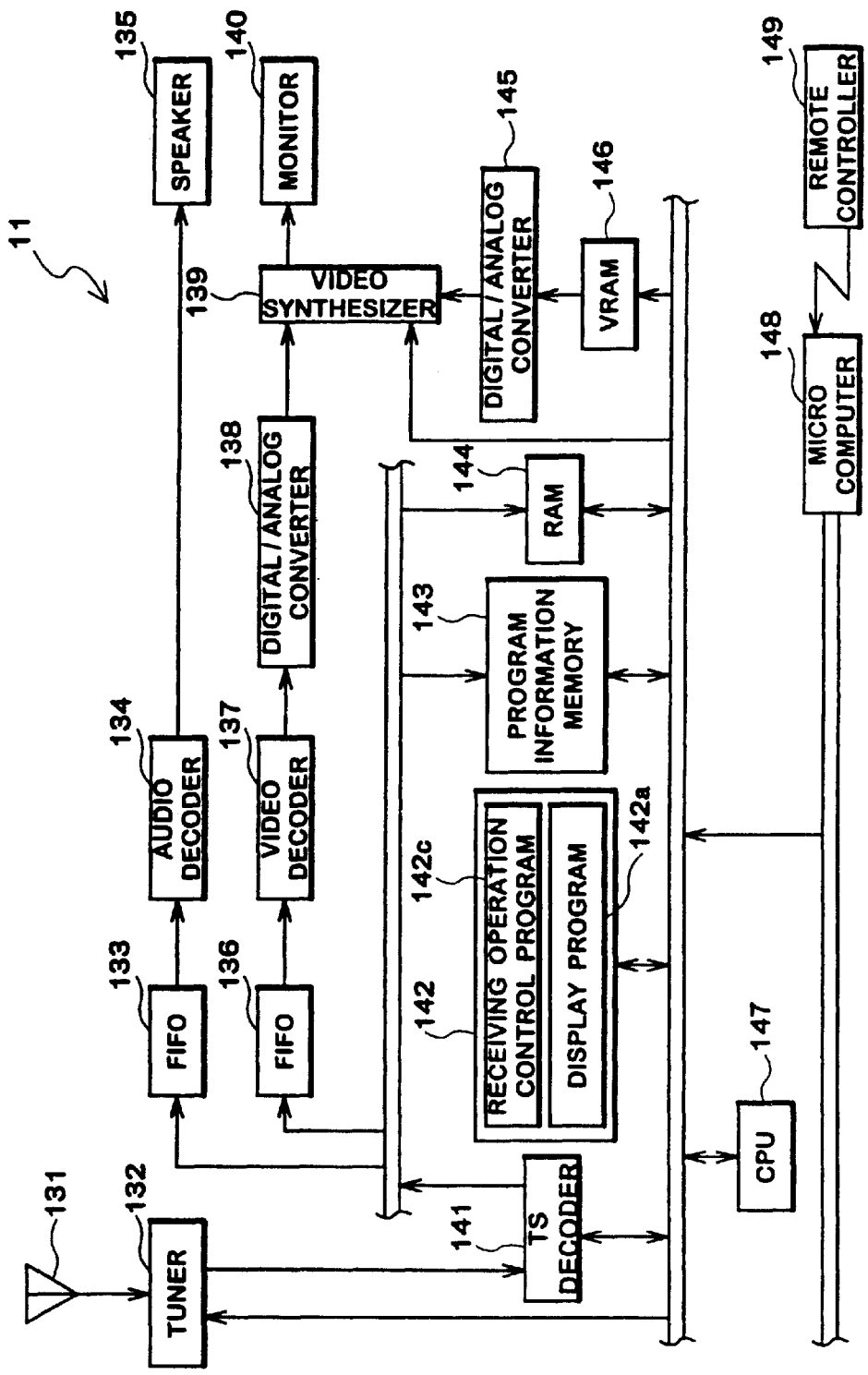
FIG. 19 is a detailed block diagram illustrating the hardware structure of the receiver.

The hardware structure of the receiver 11 depicted in FIG. 1 is shown in FIG. 19. The receiver 11 functions as a receiver of satellite broadcasting as well as a device for displaying HTML data on a monitor.

The function of the receiver 11 in receiving satellite broadcasting is similar to that of the conventional broadcasting receiver, as briefly described below. Radio waves transmitted by the transmitter are caught with an antenna 131, and the radio waves are supplied to a tuner 132. The tuner 132 selects one of the transport streams in accordance with a command of the CPU 147. Further, the tuner 132 carries out demodulation and error-correction and other relevant operations, and outputs the resultant signals to a transport decoder 141.

The transport decoder 141 only selects (i.e., filters) predetermined packets out of the packets multiplexed within the selected transport stream in accordance with PIDs set therein by the CPU 147. Packetized data for the system are contained in the multiplexed packets other than control data, video data and audio data because the system data are also multiplexed together with the video data and the audio data. The transport decoder 141 identifies these data in accordance with the data stored in the headers in each of the files, and both the control data and the system data are stored in a RAM 144. The RAM 144 stores the packetized data under the file basis so that the packetized data thus stored forms to one independent file.

Figure 20:
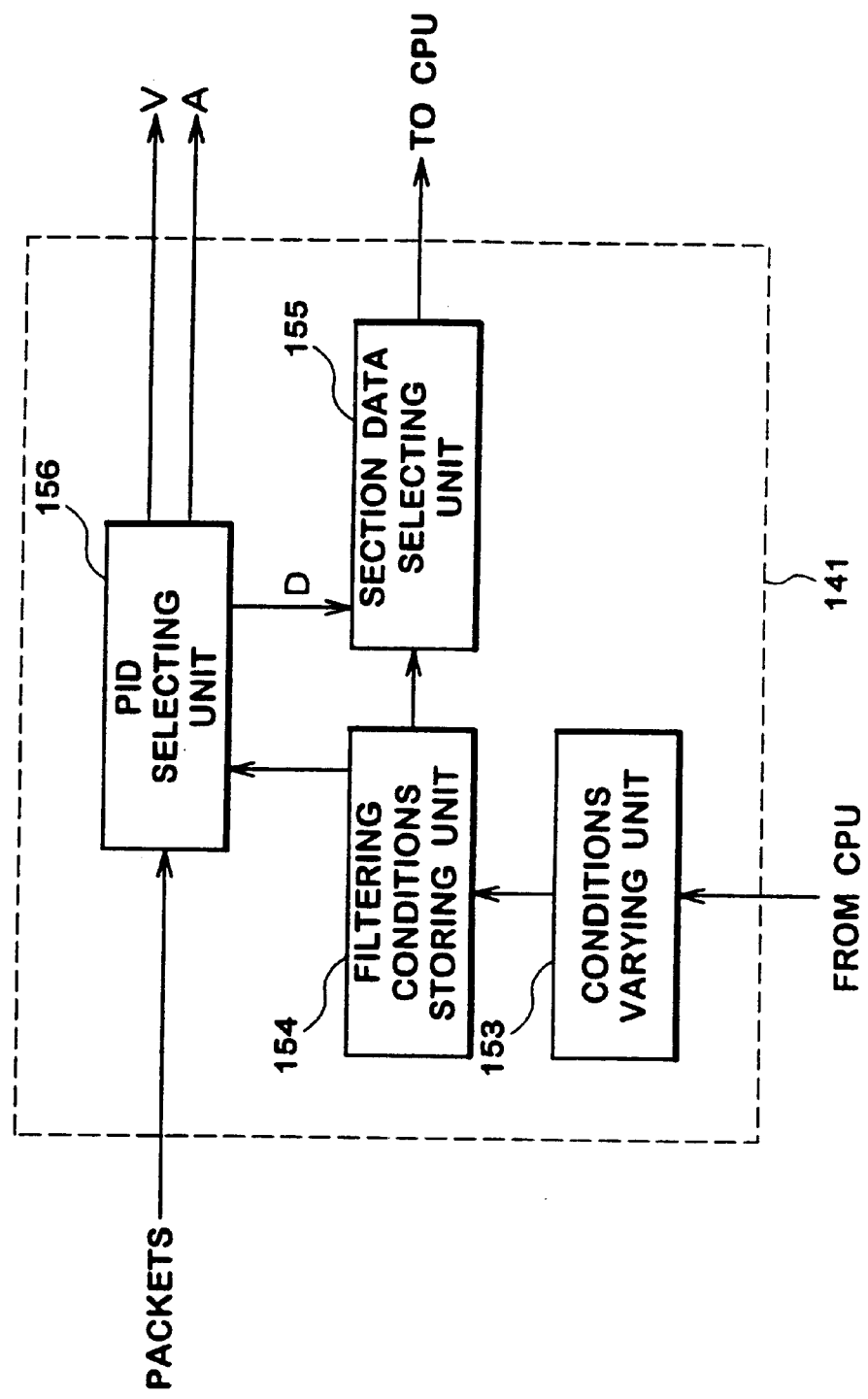
FIG. 20 is a functional block diagram of a transport stream decoder.

Filtering procedure carried out in the transport decoder 141 will be described with reference to FIG. 20. Conditions for performing filtering of data (hereinafter referred to as filtering conditions) are stored in a filtering conditions storing unit 154. For example, PIDs, the table_id and table_id_extensions of the packets to be selected are stored therein. A PID selecting unit 156 selects the packets having predetermined PIDs in accordance with the filtering conditions stored in the filtering conditions storing unit 154. The packets of video data and that of audio data, are respectively outputted to a video decoder 137 and an audio decoder 134. Packets of HTML or image data in a selection format with the selected packets are outputted to a section data selecting unit 155 shown in FIG. 20. The section data selecting unit 155 only outputs the packets having predetermined table_id_extensions in accordance with the filtering conditions stored in the filtering conditions storing unit 154.

A conditions varying unit 153 varies filtering conditions stored in the filtering conditions storing unit 154 in accordance with a rewrite command outputted by the CPU 147 as shown in FIG. 19.

The video data are provided to the video decoder 137 through the FIFO memory 136 depicted in FIG. 19, and are decompressed or expanded thereby. The video data are converted into analog signals with a digital/analog converter (hereinafter referred to as D/A converter) 138, and the analog signals are displayed on a monitor 140 such as a liquid crystal display, a cathode ray tube and the like through a video synthesizer 139. The data representing characters stored in a video RAM (hereinafter referred to as VRAM) are converted into analog signals with another D/A converter 145, and the analog signals are provided to the video synthesizer 139. In this way, characters can be overlapped on images displayed on the monitor.

The audio data, on the contrary, are provided to the audio decoder 134 through another FIFO memory 133, and are decompressed or expanded thereby. The audio data are outputted through a speaker 135 as actual sound.

A remote controller 149 stores the following commands such as initialization of watching, designation of services, instruction for category search for the program information or the like, and the controller 149 outputs them to a microcomputer 148 installed in the main part of the receiver 11.

The CPU 147 controls the tuner 132, the transport decoder 141 and relevant components in accordance with a receiving operation control program 142c and a display program 142a both stored in a ROM 142. These programs may be capable of stand alone operation, or may require an operating system (such as Windows™ CE by Microsoft™ Inc.) as a premise.

1-2-2-2. Receiving Operation Control Program

Figure 21:
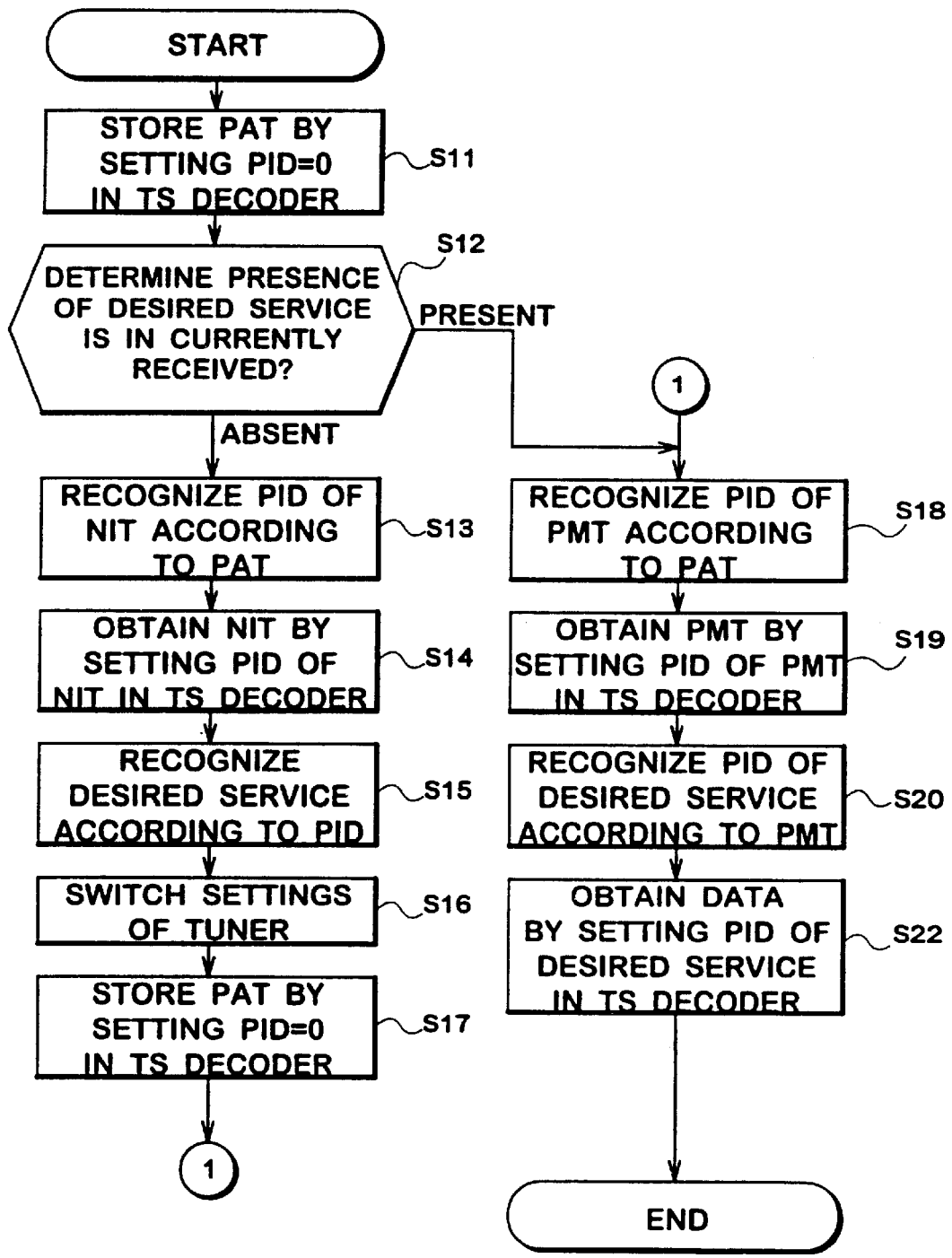
FIG. 21 is a flow chart for describing steps of a receiving operation control program.

An embodiment of the receiving operation control program 142c used for carrying out receiving operations will be described with reference to FIG. 19 and FIG. 21. Operations necessary to switch the receiver 11 from receiving the service 1013 contained in the transport stream 1010, to receiving another service 1011 included in the transport stream 1010, will be described herein. A switching command is sent by the remote controller 149 or a control panel (not shown) to the CPU 147. The switching command is provided to the CPU 147 through a microcomputer 148 (as shown in FIG. 19). In response to the switching command, the CPU 147 sets PIDs of the control data PAT into a register (not shown) for separating the control data in the transport decoder 141. The PID of the control data PAT has a fixed value such as "0x0000". In this way, contents of the control data PAT being separated are stored in the RAM 144 under the control of the transport decoder 141 (step S11, in FIG. 21). A list of the services multiplexed in the transport stream currently received are shown in the contents of the control data PAT (see FIG. 8). The CPU 147 determines that the desired service 1011 is multiplexed in the transport stream 1010 currently received by referring the list. The CPU 147 continues processing from step S12 to step S18.

In the step S18, the CPU 147 obtains PIDs of the control data PMT in the desired service 1011 in accordance with the contents of the control data PAT. As a result, the CPU 147 recognizes that id "0x0011" is for a PID of the control data PMT in the desired service 1011 as shown in FIG. 8. Further, the CPU 147 sets the PID "0x0011" of the control data PMT into the register for separating the control data in the transport decoder 141 (step S19). Hence, the control data PMT 111 in the service 1011 can be separated from other data, and contents of which can be stored in the RAM 144.

Next, the CPU 147 recognizes PIDs "0x0022" and "0x0024" of the video data 81V and the audio data 81A respectively, in accordance with the PMT for the service 1011 as shown in FIG. 6 (step S20).

Then, the CPU 147 sets both the PIDs "0x0022" and "0x0024" into the filtering conditions storing unit 154 (see FIG. 20) in the transport decoder 141 (step S22). In this way, the transport decoder 141 can selectively output both the video data 81V and the audio data 81A, both being required.

The CPU 147 proceeds its processing to step S13 if the desired service is not multiplexed in the transport stream currently received in step S12. Further, the CPU 147 obtains PIDs of the control data NIT assigned in the control data PAT. In accordance with the PIDs thus obtained, the CPU 147 obtains the control data NIT, and determines whether the desired service contained in any of the transport streams (step S14, step S15).

The CPU 147 switches a setting of the tuner 34 so as to receive the transport stream which contains the desired service (step S16). Then, the CPU 147 obtains the control data PAT of the transport stream (step S17). Hereafter, steps following to step S18 may be performed, as described above.

1-2-2-3. Display Program

The function for displaying HTML data on the monitor is accomplished by the CPU 147 and the display program 142a stored in the ROM 142.

Data obtained is stored in the RAM 144 when the data is system data under the control of the transport decoder 141. The CPU 147 starts performing the display program 142a when the system data is supplied by the transport decoder 141 because the CPU 147 recognizes data written in a section format as system data in this embodiment.

Steps performed by the display program 142a for displaying HTML files will be described with reference to FIG. 19 and FIG. 22.

At first, a switching command, for switching the operations to a service in which the HTML files are received, is outputted by the remote controller 149 in accordance with input of the operator who refers a program table. As a result of receiving the command, the CPU 147 varies filtering conditions in the tuner 132 and the transport decoder 141 respectively.

For example, the operator selects a service id="001" with the remote controller 149 when he/she find out a weather forecast which provides interactive service can be specified by the service id="001" by referring to the program table.

Control data PAT is obtained by varying the filtering conditions of the transport decoder 141 to PID="0x0000" with the CPU 147 because the PID of the PAT is a fixed value "0x0000". Steps for obtaining the control data PAT are performed after switching the tuner 132 so as to receive a transport stream in which a service specified by the service id="001" is multiplexed as a result of obtaining the control data NIT thereof when the service having the service id="001" is multiplexed in the transport stream other than the transport stream currently received.

A PMT of the service specified by the service id="001" can be obtained once the control data PAT is obtained. As a result of obtaining the PMT, an id of the transport stream in which the service is multiplexed, PIDs of packets in which data related to the service is stored, and table_id_extensions of the file which are displayed at first can automatically be obtained. Under this logic, the CPU 147 varies filtering conditions in the transport decoder 141 while switching the tuner 132 in order to receive the service. In this way, receipt of a service specified by a service id "001" is started.

For instance, the CPU 147 varies filtering conditions in the transport decoder 141 so as to select packets of a PID "0x0001", that of a table_id "0x3C", and that of a table_id_extension "0x0001" shown in FIG. 23A when the PID, the table_id, and the table_id_extension of the service specified by the service id="001" are respectively "0x0001", "0x3C", and "0x0001" according to the PMT. The table_id is a fixed value of "0x3C". Further, the numbers "0x" means that the numbers following thereto are expressed in hexadecimal in this embodiment.

Consequently, the transport decoder 141 selects the packets having their PIDs, table_id, and table_id_extension as "0x0001", "0x3C", and "0x0001" respectively. Selective reception of the HTML files shown in FIG. 13A according to the filtering conditions will be described below as an example.

Figure 22:
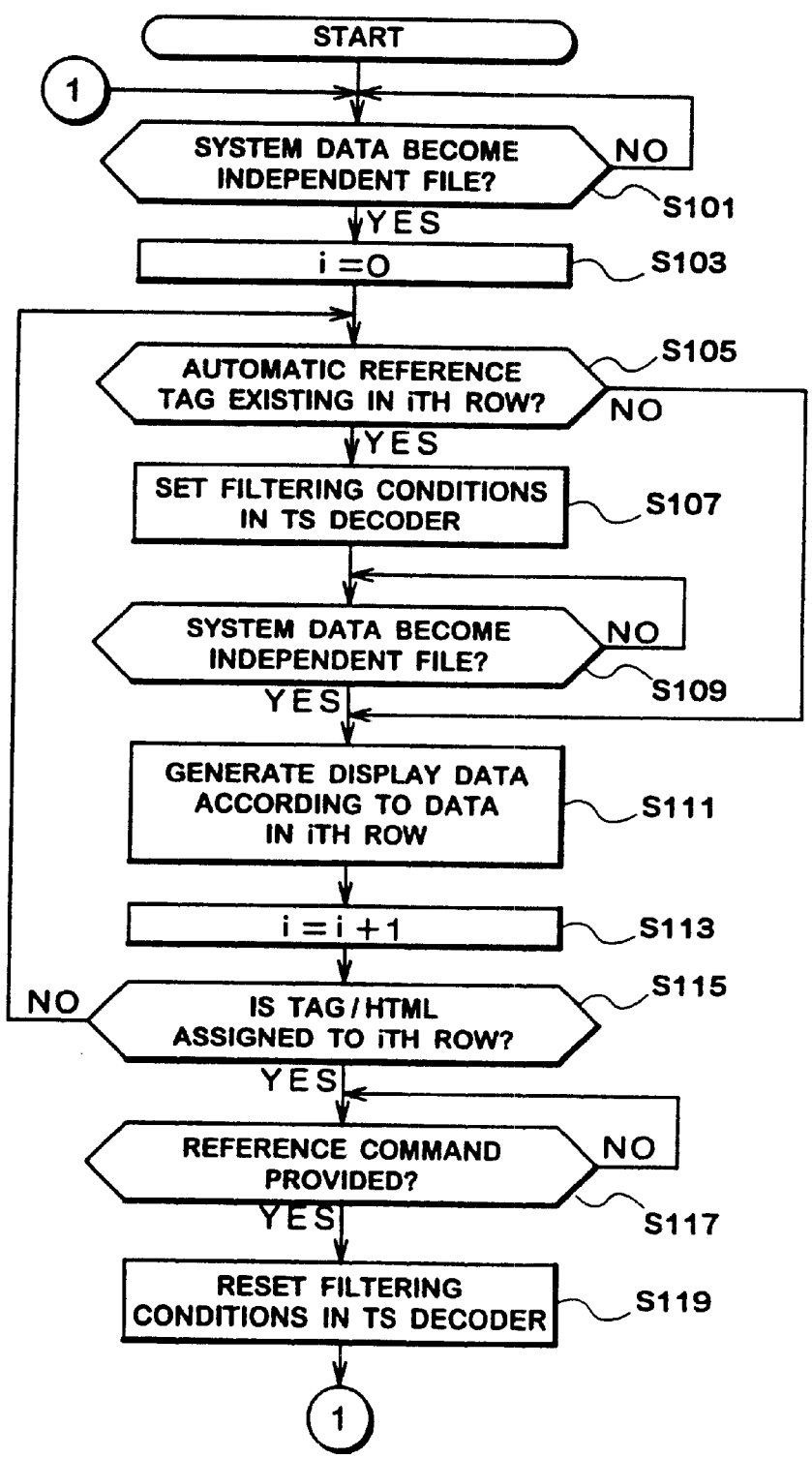
FIG. 22 is a flow chart for describing steps of a display program.

The CPU 147 judges whether or not the system data stored in the RAM 144 comes to one independent file (step S101, in FIG. 22). In a concrete form, the judgement can be carried out by detecting whether or not the last block of the system data is received. The counter i is initialized once the one independent file is received (step S103). The CPU 147 detects existence of an automatic reference tag in the HTML data of the file located in i th row thereof (step S105). The automatic reference tag is defined as image tags for referring other file(s) regardless of the operations by the operator. Operations related to the automatic reference tag will be described later. Since the counter i was initially set to 0, the first time CPU 147 executes step S105, it will move onto step Sill and generate display data according to the data located in the i th row. The display data is stored to a VRAM 146, then converted into analog data by the D/A converter 145. After conversion to analog data, the display data is provided to the video synthesizer 139. The video synthesizer 139 outputs display data which is synthesized with the data from the video decoder 137 thereby to the monitor 140. Hence, a image according to the data located i th row is displayed on the monitor 140.

Next, the CPU 147 increments the counter i by one (step S113), and judges whether or not a tag "</html>" is assigned to the i th row (step S115). The CPU 147 repeats steps following to step S105. In this way, images according to data located each of the rows are displayed sequentially on the monitor 140 (see FIG. 19).

Figure 14A:
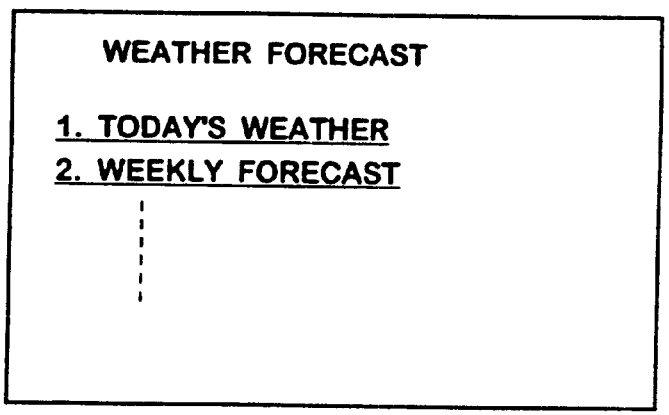
FIG. 14A, FIG. 14B, and FIG. 14C are examples of images displayed on a screen according to the data stored in the HTML files.

An image such as that shown in FIG. 14A is displayed on the monitor 140 when the tag "</html>" is assigned to the i th row that forms the last row in step S115. The operator operates the remote controller 149 to obtain detailed information which the operator desires during the display of such image. For example, the CPU 147 resets the filtering conditions in step S117 in FIG. 22 as a result of making a judgment that the reference command(s) for referring other file(s) is provided thereto when the operator selects detailed information of "1. Today's weather" (step S119).

In a concrete form, the CPU 147 varies the filtering conditions so as to select a file "¥weather¥today.html" in accordance with the source codes shown in FIG. 13A when the operator selects a region displaying the information of "1. Today's weather" by the remote controller. Practically, the filtering conditions are varied as described below. The CPU 147 obtains a module identifier of the file specified by "¥weather¥today.html" by referring to the correspondence table depicted in FIG. 15. In this case, assignment of PID "0001" to the file "¥weather¥today.html" is recognized by the CPU 147, and the file having a table_id_extension "0x0002" assigned to its section header is transmitted. Therefore, the filtering conditions for the transport decoder 141 are set so as to selectively receive packets having a table_id_extension "0x0002" from the conditions to receive the packets having a table_id_extension "0x0001" as shown in FIG. 23B. In this way, packets having the table_id_extension "0x0002" can be received. No variation is required to the PID because it remains the same.

Figure 14B:
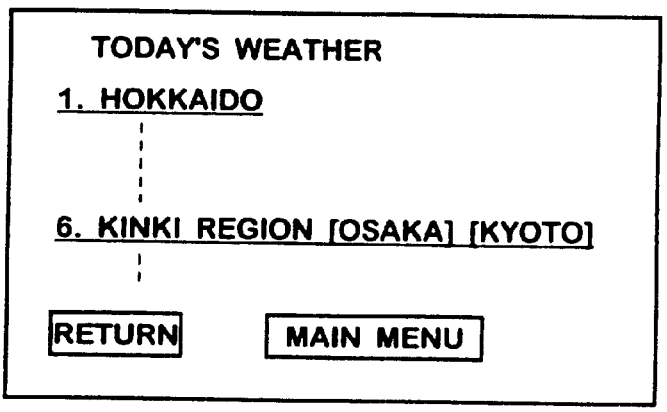
Figure 14C:
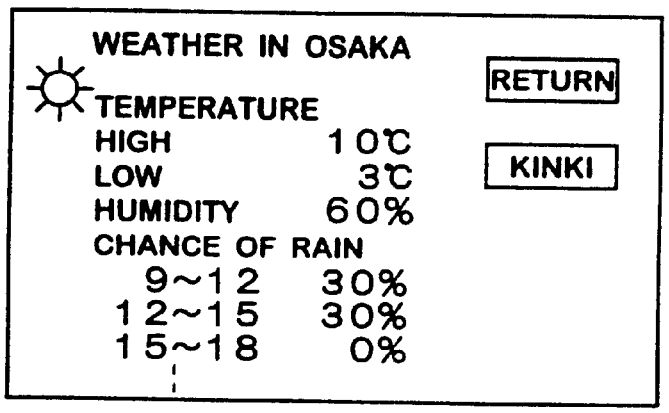

Thereafter, another image shown in FIG. 14B is displayed on the monitor 140 according to the HTML file depicted in FIG. 13B by performing steps following to step S101 repeatedly.

Hence, a file(s) required for displaying desired image(s) can be received at each time desired and is displayed by actively varying the filtering conditions in the transport decoder 141. In this way, it is not necessary to store all the files for the display once in the storing part as in the conventional art.

Another image, according to the HTML file depicted in FIG. 13C which is selectively received in accordance with the filtering conditions shown in FIG. 23C, is displayed when the operator selects "OSAKA" during the display of the image shown in FIG. 14B. An <img src> tag as the automatic reference tag is assigned in the HTML file thus received. As a result, the CPU 147 performs a series of steps from step S107 to step S109 in FIG. 22 according to the row in which the tag is located. The functions performed in step S109 and step S107 are the same as step S101 and step S119 respectively.

The CPU 147 additionally sets filtering conditions for the transport decoder 141 so as to select a desired HTML file(s) when it detects existence of the automatic reference tag in the HTML file(s) in step S105. In a concrete form, it is preferred to select another file specified by "0001/1000.gif" in addition to the HTML file shown in FIG. 13C because a plurality of conditions may be set as the filtering conditions for the transport decoder 141. The filtering conditions for the transport decoder 141 are set so as to selectively receive packets having a table_id_extension "0x1000".

Data in the received packets is temporarily stored in the RAM 144, and the CPU 147 outputs a display command according to the stored data. The data thus stored is displayed on the monitor 140 in accordance with the display command.

As described above, HTML files are transmitted repeatedly from the transmitter, and the files are received by the receiver when they are needed for reference, in this embodiment. In this way, the display of information can be switched dynamically by selectively receiving the files required solely at the receiver without storing all the HTML files even on a temporary basis.

Further, selection of the packets is performed by using a filtering function of the transport decoder 141. Thus, the CPU 147 may vary the filtering conditions in the transport decoder 141 by referring the correspondence table being received. Thus, only the packets contained in the files which are required to be referred need be extracted.

In addition, the filtering conditions can also be varied quickly even when an automatic reference tag(s) is assigned in the files. In this way, the files required can be displayed quickly.

Hence, the following procedures are performed within/between the transmitter and the receiver respectively in this embodiment. The transmitter transmits the correspondence table created thereby, while varying the name of each HTML file in accordance with the table. Also, the receiver receives the table transmitted by the transmitter and stores the table therein, and the receiver varies filtering conditions in the transport decoder by specifying the required file(s) with the CPU in accordance with the table. In this way, display of the HTML data transmitted via satellite broadcasting can be carried out according to interactive operations even when the receiver has a capability of storing just the required file(s).

1-3. Second Embodiment

In the first embodiment, the filtering conditions in the transport decoder 141 are varied by referring the correspondence table shown in FIG. 15 with the CPU 147. On the contrary, the second embodiment will disclose a data communication system capable of actively receiving packets consisting of a desired file(s) without transmitting the correspondence table. Instead, in this embodiment HTML data which are automatically changed their file names and transmitted the correspondence table.

1-3-1. Data Converting Operations in Transmitter

Data converting operations performed by the transmitter will be described hereunder. The hardware structure of the transmitter is identical with that of the transmitter described in the first embodiment. In this embodiment, the data converter 375 shown in FIG. 11 changes file names of the HTML data into individual module_ids described in the first embodiment.

Figure 24:
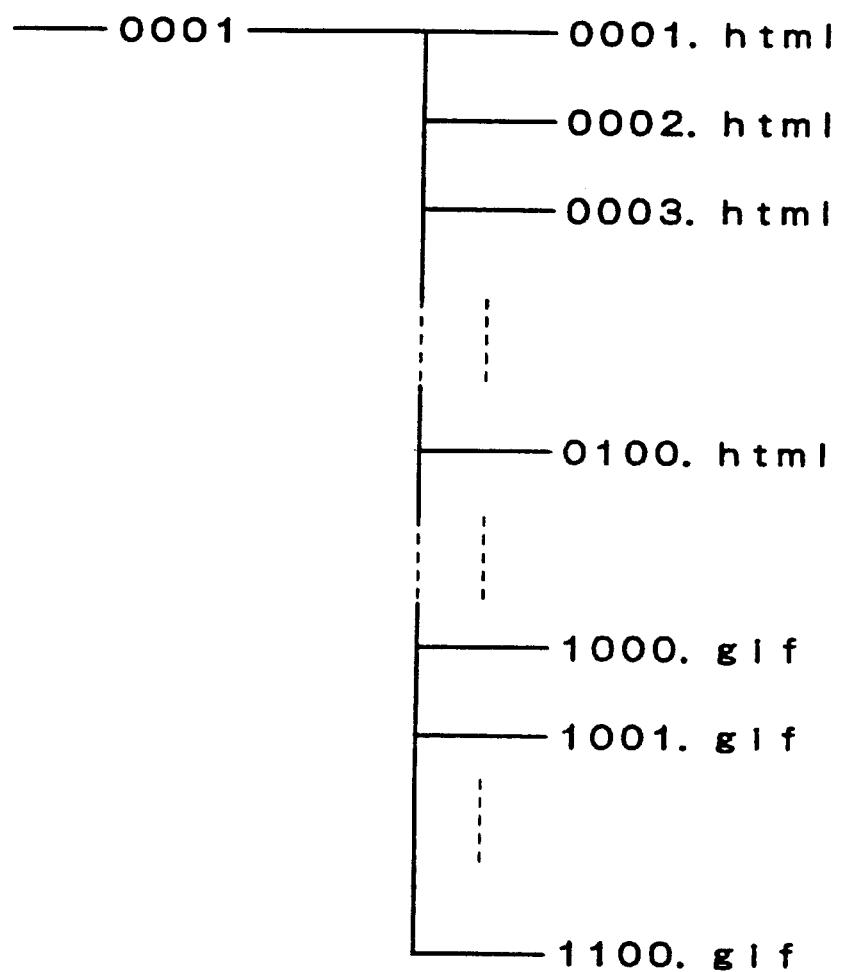
FIG. 24 shows files names after conversion.

For example, file names shown in FIG. 12 are changed into four digit numerals expressed in hexadecimal which can directly be selected by the transport decoder as shown in FIG. 24. File names "¥weather¥forecast.html", "¥weather¥today.html", . . . are changed respectively into "/0001/0001.html", "/0001/0002.html" . . . in turn. Further, file names to be referred in each of the HTML source files are changed so as to correspond the new file names. For example, a file name "¥weather¥today.html" is changed into "0001/0001.html" in the tag <A href/weather> as shown in FIG. 25A.

The data converter 375 is realized by a software structure using a CPU in this embodiment. Detailed description of the data converter 375 hardware structure is omitted hereunder because the hardware structure of the data converter 375 is identical to that used in the first embodiment. Steps performed in a program for conversion used by the CPU 375c will be described with reference to FIG. 16 and FIG. 26.

Figure 26:
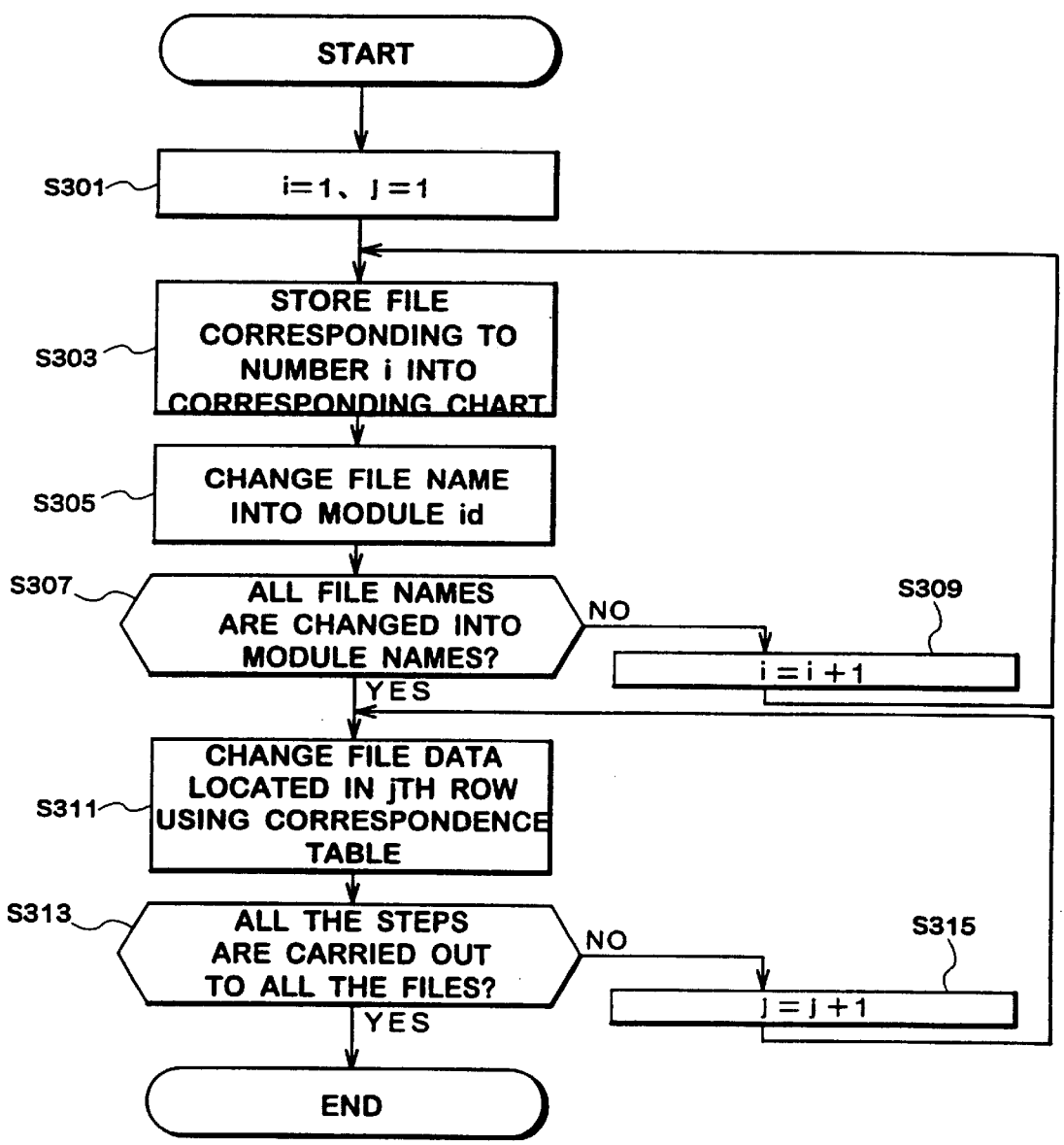
FIG. 26 is a flow chart for describing steps for changing a file name.

The CPU 375c initializes two counters i and j (step S301, in FIG. 26). Then, the file corresponding to the counter i is stored into the corresponding chart (step S303). The function performed in step S303 is the same as that carried out at step S203, in FIG. 18. Next, the CPU 375c changes a file name of the file located in i th row into a module name (step S305). For instance, the file name "¥weather¥forecast.html" is changed into the module name "/0001/0001.html".

Next, the CPU 375c determines whether or not all the file names are changed into modules names (step S307), increments the counter i by one if all the file names are not changed (step S309), and stores the next file in the corresponding chart (step S303). Change in file contents data of the file located in j th file in the correspondence table is performed by using the correspondence table (step S311) after the steps performed in step S303 and step S305 are carried out to all the files.

Next, the CPU 375c determines whether or not these steps are carried out to all the files (step S313), increments the counter j by one if these steps are not carried out to all the files (step S315), and changes the file data. Thus, after finishing step S311 to all the files, the data converting operations performed automatically are completed.

The corresponding chart thus created, is provided to the packeting component 377 shown in FIG. 11 together with each of the modules, and is stored in the memory 382 after packetization.

As described above, HTML files are transmitted repeatedly from the transmitter, and the files are received by the receiver when they are needed for reference, in this embodiment. In the transmitter, the module identifier assigned to each of headers are formed in character strings which can directly be recognized by the transport decoder so as to select each of the HTML files. A desired HTML file(s) is extracted by varying the filtering conditions according to the module identifier in the receiver. In this way, the display of information can be switched dynamically by selectively receiving the files required solely at the receiver without storing all the HTML files even on a temporary basis. Therefore, the files required can be displayed quickly.

In addition, the filtering conditions can also be varied quickly even when an automatic reference tag(s) is assigned in the files. In this way, only the files required can be displayed quickly.

1-3-2. Data Receiving Operations in Receiver

Detail description of the receiver is omitted hereunder because the hardware structure of the receiver is identical to that used in the first embodiment. In this embodiment, both the file names (absolute path) and the file names to be referenced are changed into the file names which can directly be recognized by the transport decoder. It is, therefore, not necessary for the receiver to refer the correspondence table. In this way, display according to a desired HTML file(s) can be carried out without giving too much load to the CPU as well as not storing all the HTML files in the receiver even when a plurality of HTML files are linked thereamong.

In order to apply the display program shown in FIG. 22 to the receiver, the step carried out at step S119 may be amended as follows. For example, the CPU 147 varies the filtering conditions according to the source codes shown in FIG. 25A so as to select a file "0001/0002.html" when the operator selects a region on which "1. Today's weather" is displayed by using the remote controller. The variation of the filtering conditions may be carried out in similar manner to that of the first embodiment such that the table_id_extension "0x0001" is varied to the table_id_extension "0x0002". No variation is required to the PID because it remains the same.

In this embodiment, each of the files is indicated in a full path format by adding a symbol "/" indicating a directory in which the file belongs therein. For example, the file "0001.html" in a directory "/0001" is indicated as "/0001/00001.html".

In this embodiment the desired HTML file(s) can be extracted by varying the filtering conditions in the receiver without using the correspondence table because identifiers of the HTML files are specified by numbers which can directly be recognized by the transport decoder. Therefore, all the desired data can be displayed quickly.

Further, each of the files belonging to a directory having the name of "¥weather" is described in this embodiment. Each of the files can definitely be specified by distinguishing the name of the directory and the relative path using the PID and the table_id_extension respectively. The specification of the files is not limited by that way, it can be carried out by applying plural number of module identifiers in turn which are prepared as the correspondence table shown in FIG. 17A in which each module identifier has different directory name when a plurality of files belong to different directories. Further, it can also be performed by applying the module identifier having the same directory name.

In addition, a module identifier having different directory name may be added even when a plurality of files belong to the same directory. This is advantageous because image data can be specified by just using PIDs when one of image data contained in a specific service is free of charge, and another image data in the service may be charged under a certain rate. In this way, the chargeable data can be distinguished from the data free of charge by referring PIDs. For example, in the case of defining data to be charged or free of charge such that from data "sport1. html" through data "sport9. html" are free of charge, and from data "spoort10. html" through data "sport29. html" are chargeable, these data are divide into two different groups in accordance with their PIDs. By grouping into two different groups such as a first data group consist of data "sport1. html" through data "sport9. html" which belong to the directory "0001" and a second data group formed of data "spoort10. html" through data "sport29. html" which belong to the directory "0002", only the data having their PIDs of 0002 can be charged under a certain rate.

1-4. Third Embodiment

Figure 27:
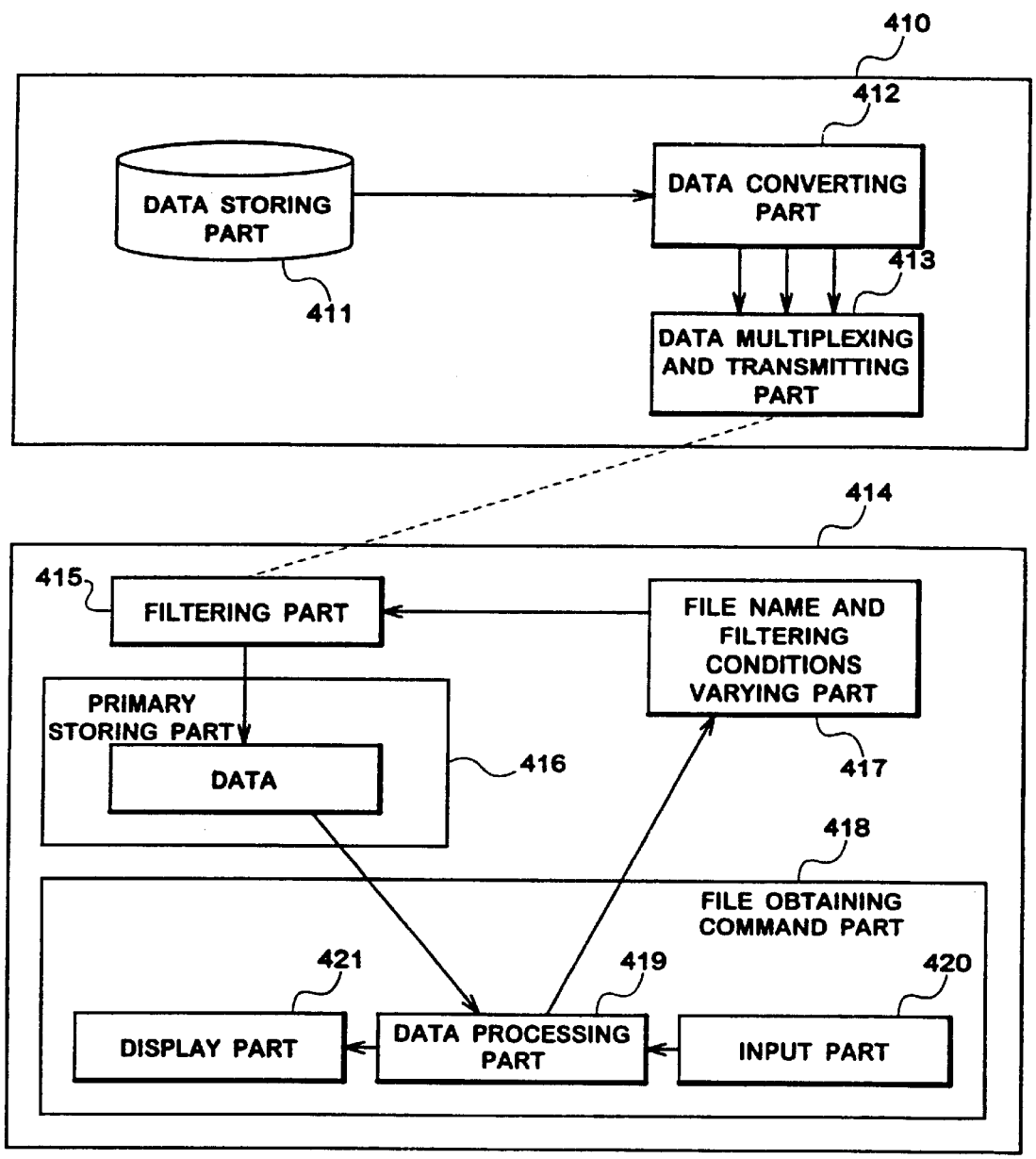
FIG. 27 is a block diagram showing an overall structure of a digital broadcasting system used in a third embodiment of the present invention.

FIG. 27 is a block diagram showing an overall structure of a digital broadcasting system to be used in a third embodiment of the present invention. The system comprises a data transmitter 410 and a data receiver 414.

1-4-1. Data Transmitter

The data transmitter 410 includes a data storing part 411, a data converting part 412, and a data multiplexing and transmitting part 413.

The storing part 411 is composed of a storing device e.g., a hard disk or an optical disk filing device, for storing digitized data therein. All the data are made correspondently so as to be distinguished one another without further consideration by their file names.

The converting part 412 converts data read out from the storing part 411 into down-load data block (hereinafter referred to as DDB) sections which are capable of being transmitted under the DSM-CC Data Carousel used as a protocol in an MPEG-2 transport stream. In a concrete form, the converting part 412 defines module_id which are specified by the file names stored in the storing part 411 into table_id_extension fields of section headers when the data is converted into the DDB sections. Further, the converting part 412 repeatedly outputs the converted data to the data multiplexing and transmitting part 413 so as to multiplex them thereby using the PIDs specified in accordance with the file names. The module_id are indicated in four digits in hexadecimal because the file names are expressed in the same manners.

FIG. 28A shows a structure of the data stored in the storing part 411. The file name of directory data 530 is "/0001" when it is expressed in a full path format. The directory data 530 includes a list of files contained in the directory, in this case, files "0001.html", "0002.html", and "0003.html" are in the data 530. File names of the files "0001.html" and "0002.html", and "0003.html" are expressed respectively in a full path format of "/0001/0001.html", "/0001/0002.html", and "/0001/0003.html". The file "/0001/0001.html" is HTML data having a row 532 requiring reference of a file "/0001/0002.html" and another row 533 requiring reference of a file "/0001/0003.html".

The files "/0001/0002.html" and "/0001/0003.html" are HTML files having data 534 and 535 respectively.

FIG. 28B shows a data structure of each module for outputting the directory data and the file data shown in FIG. 28A. In this embodiment, each of the output data is transmitted as U—U object because the DSM-CC standard is employed in this embodiment. The U—U object in the DSM-CC standard is defined as data in which object headers are assigned to either of the directory data or the file data.

In the FIG. 28B, a directory object 536 is a module including the directory data 530 and having module_id "0000". Similarly, file object 537 is a module including the HTML file data 531 and having module_id "0001". Further, another file object 538 is a module including the HTML file data 534 and having module_id "0002". Still further, another file object 539 is a module including the HTML file data 536 and having module_id "0003".

Figure 29:
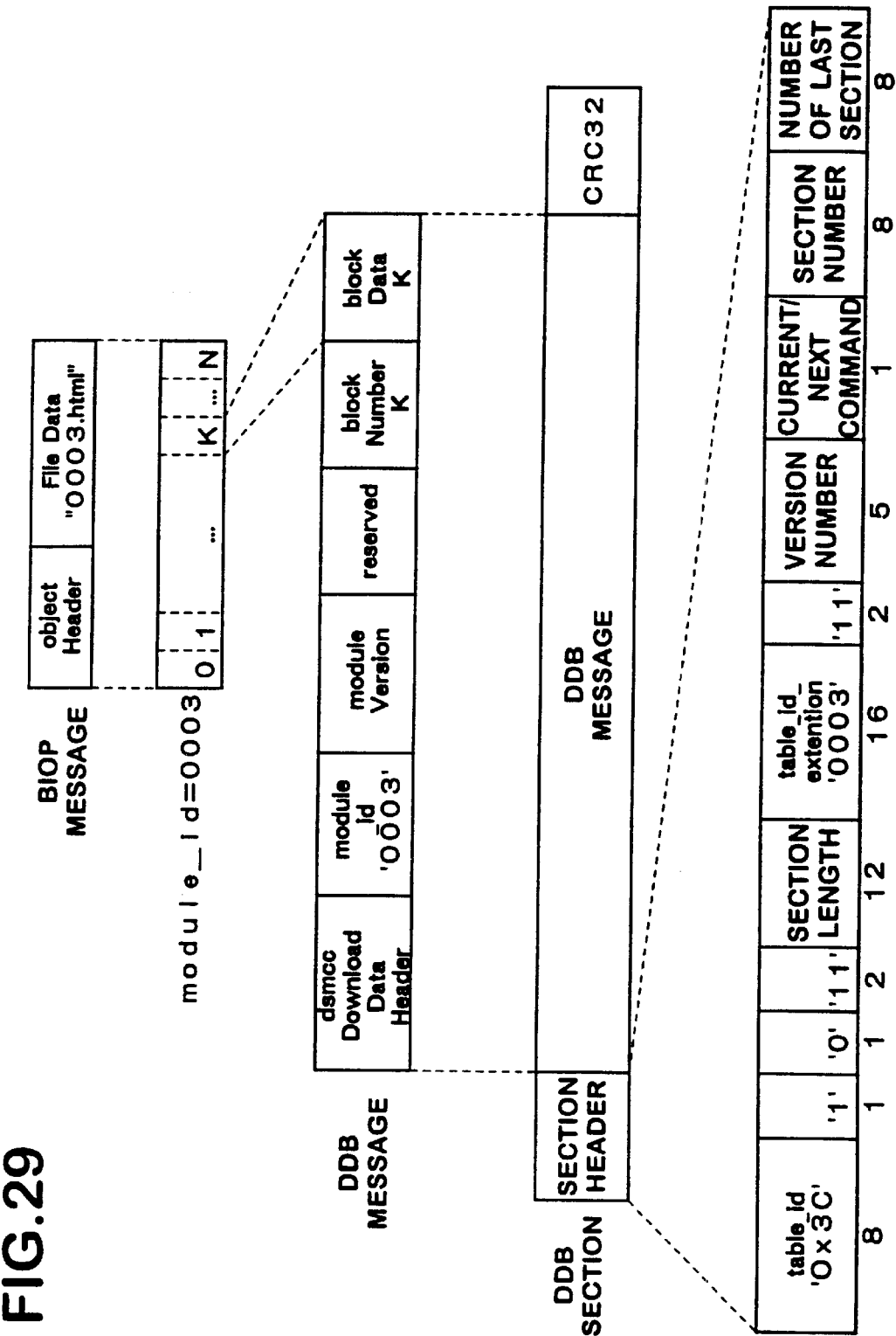
FIG. 29 shows a data structure of packetized data being transmitted.

FIG. 29 shows a data hierarchy of a DDB section when the DDB section is defined as a k th block as a result of dividing a module formed by assigning an object header to the file data 535 having module_id "0003" into "n" blocks.

In order to carry out filtering of sections with the hardware, one U—U object is transmitted as one broadcast inter-ORB protocol (BIOP) message in this embodiment.

Each module is divided into a plurality of blocks each having a fixed size (only the last block may be less than the fixed size), and the divided modules are repeatedly transmitted as DDB messages.

The DSM-CC standard further defines a format of transmission on the MPEG-2 transport stream. In order to easily realize the filtering in section at the receiver, a table_id and a table_id_extension are assigned to a header of the DDB section.

Next, data converting operations performed by the data converter 412 shown in FIG. 27 will be described hereunder. The DDB section includes a section header field and a DDB message field. The section header field has a table_id field storing a table_id of 8 bits and a table_id_extension field storing a table_id_extension of 16 bits. Block data dividing the file object 539 shown in FIG. 28B into a predetermined length (each having 4066 bites) are stored in the DDB message field.

Data "0x3C" is set into the table_id field because the table_id of the DDB section is defined as "0x3C", data "0003" forming a module_id of the object is set in the table_id_extension field.

Further, name of the files consisting the modules indicated in the full path format is specified by eight digits in hexadecimal in this embodiment. The data converter 412 assigns the last four digits (equivalent to data of 16 bits) to the table_id_extension field because the field is only capable of storing data of 16 bits. At that time, the data converter 412 outputs a command for multiplexing the first four digits by using its PID to the data multiplexing and transmitting part 413. For example, a file "/0001/0003.html" stored in the storing part 411 is packetized as a file having its PID "0001" and its table_id_extension "0003".

The data multiplexing and transmitting part 413 multiplexes a program allocation table (PAT) and a program map table (PMT) both defined by the MPEG-2 system, service information defined by the digital video broadcasting specification for service information (DVB-SI) standard, an audio video (AV) stream encoded under MPEG-2, a download information indication (DII) section defined by the DSM-CC standard all of which are not shown as input thereto, and a plurality of DDB sections outputted by the data converter 412 by using PIDs specified. And the data multiplexing and transmitting part 413 encodes the multiplexed data in response to the transmission path being used. In a concrete form, a channel code processing is performed as a channel coding method. For example, the method includes random processing, error correcting processing, and interleave processing. Thereafter, stream data obtained as a result of performing a modulation in digital format such as 64 quadrature amplitude modulation (QAM) is transmitted as radio waves.

In this way, the data transmitter 410 can transmit packetized HTML files repeatedly.

1-4-2. Data Receiver

Next, the structure and operations of the data receiver 414 depicted in FIG. 27 will be described hereunder. The data receiver 414 comprises a filtering part 415, a primary storing part 416 which stores various data, a filtering conditions varying part 417, and a file obtaining command part 418.

The filtering part 415 receives a desired transport stream out of the streams transmitted thereto as radio waves. Section data having exact match with the filtering conditioned being specified in the filtering part 415 is stored in the primary storing part 416. The filtering part 415 extracts only the packets having the specified PIDs and the packets in which both table_id and table_id_extension are defined out of the received transport stream.

The primary storing part 416 may be realized with a RAM, and it stores data being extracted by the filtering part 415.

The filtering conditions varying part 417 varies the filtering conditions stored in the filtering part 415 so as to extract the desired HTML file(s) in accordance with input of the operator.

A data processing part 419, an input part 420, and a display part 421 are included in the file obtaining command part 418.

The data processing part 419 generates images for displaying on a screen of the display part 421 as a result of performing data processing of multimedia data such as HTML data, bit map data or audio/video data. Also, the data processing part 419 performs data processing in accordance with a command signal outputted by the input part 420, and revises the images generated thereby as a result of the data processing. Further, the data processing part 419 outputs a command for varying the filtering conditions which includes name of a desired file to the filtering conditions varying part 417 when another file is required as a result of performing the data processing.

The input part 420 sends signals in response to the inputs of the operator to the data processing part 419.

The display part 421 displays the images generated by the data processing part 419 on its screen.

Figure 30:
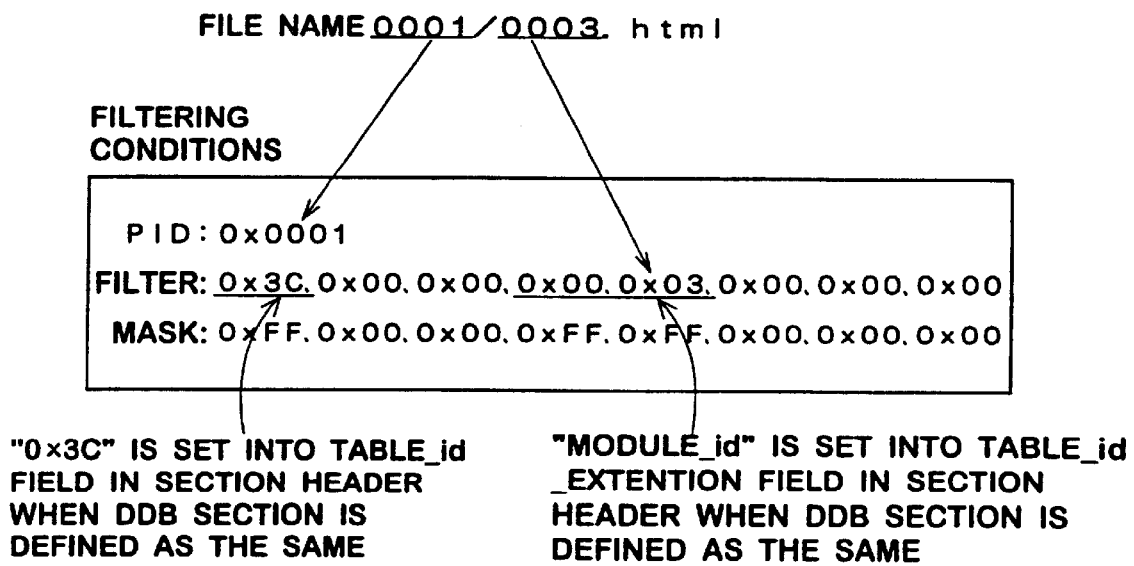
FIG. 30 is a detailed view for describing filtering conditions.

Next, functions of the filtering conditions varying part 417 installed in the data receiver are outlined with reference to FIG. 30. As shown in FIG. 30, the file name is composed of a PID and a module_id both arranged sequentially by using symbols "/" and "." as delimiters, each of the PID and the module_id being indicated adjacently into four digit numerals expressed in hexadecimal. For instance, data "0001" and "0003" respectively indicate a PID and a module_id in a file name "/0001/0003.html" specified by the file obtaining command part 418.

The filtering conditions varying part 417 depicted in FIG. 27 extracts a PID and a module_id out of the file name, and converts them into the filtering conditions shown in FIG. 30. The numbers except for both the PID and the module_id are fixed numbers. Upon setting the filtering conditions in the filtering part 415, sections, having their values of a table_id and that of table_id_extension field which are set in a mask bit of the section header as 1, both respectively "0x3C" and "0003" out of the packets being transmitted that have their PID "001", are stored in the primary storing part 416 by using the filtering function of the transport decoder. All the data contained in the file "/0001/0003.html" which is transmitted as the DDB sections can be obtained by setting the filtering conditions.

Sections consisting one complete file can positively be selected by referring their section numbers because section numbers of the sections and number of the last section are stored in the section header of each section.

The decision for determining whether or not blocks are part of a certain module is made by carrying out the following steps. The number of the last section in the module is stored in the section headers of the DDB section. Blocks, until one of which has the same number as the last section number, can be recognized as one complete module. However, there is a case that one module possibly consist of more than a total of 256 blocks which is defined as the maximum number for one module expressed in 8 bits when a specific module contains a large amount of data because the last section number is expressed in 8 bits. In such a case, the decision for determining the last blocks in the module can not be made because the section number of the DDB section take another round. In that case, one can make a decision that the blocks having section numbers more than 256 are also part of the module as a result of counting the section number.

1-4-3. Hardware Structure of Data Receiver

Figure 31:
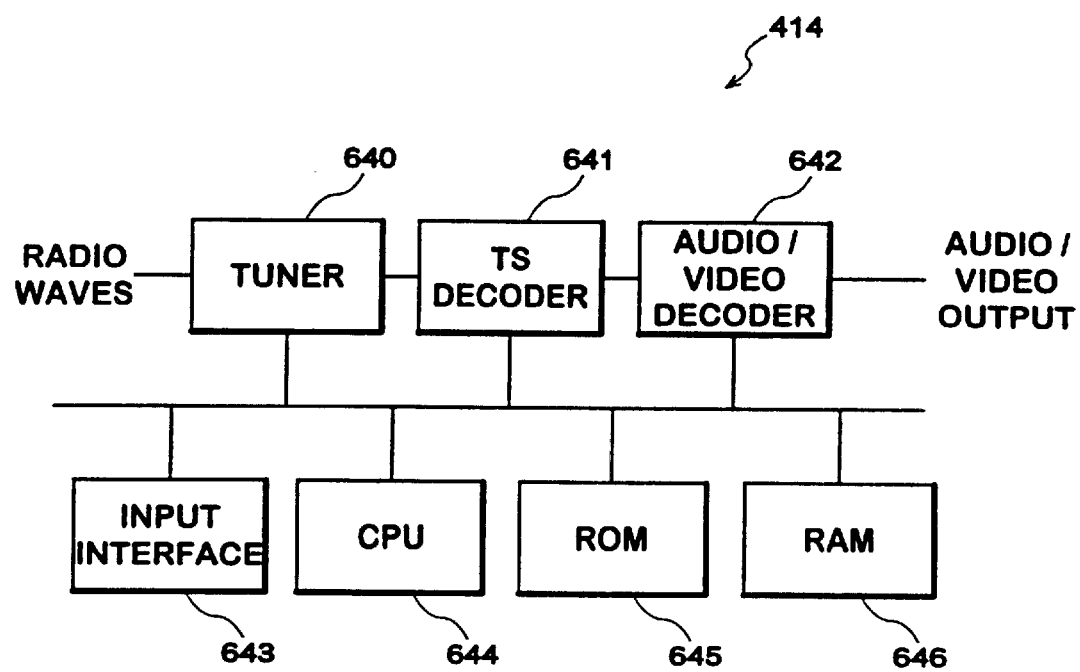
FIG. 31 is a schematic block diagram showing the hardware structure of a data receiver 414.

Next, the hardware structure of the data receiver 414 realized by using a CPU, is shown in FIG. 31. The data receiver 414 comprises a tuner 640, a transport decoder 641, an audio video (AV) decoder 642, an input interface (I/F) 643, the CPU 644, a ROM 645, and a RAM 646.

The tuner 640 selects a transport stream out of the radio waves in accordance with a command from the CPU 644, and pass the stream to the transport decoder 641. The transport decoder 641 selects section data having exact match with the filtering conditions being specified within the transport stream thus received in accordance with a command from the CPU 644. The section data thus selected is sent to the RAM 646, and stored therein. In this embodiment, the transport decoder 641 and the tuner 640 function as the filtering part 415.

Further, the transport decoder 641 sends PES packets of audio/video data contained in the transport stream received under the command from the CPU 644 to the AV decoder 642, the audio/video data having the specified PIDs. The AV decoder 642 decodes the audio/video data thus received, and outputs images and sounds. Further, the AV decoder 642 synthesizes graphic data of on-screen display (OSD) under the command from the CPU 644, and outputs the graphic data thus synthesized as images. The outputs of audio/video from the AV decoder 642 are provided to TV monitor and the like which displays the images under the NTSC system or the PAL system.

The input interface (I/F) 643, comprising an infrared detector and the like, receives input signals outputted by the remote controller.

The CPU 644 controls other hardware in accordance with a program stored in the ROM 645.

The filtering conditions varying part 417 is realized by the AV decoder 642, the input I/F 643 and the program stored in the ROM 645.

The ROM 645 stores all the programs for controlling the data receiver 414. The RAM 646 is used for performing the programs stored in the ROM 645 with the CPU 644. Further, the RAM 646 stores the data filtered by the transport decoder 641 therein.

Figure 32:
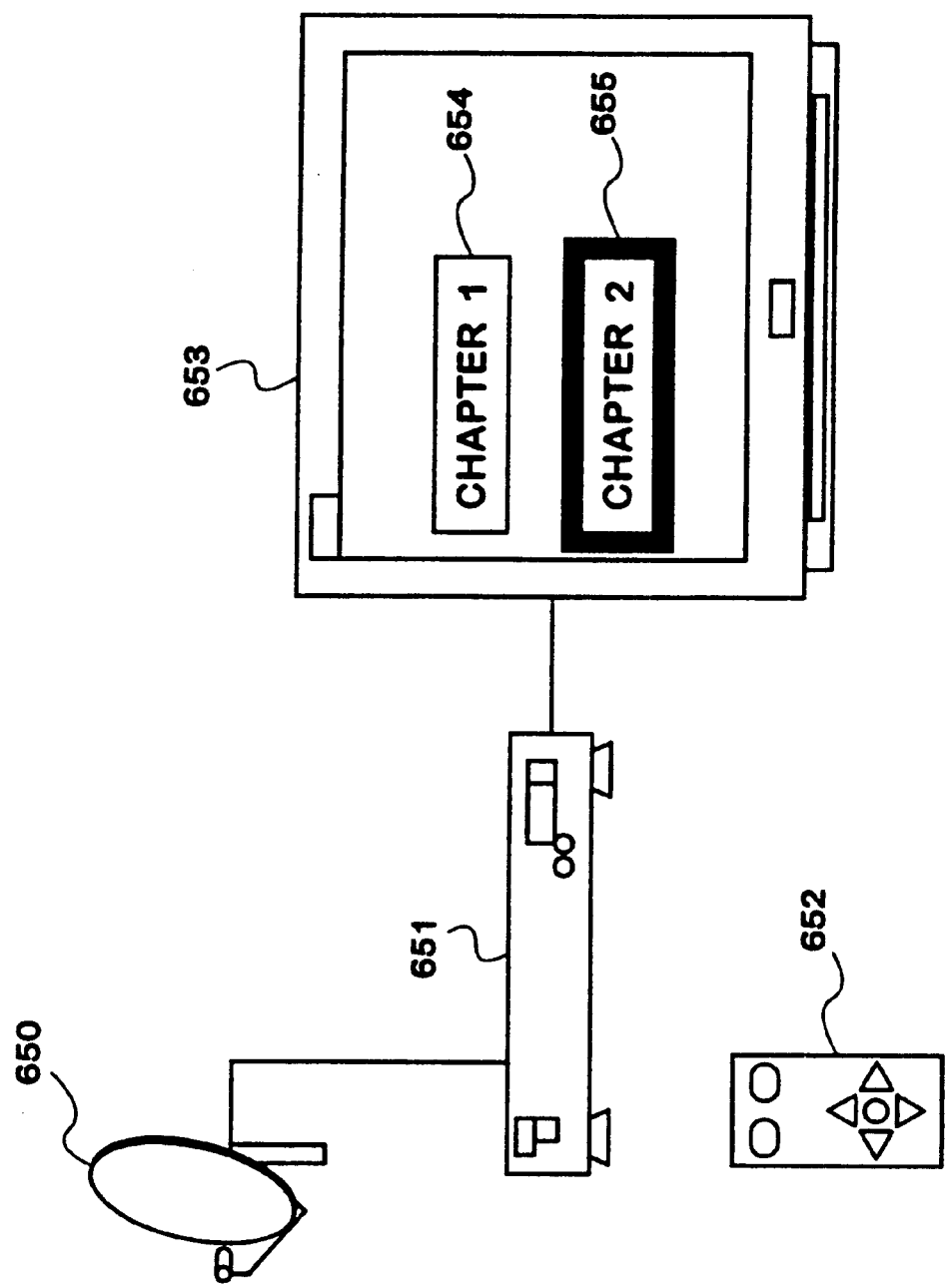
FIG. 32 is an overall view of a communication system using the data receiver 414.

FIG. 32 is an overall view of a communication system using the data receiver 414 depicted in FIG. 31 as receiver system. In the communication system, a data receiver 651 is connected with both an antenna 650 and a television (TV) monitor 653 as shown in FIG. 32. A selection command is provided to the data receiver 651 in response to the input of the operator into a remote controller 652.

Data display on the TV monitor 653 will be described hereunder. Data being processed from the HTML data 531 shown in FIG. 28A is displayed on the TV monitor 653 as graphic data of on-screen display.

Both the characters "Chapter 1" and "Chapter 2", each contained respectively in the row 532 and the row 533 in FIG. 28A, are respectively displayed on a region 654 and a region 655 on the TV monitor 653. The display is called as a hot-spot. In this example, the region 655 is a region currently selected, and is highlighted. This state is referred to as a selected status of the hot-spot.

The CPU varies filtering conditions in the transport decoder 641 so as to extract the file "/0001/0003.html" when the operator inputs a command "SET" as a result of making a decision that the file "/0001/0003.html" is need to be referred.

As described earlier, the file data can selectively be divided by using the transport decoder in the filtering part 415. The divided file data are stored directly in the primary storing part by providing the data converter 412 and the filtering conditions varying part 417 respectively to the data transmitter and the data receiver in this embodiment.

Although, the files being transmitted are HTML files in the embodiments described earlier, other data may be used instead of the HTML files.

In the system according to the present invention, data of the desired files(s) can directly be obtained in the primary storing part from the transmitted data at the data receiver without using a secondary storing part by providing the data converter and the filtering conditions variation part respectively to the data transmitter and the data receiver, the data converter being operated to convert the file name(s) into data to be recognized by values converted in accordance with a certain rule, and the filtering conditions variation part being operated to convert the file name(s) into filtering conditions in accordance with a certain rule.

Further, it is not necessary for the receiver to refer the correspondence table for varying the filtering conditions in the transport decoder. It is, therefore, possible to provide a receiver for broadcasting capable of decreasing the amount of calculation performed by the CPU as well as saving its data storing capacity.

1-5. Fourth Embodiment

In each of the embodiments described earlier, file names of the files are changed into a certain number of digits and a certain kind of characters capable of reading the transport decoder, and the file names are assigned to each of the packets as module_id. In other words, the module_id are uniquely assigned to each of the packets. In this embodiment, however, the same module_id are assigned to a plurality of files having a certain relationship thereamong.

Figure 34:
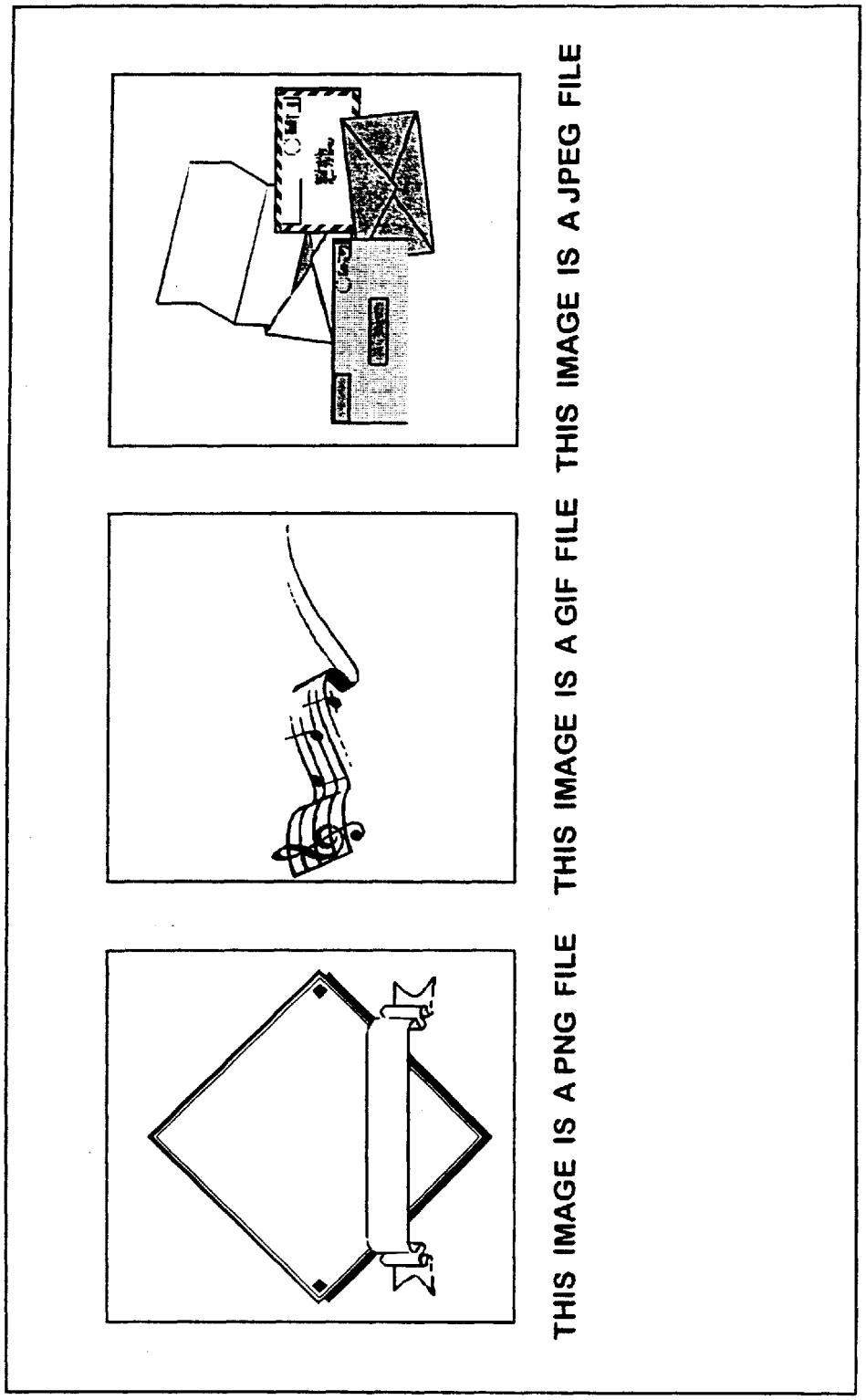
FIG. 34 shows an image displayed according to the contents of the reference file.

For example, a reference file "sample.html" shown in FIG. 33 is html data which defines positions of three referred files such as files "s1. png", "s2. gif", and "s3. jpeg" in the display by style tags. In this way, a video image shown in FIG. 34 is displayed on the TV monitor and the like.

The filtering conditions of rows containing these referred files "s1. png", "s2. gif", and "s3. jpeg" are varied upon reading the rows. It might take a certain period of time to display the images when the variation of the filtering conditions is performed at an inappropriate timing because each of the packets containing identical data is repeatedly transmitted within a certain period.

In order to solve the drawback, the same module_id are assigned to the files "s1. png", "s2. gif", and "s3. jpeg" these having a certain relationship thereamong, and these files are transmitted. Then, these files are selectively received by using the module_id thus assigned thereto. In this way, all the referred files which will be received later can be received with the reference file(s) thereof as one unitized file so that these files can be displayed quickly.

Figure 35:
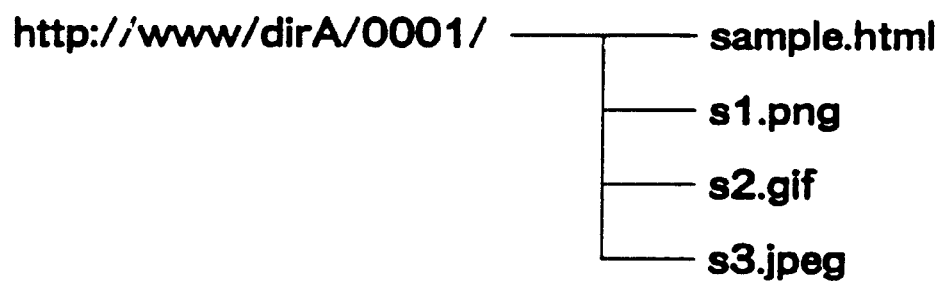
FIG. 35 shows a hierarchial tree structure of a file stored in a transmitting station.

Steps performed in both the transmitter and the receiver, in order to obtain the files in the above manners, will be described. Both the reference file and the referred files are stored in the same directory in the transmitter as shown in FIG. 35. The name of the directory can be defined as a name using a certain number of digits, or a certain kinds of characters, and can be read by the transport decoder. In this embodiment, the module_id is used as the directory name unlike in the second embodiment in which the file name is assigned as the module_id when the files are packetized. In other words, the same module_id "0001" are assigned to the packets consisting the files "s1. png", "s2. gif", and "s3. jpeg", and then the packets are transmitted. In order to specify the directory name, for example, the following procedure is performed such that only the directory name is converted into a certain kind of characters having a certain number of digits capable of reading by the transport decoder so that the receiver may determine which data should be specified as the module_id. The directory name may also be specified by judging a part located between "/" being put before the file name and "/" being put thereafter, and the data existing therebetween may also be specified as its module_id.

In order to select a file(s) with the receiver, all the file(s) having the same id are selectively received thereby and are temporarily stored in a cache memory having a ceratin capacity and prepared in the RAM 144. The CPU may conduct a search to find a referred file when reference is needed.

Figure 36:
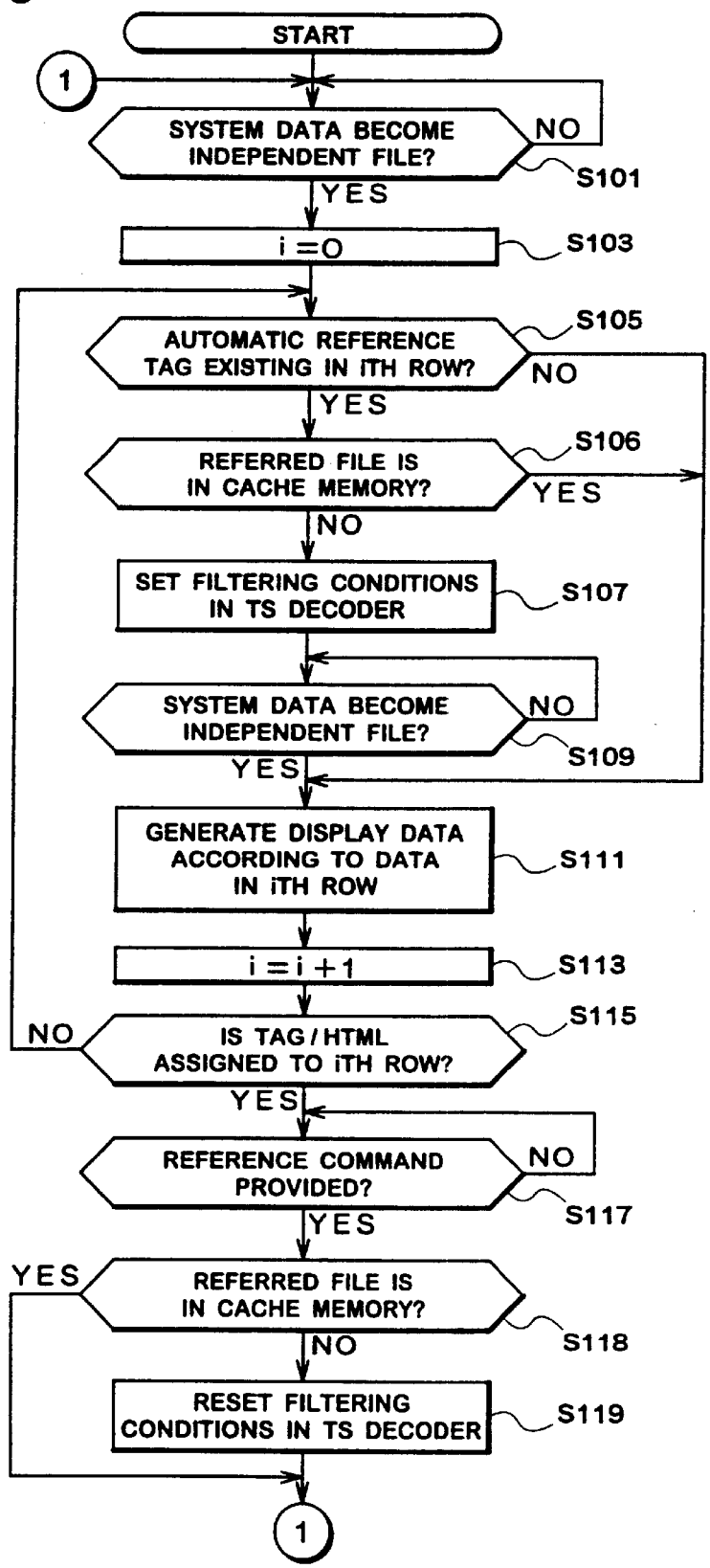
FIG. 36 is a flow chart for describing steps of a display program.

FIG. 36 is a flow chart for describing steps for displaying images in the receiver. One noticeable difference between the steps in the FIG. 22 and that in this embodiment is that the CPU detects existence of the referred file within the cache memory in step S106 after detecting existence of the automatic reference tag in step S105. Another noticeable difference therebetween is that the directory name of the file is set to the transport decoder as the filtering conditions in step S107 when no existence of the referred file within the cache memory is detected in the previous step. For example, directory name 0001 in which "s1.png" is included is set to the transport decoder as filtering conditions of the row where a file src="http://www/dirA/0001/s1.png" is located thereon. In this way, packets of other files "s2.gif", "s3.jpeg" can also be stored in the cache memory.

Similar steps to both steps S106 and S107 are carried out in steps S118 and S119 such that the CPU detects existence of the referred file within the cache memory, and then the directory name of the file is set to the transport decoder as the filtering conditions when no existence of the referred file within the cache memory is detected in the previous step.

Alternatively, both the reference file and the referred file may be transmitted as one unitized file. For example, a definition "multipart/mixed" which indicates the file thus defined consisting of a plurality of files, is allowed in the html format. Under the circumstance, files depicted in FIG. 35 may be transmitted as one unitized file shown in FIG. 37 and FIG. 38. In this way, both the reference file and the referred file can be received at the same time, so that these files can be displayed quickly.

On a row 611 in FIG. 37 is a specification statement which declares the file consist of a plurality of files connected in series. Another row 615 shows a delimiter of the files connected in series. In other words, "boundary="boundary-sample" itself forms the delimiter to the file located therebefore and thereafter in this case. Another row 621 shows a file name, and yet another row 623 describes a data length such as 928 bytes. Another row 619 shows a data format of the file, that is text data in the html format. Another row 613 describes both a directory in which the file is contained, and a computer storing the directory therein.

Further, rows 627, 629 indicate contents of the first file "sample.html".

In addition, a row 630 contains data related with the second file "s1.png", rows 631, 633, 635, 637, and 639, respectively shows a delimiter, a data format of the file, a file name, a data length, and contents of the second file. In this case, the second file is formed by image data in the png format.

Both rows 633 and 635, respectively, show regions related with files "s21.gif" and "s3.jpeg".

Hence, files related one another can be displayed quickly as a result of transmitting these file connected in series as one unitized file.

While, existence of the automatic reference tag(s) in which no operation is required by the operator is detected in this embodiment, further quick display can be carried out by previously selecting referred file which need to be inputted by the operator in addition to the automatic reference tag(s).

Figure 40:
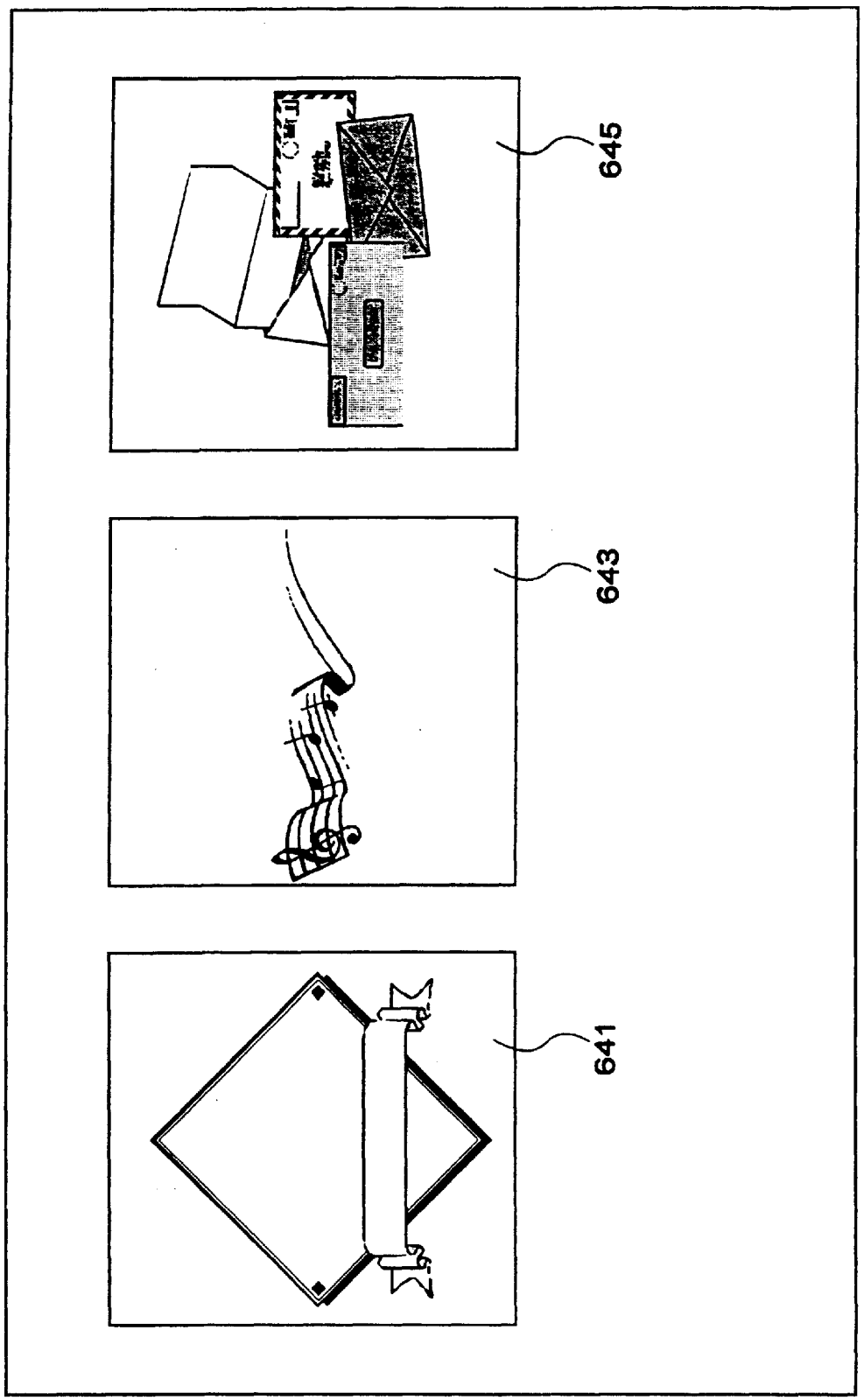
FIG. 40 shows a typical image displayed in accordance with the reference file depicted in FIG. 39.
Figure 42A:
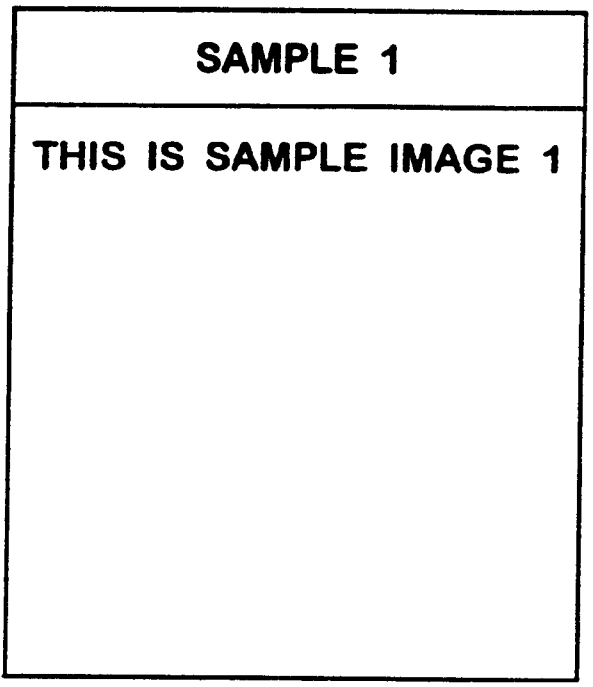
FIG. 42A and FIG. 42B show images displayed according to the referred file shown in FIG. 41A and FIG. 41B.
Figure 42B:
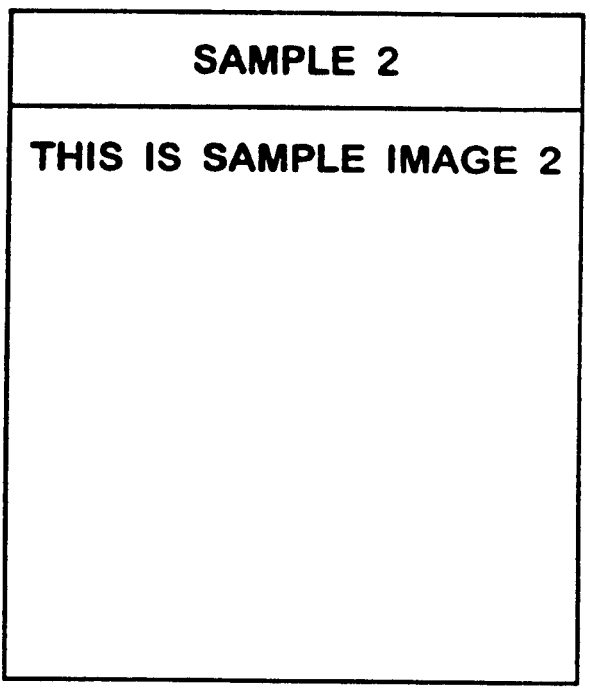
Figure 43:
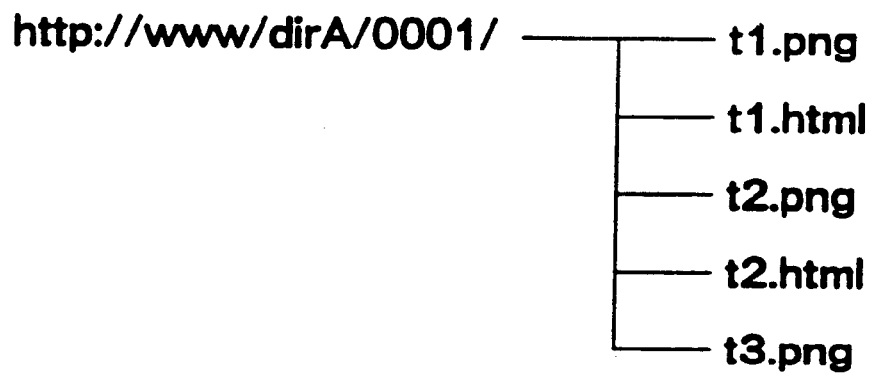
FIG. 43 shows a hierarchial tree structure of a file stored in the transmitter side.

For example, not only the referred files which need to be inputted by the operator, but also the automatic reference tag(s) are indicated in the reference file shown in FIG. 39. In a concrete form, images shown in FIG. 40 are displayed in accordance with the reference file depicted in FIG. 39. An image shown in FIG. 42A is displayed in the case of matching the contents of a reference file "t1.html" specified by a row 651 in FIG. 39 with that of an html data depicted in FIG. 41A when the operator selects a region where an image 641 is displayed thereon shown in FIG. 40. Similarly, another image shown in FIG. 42B is displayed in the case of matching the contents of a reference file "t2.html" specified by a row 653 in FIG. 39 with that of an html data depicted in FIG. 41A when the operator selects a region where an image 643 is displayed thereon shown in FIG. 40.

Similarly, selective reception may be carried out by transmitting files "t1.png", "t1.html", "t2.png", "t2.html", and "t3.png", these having a certain relationship thereamong by assigning the same module_id thereto, and receiving them by using the module_id. Hence, not only the referred files which will be received later with the automatic reference tag(s), but also other files not specified by the automatic reference tag(s) may also be received, so that these files can be displayed quickly.

Although, all the reference files and all the referred files are transmitted as one unitized file in this embodiment, a quick display may be realized as a result of omitting variation of the filtering conditions for every row by assigning the same module_id to both a reference file and the referred files and transmitting them when the reference file contains a plurality of the referred files. Alternatively, the transmitter may decide whether or not to provide a different module_id to the referred files in accordance with frequency in reference of the referred files.

The same module_id is assigned respectively to the reference file and the referred files, both stored in the same directory and transmitted with the module_id in this embodiment. The same module_id is also assigned respectively to the reference file and the referred files even when the referred files are stored in a different directory from that storing the reference file.

Figure 45:
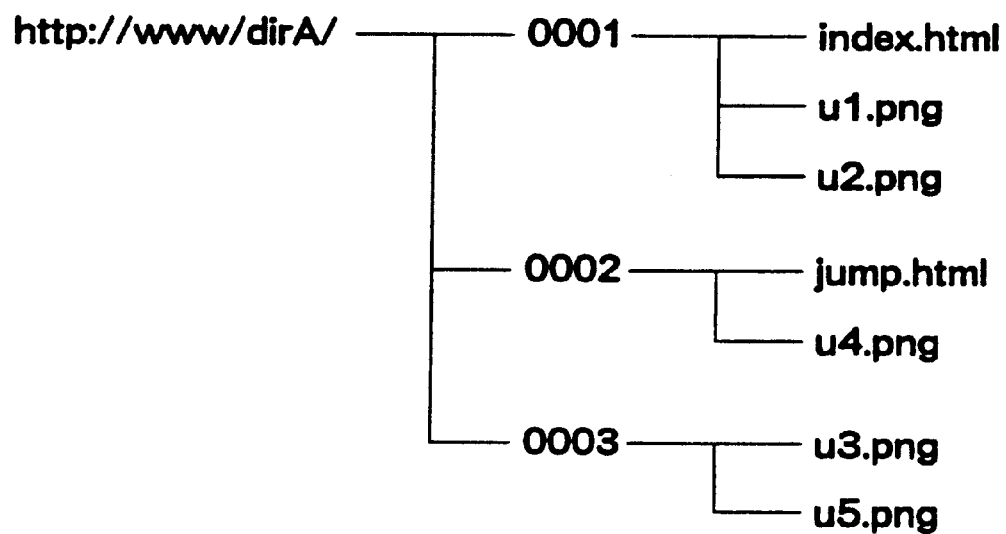
FIG. 45 shows another hierarchial tree structure of a file stored in the transmitter side.

Files "u1.png" and "u2.png", both belonging to a directory http://www/dirA/0001 which stores a reference file "index._html" as shown in FIG. 45, are stored in the cache memory when the filtering conditions are set so as to selectively receive the reference file "index. html". In this way, the file "u1.png" can be displayed upon reading the row src="http://www/dirA/0001/u1.png" without varying the filtering conditions. In order to distinguishably receive a plurality of files, a plurality of filtering conditions each having a different condition may be set to the transport decoder for each of the files, similar to the case in which packets having a plurality of module_ids are received as one unitized file.

Figure 46:
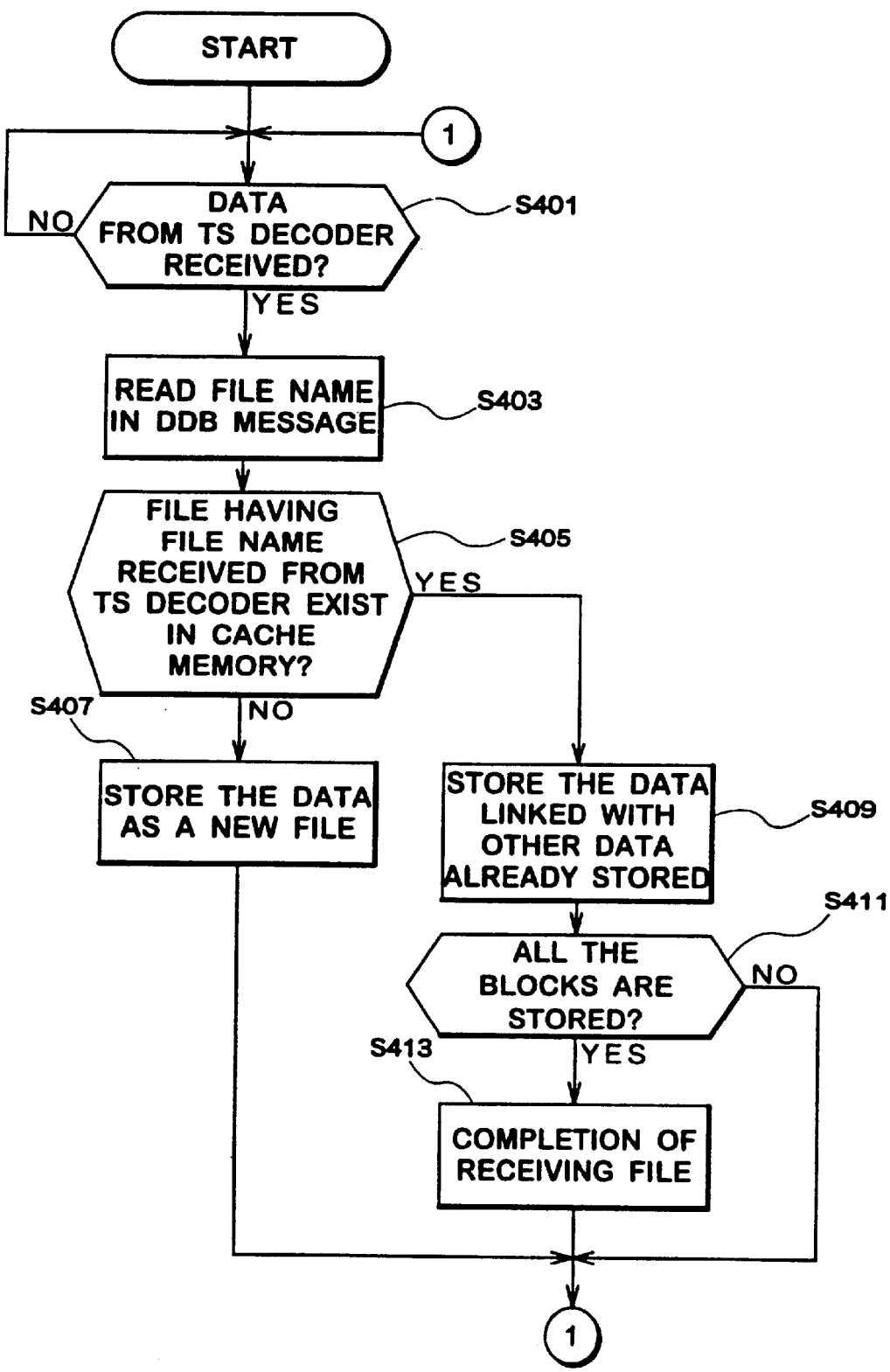
FIG. 46 is a flow chart for describing steps of storing data into a cache memory.

A program for storing data described in FIG. 46, is stored in the ROM 142 shown in FIG. 19, and the program is executed in this embodiment. FIG. 46 is a detailed flow chart for describing the step of storing data into the cache memory.

Figure 47:
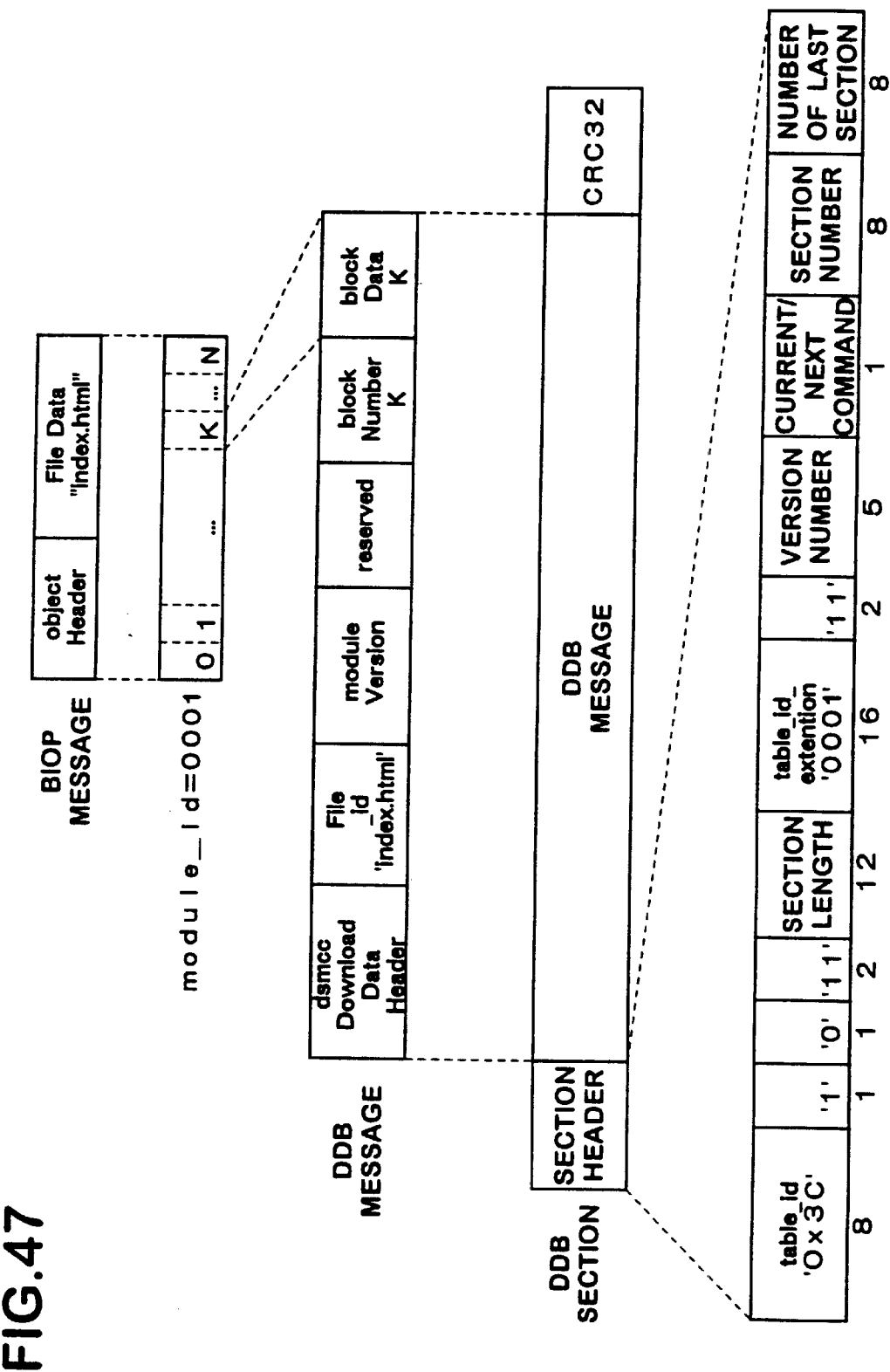
FIG. 47 shows a data structure of packetized data being transmitted.

Steps for displaying data according to a reference file "index.html" depicted in FIG. 44, will be described hereunder. As shown in FIG. 47, the reference file "index.html" is transmitted as a plurality of packets under a section basis at the transmission phase. In this case, file id, not module_id, may be transmitted as the second item of the DDB message similar to the conventional manner.

The reason of transmitting the file_id will be described hereunder. As described earlier, file names are used instead of module_id in the third embodiment. Therefore, each of the files can be distinguished by storing the module_id uniquely assigned to each module, as the second item of the DDB message as shown in FIG. 29. In this embodiment, however, the same module_id are assigned to all the files belonging to a directory. In this way, the receiver can not distinguish every file when no file id are assigned to the packets.

Next, steps for storing data in the cache memory will be described with reference to FIG. 46. The CPU 147 sets filtering conditions for the transport decoder 141 so as to selectively receive packets having their table id extension value of "0001". The CPU 147 judges whether or not it receives data from the transport decoder 141 (FIG. 46, step S401), and the CPU 147 reads out a file name in the DDB message when it receives data from the transport decoder 141 (FIG. 46, step S403).

Thereafter, the CPU 147 detects existence of files having the file name received from the transport decoder 141 within the cache memory (FIG. 37, S405). A file "http://www/dirA/0001/index.html" is stored in the cache memory, because none of such file has been previously stored therein (step S407). Steps following to step S401 will be repeatedly performed.

On the contrary, the file "http://www/dirA/0001/index.html" is linked with the data which has already been stored in the cache memory when the CPU finds existence of the file therein because the file has a file name identical with that of the file received from the transport decoder 141 (step S409).

The CPU 147 judges whether or not all the blocks of the file are stored (step S411), steps following to step S401 will be repeatedly performed until all the blocks of the file are stored, signaling completion of receiving the file (step S413). On the other hand, steps following to step S401 will be repeatedly performed as an incomplete of receiving the file. Files can be stored in the cache memory in the receiver under a file basis even when the same module_id are assigned to a plurality of files.

As described earlier, each of the files is multiplexed and repeatedly transmitted in a time-sharing manner by the transmitter. In this way, files such as "http://www/dirA/0001/u1.png", and "http://www/dirA/0001/u2.png", both belonging to the same directory are outputted by the transport decoder 141 when the filtering conditions set in the decoder are "0001". These data outputted by the transport decoder 141 are also stored in the cache memory under the control of the CPU 147 according to the steps shown in the flow chart depicted in FIG. 46.

As a result of the data storing, all the files belonging to the directory selectively received under the filtering condition "0001", i.e.; "http://www/dirA/0001/index.html", "http://www/dirA/0001/u1.png", and "http://www/dirA/0001/u2.png", are stored in the cache memory as shown in FIG. 48A.

Figure 50A:
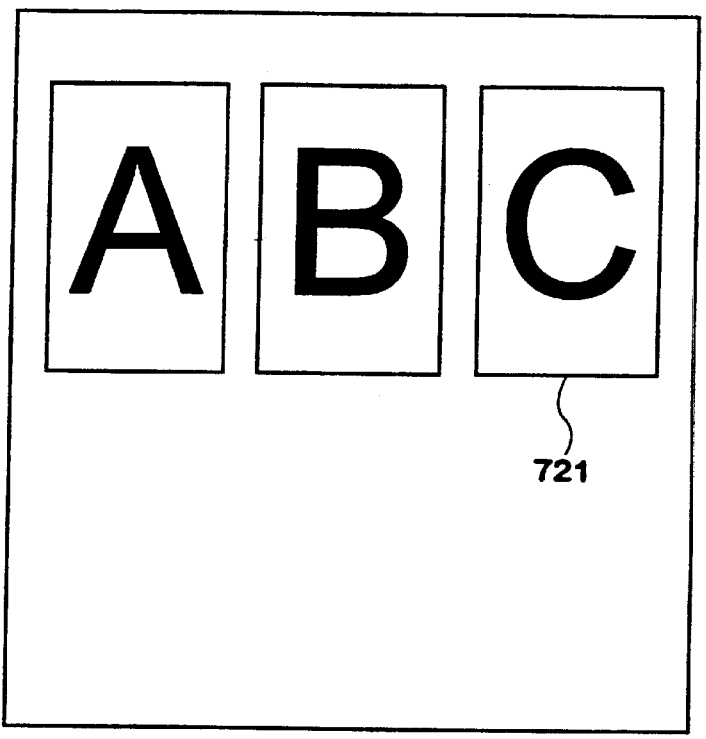
FIG. 50A and FIG. 50B show images displayed according to the referred file shown in FIG. 49.

Further, the CPU 147 varies the filtering conditions in the transport decoder 141 so as to selectively receive packets having a table_id_extension value of "0003" upon reading a row 711 shown in FIG. 44. In this way, all the files belonging to a directory selectively received under the filtering condition "0003", are additionally stored in the cache memory in a sequential manner as shown in FIG. 48C. The CPU 147 controls display of images depicted in FIG. 50A according to html data shown in FIG. 49. In this case, the file "jump.html" may also be considered as a reference file from the standpoint of a referred file "u1.png" because the file "jump.html" refers other referred files "u1.png" and so on.

In order to receive a referred file "http://www/dirA/0002/jump.html", the CPU 147 varies the filtering conditions in the transport decoder 141 so as to selectively receive packets having a table_id_extension value of "0002" according to the description on a row 713 in FIG. 44 when the operator clicks a region displaying an image 721 depicted in FIG. 50. In this way, all the files belonging to a directory selectively received under the filtering condition "0002", are additionally stored in the cache memory in a sequential manner as shown in FIG. 48C.

In order to store upcoming data, the data stored in the cache memory are erased partially in the order in which data are stored. In this case, the file "http://www/dirA/0001/index.html" has already been erased as depicted in FIG. 48C.

Figure 50B:
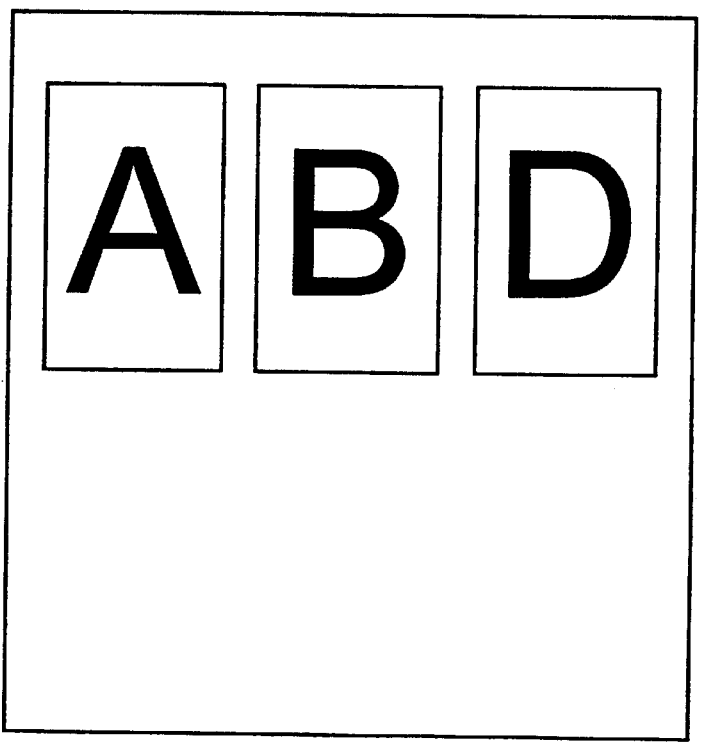

The CPU 147 controls to display an image shown in FIG. 50B by referring the files "http://www/dirA/0001/u1.png", "http://www/dirA/0001/u2.png", and http://www/dirA/0002/u4.png" those have already been stored in the cache memory when the referred file "jump.html" specified by the row 713 depicted in FIG. 44 is html data shown in FIG. 49.

Thus, display of images according to files belong to several different directories (groups) can be carried out even when these files are contained in one reference file. In this way, referred files and relevant data commonly used in a plurality of reference files can be stored as a package of data.

Figure 38:
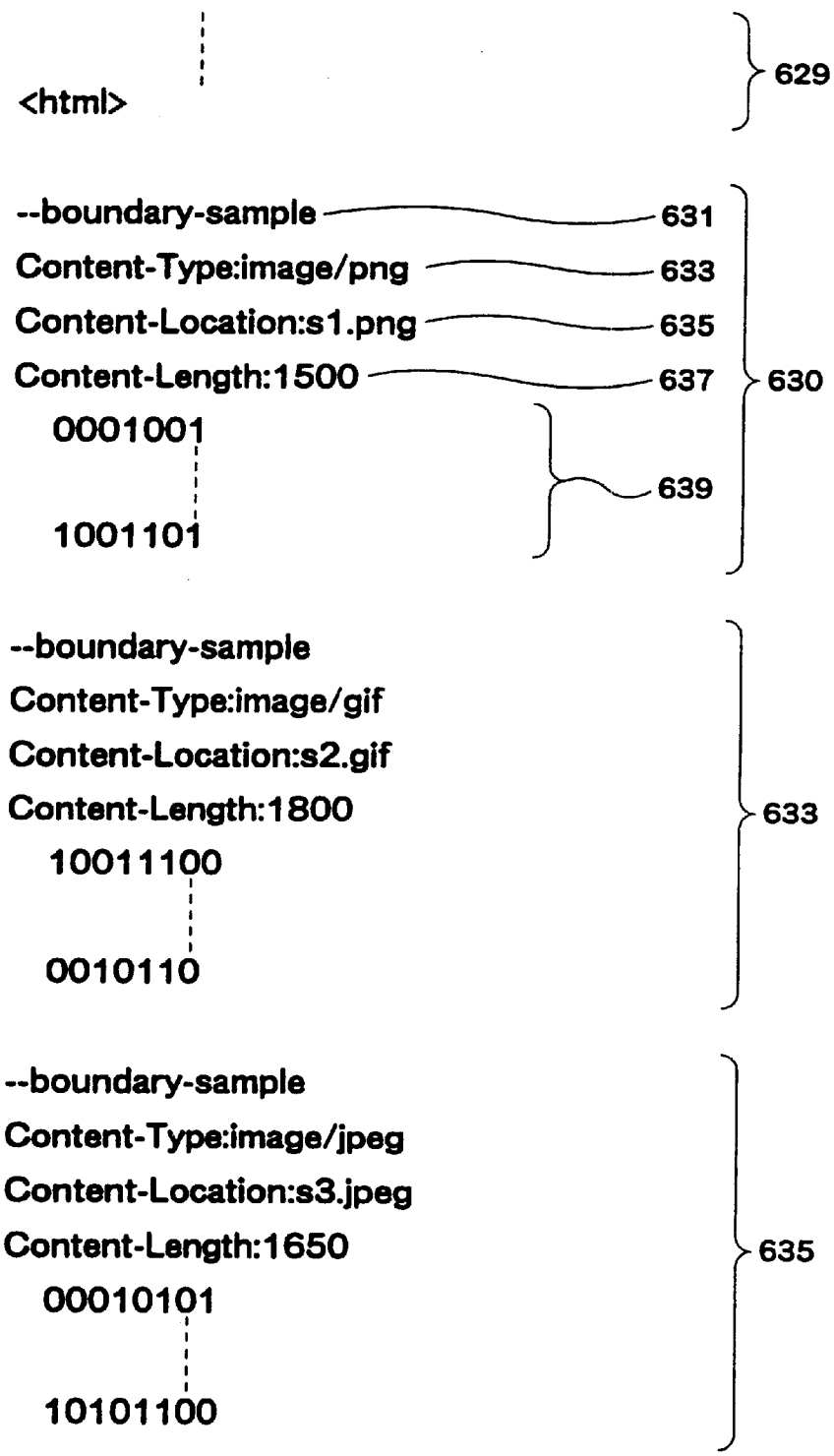
FIG. 38 shows data contents of another HTML file in which a plurality of files are incorporated one another.

In this case, the referred files and the relevant data may also be transmitted and be received as one unitized file similar to that of shown in FIG. 37 and FIG. 38.

The transmitter in this embodiment may automatically change directory names into file names having a certain number of digits and certain kind of characters capable of reading by the transport decoder similar to the second embodiment. In that case, just the directory names may be changed, while the file names remains the same. For example, a part "/music/" preceding to "jump.html" may be changed into characters "0002" having a certain number of digits and certain kind of characters capable of reading by the transport decoder as a result of recognition of the part "/music/" as a directory name when the directory name of the file "http://www/dirA/music/jump.html" is changed.

One unitized file in which a plurality files linked with one another, as shown in FIG. 37 and FIG. 38 may be transmitted and received by using one common module_id in the first embodiment through the third embodiment of the present invention.

The automatic reference tag(s) in which the image(s) is pasted thereto is used in this embodiment. Other kinds of automatic reference tags, for example style tags which define styles of the reference file may equally be used. In this embodiment, a plurality of files are transmitted with the same module_id, and the files having the same module_id are stored in the cache memory. The filtering conditions are varied when no existence of the files having the same module_id is detected during the data reference in the cache memory. The filtering conditions, however, could remain the same as the filtering conditions currently defined. This could occur when a file out of plural files contained in a directory, has not been received yet. In that case, it is not necessary to vary the filtering conditions of the transport decoder further.

As described in the previous embodiments, the desired HTML file(s) can be extracted solely with the transport decoder without storing the correspondence table by assigning selecting conditions for specifying at least one or plural files to the header field of the packets, the selecting conditions including a certain number of digits and certain kinds of characters capable of directly reading by the transport decoder.

1-6. Other Embodiments

Selection of the referred file with the transport decoder can further be accelerated in the first embodiment through the third embodiment by previously detecting the existence thereof within the reference file and then varying the filtering conditions in the transport decoder as the existence detected, rather than upon completion of data recognition for each row.

Although, files are transmitted through both the DSM-CC object carousel and the DSM-CC data carousel on the MPEG 2 transport stream, any protocols capable of performing similar data processing may be used.

Though, the file name being converted is indicated with both a PID and a module_id as a series of characters in the embodiments described earlier, the PID may be retrieved from the PAT and the PMT, or may also be retrieved from a combination of other identifiers selected at an option which allows the similar data processing.

The transmitter repeatedly transmits all the files, and the receiver obtains a desired file(s) by varying the filtering conditions in filtering means and displays it. In this way, it is possible to provide a data communication system and a method thereof in which it appears to the operator that the information is obtained in the receiver in interactive ways according to the operations by him/herself without outputting a command for transmission to the transmitter.

Although, the transmission of digital data performed in the satellite broadcasting has been described in the embodiments described earlier, the transmission of digital data in the present invention may also be applied to digital terrestrial broadcasting, and wire broadcasting such as cable television in similar manners.

While module identifiers of HTML files, making up the front page being displayed initially in the services, are assigned in the control data PMT in the embodiments described earlier, the module identifiers may be stored in a storing part of the transmitter as fixed values. For example, they may be set instead of the table_id_extension of a file being transmitted initially when the operator switches the service currently received to some other service.

The HTML files comprising the front page may be transmitted to the receiver in a shorter period of time than other files during the repeated transmission. This is because less time lag for entering the service is preferred, and entering in the service is not allowed without the HTML files comprising the front page.

In the embodiments described earlier, the transport decoder selects a desired file(s) by referring to both the PIDs and the table_id_extensions assigned to the files being transmitted by the transmitter because all the files belong to the directory "¥weather", and for example, the file name is indicated as /0001/0001.html in the correspondence table. The transport decoder may select the desired file(s) by using one of the PIDs and the table_id_extensions. The transport decoder may select the desired file(s) by using either one of the PIDs or the table_id_extensions. Further, the transport decoder may use the table_id in addition to both the PIDs and the table_id_extensions. In other words, any identifiers which may directly be recognized by the transport decoder can be used even when they are stored in other regions in the headers.

In the first embodiment, HTML data was transmitted as a single service, i.e., without video data and audio data. However, in another embodiment, HTML data can be transmitted with video data and audio data, together as one service, and the service may be displayed on the monitor after of synthesizing the data.

Further, data transmission of the HTML data has been described in aforementioned embodiments, other self-descriptive data such as standard generalized markup language (SGML) data or extensible markup language (XML) data may also be adopted to the present invention in similar manner. In addition, image data which is referred by the HTML data, may be generated in other formats, such as JPEG (.jpg) format than the graphics interchange format (.gif) used in the earlier embodiments. Although, a tag <HREF> is employed as a reference command(s) for referring other file(s) in the earlier embodiments, other commands may also be used in similar manner.

In order to select a specific region displayed on the monitor, the operator moves the cursor freely on the monitor in the earlier embodiments. The control of the cursor depend on the operating system (not shown) installed in the receiver. The control may also be performed under the display program.

The movement of the cursor may be restricted so as to move within a selectable region alone. The CPU detects that a region is selected in the case of inputting the command "SET" by the operator during a period in which the region is specified as a selectable region when images are displayed on the monitor according to a specific HTML file. For example, a region located at the upper left of the monitor is considered as the selected region when the command "SET" is inputted by the operator. On the contrary, a region located right under the region currently selected may be considered as the selected region when the operator enters a command to move the cursor downwardly in the case of varying filtering conditions. Similar manners can also be adopted to all other directions for detecting the selected region. The selected region can be specified by detecting the direction in the command inputted with the remote controller by using all the coordinates being stored.

In the earlier embodiments, module identifiers of HTML files, comprising the front page being displayed initially in the services, are assigned to the additional information fields in the control data PMT. However, the module identifiers of the HTML files themselves may be assigned to the additional information fields in the control data PMT. For example, "¥weather¥forecast.html" is stored in the additional information fields when a file "¥weather¥forecast.html" is the front page displayed initially in the service. In that case, the filtering conditions in the transport decoder can be set by using a module identifier obtained from the correspondence table shown in FIG. 15.

While, unencoded data are transmitted by the transmitter in the earlier embodiments, the data being transmitted may be scrambled by the transmitter and decoded with the receiver.

Both a computer software and the CPU are used for realizing functions of the block diagram shown in FIG. 1 in the above embodiments, there is no limitation of realizing any of the functions by a computer hardware. In addition, a part of the functions or all of these may be realized by a computer hardware such as logic circuits or the like.

In the embodiment described earlier, the display program is stored in the ROM. Alternatively, the display program can also be installed once in computer readable data storing mediums such as IC cards or CD-ROMs, and then storing the program in a nonvolatile memory through an IC card drive or a CD-ROM drive. Further, the display program may be downloaded into the nonvolatile memory through a communication line.

The program may also be incorporated with carrier waves and the resulting data may be transmitted as computer data signals.

1) The digital data communication system according to the present invention is characterized in that, the system comprises a transmitter and a receiver,
   A) the transmitter including:
      a1) file storing means for storing a plurality of files, and
      a2) transmission means for repeatedly transmitting the files packetized thereby in accordance with a transmission protocol, the packetized files uniquely assigned identifiers;
   B) the receiver including:
      b1) selective receiving means for selectively receiving the packetized files having predetermined identifiers in accordance with a selecting condition set therein and outputting data contained in the packetized files,
      b2) display data generating means for generating display data according to the outputted data, and
      b3) selecting condition varying means for varying the selecting condition,
   C) wherein c1) the file storing means stores files formed of self-descriptive data which includes a reference command for referring another file, and wherein the identifier of each file includes characters directly being selected by the selecting condition varying means,
      c2) the display data generating means generates display data according to the self-descriptive data outputted by the selective receiving means, and
      c3) the selecting condition varying means provides an identifier assigned to a file so as to obtain the file specified by the reference command in the self-descriptive data to the selective receiving means.

Thus, the files formed of self-descriptive data which includes the reference command for referring another file are repeatedly transmitted by the transmitter, and the receiver selectively receives desired files in accordance with the selecting condition set therein and the receiver generates display data according to the self-descriptive data. In this way, the display data can be displayed on a display means. Also, the selecting condition is varied so as to obtain the file specified by the reference command in the self-descriptive data, so that the files required for display can be received. In this way, the files solely required for display can be displayed on the display means without storing files not required for the display. Consequently, the files formed of self-descriptive can be displayed even when data storing capacity of the receiver is small.

Further, the identifier of each file includes characters directly being selected by the selecting condition varying means of the receiver, and the transmission means transmits the files packetized with identifiers uniquely assigned thereto, and the selective receiving means selectively receives the packetized files having predetermined identifiers in accordance with a selecting condition set therein, and the selecting condition varying means provides the identifier assigned to the file so as to obtain the file specified by the reference command in the self-descriptive data to the selective receiving means. Consequently, desired files can be selected without using data representing correspondence thereamong.

3) The digital data communication system according to the present invention is characterized in that, the system further comprises display means for displaying the display data generated by the display data generating means, and the selecting condition varying means varies the selecting condition set in the selecting means so as to select a file specified by the reference command when one of a plurality of regions displayed on the display means which is specified by the reference command is selected thereon. Consequently, the files formed of self-descriptive data can be displayed on the display means without storing files not required for the display, while switching the display at an option of the operator.

The digital data communication system according to the present invention is characterized in that, the files stored in the file storing means are divided into groups according to the identifiers assigned thereto, and the selecting means divides the self-descriptive data being outputted into groups by using the identifiers and outputs the divided self-descriptive data therefrom. In this way, for example, chargeable data can easily be distinguished from data free of charge by just assigning different directory names.

4) The digital data communication system according to the present invention is characterized in that, the data converting means converts both the identifier of each file and an identifier of the reference command into characters directly be selected by the selecting means. In this way, it is not necessary to specify the identifiers in characters directly being selected by the selecting means when self-descriptive data of the file to be transmitted is generated, so that the self-descriptive data can be generated in any other type of identifiers.

5) The digital data transmitter according to the present invention, each of the files stored in the file storing means consist of self-descriptive data including a reference command for referring another file, and an identifier of the each file, consisting of characters directly being selected by selective receiving means in a receiver, and the transmission means transmits the packetized files with unique identifiers. In this way, it is not necessary to prepare data representing correspondence between identifiers assigned to files to be selected by the receiver and the selecting condition set in the selecting means. Consequently, desired files can be selected at a high speed.

6) The digital data transmitter according to the present invention, both the identifier of the each file and an identifier of the reference command are converted into characters directly be selected by selecting means in the receiver according to a rule for conversion when identifiers of the files stored in the file storing means are provided in a form incapable of directly selecting by the selecting means. In this way, it is not necessary to specify the identifiers in characters directly being selected by the selecting means when self-descriptive data of the file to be transmitted is generated, so that the self-descriptive data can be generated in any other type of identifiers.

7) The digital data transmitter according to the present invention is characterized in that, the data outputted from the selective receiving means forms a file consisting of self-descriptive data including a reference command for referring another file, and the display data generating means generates display data according to the self-descriptive data outputted by the selective receiving means, and the selecting condition varying means provides an identifier of a file as the selecting condition to the selective receiving means so as to obtain the file specified by the reference command in the self-descriptive data. In this way, the files solely required for the display can be displayed on the display means without storing files not required for the display. Consequently, the files formed of self-descriptive data which refer one another can be displayed even when data storing capacity of the receiver is small.

10) The digital data communication system according to the present invention is characterized in that, the files stored in the file storing means are divided into groups according to the identifiers assigned thereto, and the selecting means divides the self-descriptive data being outputted into groups by using the identifiers and outputs the divided self-descriptive data therefrom. In this way, the files thus received can be divided into groups. Consequently, for example, chargeable data can easily be distinguished from data free of charge by dividing into separate groups.

The grouping described above can also be carried out by substituting the identifiers assigned to the files stored in the file storing means with both directory names and file names belonging thereto, and the packetized files selected by the selecting means are divided into groups under the directory basis thereby. 11) The digital data communication system according to the present invention is characterized in that, the files divided in the same group are transmitted with the same packet id. In this way, the received files can be divided into groups by using the PID.

12) The digital data receiver according to the present invention is characterized in that, the selecting means divides the packetized files selected by the selecting means into groups under the directory basis thereby. In this way, the files thus received can be divided into groups. Consequently, for example, chargeable data can easily be distinguished from data free of charge by just assigning different directory names.

18) The method of communicating digital data according to the present invention is characterized in that, a plurality of files are repeatedly transmitted after packetizing the files according to a transmission protocol with identifiers uniquely assigned thereto in a transmitting station, each of the files consisting of self-descriptive data including a reference command for referring another file, the identifier of the each file consisting of characters directly being selected by a receiving station, and the following steps are performed in a receiving station, the packetized files having predetermined identifiers are selectively received in accordance with a selecting condition set therein, and display data are generated in accordance with the self-descriptive data contained in the packetized files and the display data are outputted, and the identifier of the file is varied as the selecting condition so as to obtain the file specified by the reference command in the self-descriptive data.

In this way, the files formed of self-descriptive data can be displayed on the display means without storing files not required for the display in the file storing device, while not preparing data representing correspondence of files to be selected.

19) The data communication system according to the present invention is characterized in that, the system comprises a transmitter and a receiver,
    A) the transmitter including:
        a1) file storing means for storing a plurality of files, and
        a2) transmission means for repeatedly transmitting the files packetized thereby in accordance with a transmission protocol, the packetized files uniquely assigned identifiers;
    B) the receiver including:
        b1) selective receiving means for selectively receiving the packetized files having predetermined identifiers in accordance with a selecting condition set therein and outputting data contained in the packetized files,
        b2) received data storing means for storing data contained in the packetized files each having same identifier in one independent file basis,
        b3) display data generating means for generating display data according to the outputted data, and
        b4) selecting condition varying means for varying the selecting condition; and
    C) wherein c1) the file storing means stores files formed of self-descriptive data which includes a reference command for referring another file,
        c2) the transmission means assigns one module identifier including characters capable of being read directly with the selective receiving means to both a reference file which refers other files and a referred file which is referred by the reference file, and transmits the reference file and the referred file, and
        c3) the display data generating means generates display data according to self-descriptive data contained in the reference file, and generates another display data according to a desired referred file which is read out thereby from the received data storing means.

In this way, the referred file can further be selectively received by just setting the selecting condition for selecting the reference file without preparing data representing correspondence between the reference file and the file to be selected. Consequently, display data according to the reference file which includes the referred file, can be displayed quickly. As a result, desired files can be selected at a high speed without storing all the files.

20) The data receiver according to the present invention is characterized in that, the receiver comprises selective receiving means for selectively receiving packetized files having predetermined identifiers in accordance with a selecting condition set therein and outputting data contained in the packetized files, received data storing means for storing the outputted data each having same identifier under a file basis, display data generating means for generating display data according to the outputted data, and selecting condition varying means for varying the selecting condition, wherein the packetized files thus received are one of a reference file formed of self-descriptive data which includes a reference command for referring another file and a referred file which is referred by the reference file, and one identifier including characters capable of being read directly with the selective receiving means is assigned to these files, and wherein display data generating means generates display data according to self-descriptive data contained in the reference file, and generates another display data according to a desired referred file which is read out thereby from the received data storing means, and wherein the selecting condition varying means varies the selecting condition so as to selectively receive packetized files each assigned same identifier with that of a specific reference file in order to selectively receive the specific reference file.

In this way, the referred file can further be selectively received by just setting the selecting condition for selecting the reference file without preparing data representing correspondence between the reference file and the file to be selected. Consequently, display data according to the reference file which includes the referred file, can be displayed quickly. As a result, desired files can be selected at a high speed without storing all the files.

21) The data receiver according to the present invention is characterized in that, file to be automatically referred can selectively be received without setting the selecting condition for selectively receiving the desired file to be automatically referred as a result of reading a reference file when the reference file is a file including an automatic reference tag. In this way, display data of a file including the file to be automatically referred can be generated more quickly.

22) The data receiver according to the present invention is characterized in that, the referred file is selectively received as it is when selective receipt of the reference file is initiated because the reference file and the referred file are linked with each other.

23) The data receiver according to the present invention is characterized in that, the reference file and the referred file comprise a unitized file. In this way, desired files can selectively be received when selective receipt of the one unitized file is initiated.

24) The method of communicating digital data according to the present invention is characterized in that, a plurality of files stored in a transmitting station after packetizing the files according to a transmission protocol are repeatedly transmitted with identifiers uniquely assigned thereto in the transmitting station, and the following steps are performed in a receiving station, the packetized files having predetermined module identifiers are selectively received in accordance with a selecting condition set therein, data contained in the packetized files each having same identifier are stored in one independent file basis, and display data are generated according to the outputted data, wherein one module identifier including characters capable of being read directly with the receiving station is assigned to both a reference file which refers other files and a referred file which is referred by the reference file in the transmitting station, and wherein the following steps are performed by the receiving station, the selecting condition is varied so as to selectively receive packetized files each assigned s identifier with that of a specific reference file in order to selectively receive the specific reference file, and display data is generated according to self-descriptive data contained in the reference file, and generates another display data according to a desired referred file which is read out thereby.

In this way, the referred file can further be selectively received by just setting the selecting condition for selecting the reference file without preparing data representing correspondence between the reference file and the file to be selected. Consequently, display data according to the reference file which includes the referred file, can be displayed quickly. As a result, desired files can be selected at a high speed without storing all the files.

26) The data communication system according to the present invention is characterized in that, the system comprises a transmitter and a receiver, A) the transmitter including:
  a1) file storing means for storing a plurality of files, and
  a2) transmission means for repeatedly transmitting the files packetized thereby in accordance with a transmission protocol, the packetized files uniquely assigned identifiers;
B) the receiver including:
  b1) selective receiving means for selectively receiving the packetized files having predetermined identifiers in accordance with a selecting condition set therein and outputting data contained in the packetized files,
  b2) received data storing means for storing data contained in the packetized files each having same identifier in one independent file basis,
  b3) display data generating means for generating display data according to the outputted data, and
  b4) selecting condition varying means for varying the selecting condition; and
C) wherein c1) the file storing means stores a plurality of reference files formed of self-descriptive data which includes a reference command for referring a plurality of other files,
  c2) the transmission means assigns one module identifier including characters capable of being read directly with the selective receiving means to the reference files and transmits the reference files,
  c3) the display data generating means generates display data according to self-descriptive data contained in the reference files, and generates another display data according to desired referred files which are read out thereby from the received data storing means, and
  c4) the selecting condition varying means uses the module identifier as the selecting condition.

In this way, a plurality of referred files to be selected are received as one unitized file. Consequently, display data according to the reference file which includes the referred file, can be displayed quickly. As a result, desired files can be selected at a high speed without storing all the files.

27) The digital data receiver according to the present invention is characterized in that, the receiver comprises selective receiving means for selectively receiving packetized files having predetermined identifiers in accordance with a selecting condition set therein and outputs data contained in the packetized files, received data storing means for storing data contained in the packetized files each having same identifier in one independent file basis, display data generating means for generating display data according to the outputted data, and selecting condition varying means for varying the selecting condition, wherein the packetized files thus received are one of a reference file formed of self-descriptive data which includes a reference command for referring a plurality of other files and a referred file which is referred by the reference file, and wherein one identifier including characters capable of being read directly with the selective receiving means is assigned to the referred files through the reference file, and wherein the display data generating means generates display data according to self-descriptive data contained in the reference file, and wherein the selecting condition varying means varies the selecting condition so as to selectively receive packetized files each assigned same identifier with that of a specific reference file in order to selectively receive the specific reference file in accordance with data of the reference file.

In this way, a plurality of referred files to be selected are received as one unitized file. Consequently, display data according to the reference file which includes the referred file, can be displayed quickly. As a result, desired files can be selected at a high speed without storing all the files.

28) The data receiver according to the present invention is characterized in that, same module identifier with that of the referred files is assigned to the reference file. In this way, the referred file can further be selectively received by just setting the selecting condition for selecting the reference file without preparing data representing correspondence between the reference file and the file to be selected. Consequently, display data according to the reference file which includes the referred file, can be displayed quickly. As a result, desired files can be selected at a high speed without storing all the files.

29) The data receiver according to the present invention is characterized in that, the receiver comprises selective receiving means for selectively receiving packetized files having predetermined identifiers in accordance with a selecting condition set therein and outputs data contained in the packetized files, received data storing means for storing data contained in the packetized files each having same identifier in one independent file basis, display data generating means for generating display data according to the outputted data, and selecting condition varying means for varying the selecting condition, wherein the packetized files thus received are one of a reference file formed of self-descriptive data which includes a reference command for referring another file and a referred file which is referred by the reference file, and one identifier including characters capable of being read directly with the selective receiving means is assigned to these files, and wherein display data generating means generates display data according to self-descriptive data contained in the reference file, and generates another display data according to a desired referred file which is read out thereby from the received data storing means, and wherein the selecting condition varying means extracts characters directly be selected by the selective receiving means out of absolute path assigned to the referred files and provides the characters to the selective receiving means as the selecting condition so as to selectively receive packetized files each assigned same identifier with that of the reference file in order to selectively receive the reference file.

In this way, the file formed of self-descriptive data can be displayed on the display means without storing files not required for the display because a part of the absolute path assigned to the referred files is used as the selecting condition. Consequently, a file referred by another can be displayed even when data storing capacity of the receiver is small.

Definition of words used in the appended claims, and correspondence between these words to the words used in the embodiments described above are as follows.

The word "receiver" is a device, at least capable of selectively receiving a desired service contained in a desired transport stream out of a plurality of transport streams being transmitted. The device includes a video cassette recorder which incorporates an apparatus so called a set-top box, or a television set and the like having the functions of a set-top box.

The word "self-descriptive data" is data assigned its display information such as display positions of character data, its character size, information as to graphic data to be referred. For example, SGML data, HTML data, XML data, data defined under coding of multimedia and hypermedia information part 5 in ISO/IEC 15522-5 (MHEG standard) and the like are included in the self-descriptive data.

The word "program storage medium" includes a data storing medium storing program(s) performed by a CPU such as ROMs, RAMs, hard disks, flexible disks, CD-ROMs and the like. Further, the programs correspond to the memory 27 and the hard disk 26 depicted in FIG. 2 in the embodiments described above.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A digital data receiver comprising:

selective receiving means for selectively receiving packetized files having predetermined identifiers in accordance with a selecting condition set therein and for outputting data contained in the packetized files, received data storing means for storing data contained in the packetized files, each of the packetized files having a same identifier in one independent file basis, display data generating means for generating display data according to the outputted data, and selecting condition varying means for varying the selecting condition;

wherein the packetized files thus received are files related to one another, are connected in series as one unitized file and are assigned one identifier including characters capable of being read directly with the selective receiving means, and wherein the selecting condition varying means extracts characters to be selected by the selective receiving means out of an absolute path assigned to the packetized files and provides the characters to the selective receiving means as the selecting condition so as to selectively receive packetized files that are each assigned the same identifier.

2. The receiver in accordance with claim 1:

wherein the files related one another include at least a reference file formed of self-descriptive data which includes a reference command for referring another file and a referred file which is referred by the reference file; and wherein the packetized files assigned the absolute path are the referred files.

3. The receiver in accordance with claim 2:

wherein each referred file is distinguished by identifying a delimiter of referred files connected in series.

* * * * *